US009715088B1

(12) United States Patent
Yang

(10) Patent No.: US 9,715,088 B1
(45) Date of Patent: Jul. 25, 2017

(54) PHOTOGRAPHING OPTICAL LENS SYSTEM, IMAGE CAPTURING APPARATUS AND ELECTRONIC DEVICE

(71) Applicant: LARGAN PRECISION CO., LTD., Taichung (TW)

(72) Inventor: Shu-Yun Yang, Taichung (TW)

(73) Assignee: LARGAN PRECISION CO., LTD., Taichung (TW)

( * ) Notice: Subject to any disclaimer, the term of this patent is extended or adjusted under 35 U.S.C. 154(b) by 0 days.

(21) Appl. No.: 15/223,095

(22) Filed: Jul. 29, 2016

(30) Foreign Application Priority Data

Jun. 4, 2016 (TW) .............................. 105117751 A

(51) Int. Cl.
*G02B 3/02* (2006.01)
*G02B 13/00* (2006.01)
*G02B 9/62* (2006.01)
*G02B 13/04* (2006.01)
*G02B 27/00* (2006.01)

(52) U.S. Cl.
CPC ........... *G02B 13/0045* (2013.01); *G02B 9/62* (2013.01); *G02B 13/04* (2013.01); *G02B 27/0025* (2013.01)

(58) Field of Classification Search
CPC ................................................. G02B 13/0045
USPC ........................................................ 359/713
See application file for complete search history.

(56) References Cited

U.S. PATENT DOCUMENTS

| 542,122 | A | 5/1895 | Taylor |
|---|---|---|---|
| 2,522,390 | A | 9/1950 | McCarthy |
| 3,051,052 | A | 8/1962 | Bergstein |
| 4,806,001 | A | 2/1989 | Okabe et al. |
| 5,162,947 | A | 11/1992 | Ito |
| 5,610,767 | A | 3/1997 | Ito |
| 6,014,265 | A | 1/2000 | Kato et al. |
| 2012/0194917 | A1 | 8/2012 | Chen |
| 2015/0346459 | A1* | 12/2015 | Chen ................. G02B 13/0045 348/335 |
| 2016/0041382 | A1 | 2/2016 | Kanazawa |

FOREIGN PATENT DOCUMENTS

| JP | H05297270 A | 11/1993 |
|---|---|---|
| JP | H06242369 A | 9/1994 |
| JP | H07181387 A | 7/1995 |
| JP | 2001100092 A | 4/2001 |
| JP | 2009151046 A | 7/2009 |
| JP | 2015121649 A | 7/2015 |

* cited by examiner

*Primary Examiner* — James Jones
(74) *Attorney, Agent, or Firm* — McClure, Qualey & Rodack, LLP

(57) ABSTRACT

A photographing optical lens system includes, in order from an object side to an image side, a first lens element, a second lens element, a third lens element, a fourth lens element, a fifth lens element and a sixth lens element. The first lens element has negative refractive power. The second lens element has an image-side surface being convex in a paraxial region thereof. The third lens element has positive refractive power. The fourth lens element has negative refractive power. The sixth lens element with negative refractive power has an object-side surface being concave in a paraxial region thereof and an image-side surface being planar or convex in a paraxial region thereof.

30 Claims, 24 Drawing Sheets

PHOTOGRAPHING OPTICAL LENS SYSTEM, IMAGE CAPTURING APPARATUS AND ELECTRONIC DEVICE

RELATED APPLICATIONS

This application claims priority to Taiwan Application Serial Number 105117751, filed Jun. 4, 2016, which is herein incorporated by reference.

BACKGROUND

Technical Field

The present disclosure relates to a photographing optical lens system and an image capturing apparatus. More particularly, the present disclosure relates to a compact photographing optical lens system and an image capturing apparatus applicable to electronic devices.

Description of Related Art

With an increasing variety of applications of photographing modules, the standards for the specifications thereof are enhanced. In current market, the demands for miniaturization and high image quality are also increased. Furthermore, the field of view of the photographing modules are becoming larger so as to broaden the imaging range. However, limited by the surface shape and the material of the lens elements, the size of the conventional wide-angle lens assembly is bulky and cannot be reduced easily, which restricts the application scope thereof. Therefore, a lens assembly featured with a larger field of view, a compact size and a high image quality which can satisfy the specifications and demands of the future market is pursued. Thus, the lens assembly is favorable to be applied to vehicle cameras, all kinds of smart electronics, security monitoring devices, sports photography equipment, portable electronic devices, aerial photography devices, and so on.

SUMMARY

According to one aspect of the present disclosure, a photographing optical lens system includes, in order from an object side to an image side, a first lens element, a second lens element, a third lens element, a fourth lens element, a fifth lens element and a sixth lens element. The first lens element has negative refractive power. The second lens element has an image-side surface being convex in a paraxial region thereof. The third lens element has positive refractive power. The fourth lens element has negative refractive power. The sixth lens element with negative refractive power has an object-side surface being concave in a paraxial region thereof and an image-side surface being planar or convex in a paraxial region thereof. The photographing optical lens system has a total of six lens elements. When a curvature radius of an object-side surface of the third lens element is R5, a curvature radius of an image-side surface of the third lens element is R6, a curvature radius of an object-side surface of the fourth lens element is R7, a curvature radius of the object-side surface of the sixth lens element is R11, and a curvature radius of the image-side surface of the sixth lens element is R12, the following conditions are satisfied:

$-1.0 \le (R11-R12)/(R11+R12) < 0;$ $-1.50 < (R5+R6)/(R5-R6) < 3.50;$ and $|R6/R7| < 0.85.$ According to another aspect of the present disclosure, an image capturing apparatus includes the photographing optical lens system according to the aforementioned aspect and an image sensor, wherein the image sensor is disposed on an image surface of the photographing optical lens system.

According to yet another aspect of the present disclosure, an electronic device includes the image capturing apparatus according to the aforementioned aspect.

According to further another aspect of the present disclosure, a photographing optical lens system includes, in order from an object side to an image side, a first lens element, a second lens element, a third lens element, a fourth lens element, a fifth lens element and a sixth lens element. The first lens element has negative refractive power. The second lens element has an image-side surface being convex in a paraxial region thereof. The third lens element has positive refractive power. The fourth lens element has negative refractive power. The sixth lens element with negative refractive power has an object-side surface being concave in a paraxial region thereof and an image-side surface being planar or convex in a paraxial region thereof. The photographing optical lens system has a total of six lens elements. When a curvature radius of the object-side surface of the sixth lens element is R11, a curvature radius of the image-side surface of the sixth lens element is R12, an axial distance between the first lens element and the second lens element is T12, an axial distance between the fifth lens element and the sixth lens element is T56, a central thickness of the first lens element is CT1, and an axial distance between the image-side surface of the sixth lens element and an image surface is BL, the following conditions are satisfied:

$-1.0 \le (R11-R12)/(R11+R12) < 0;$ $0.90 < T12/CT1 < 9.0;$ and $0 < BL/T56 < 1.65.$ According to yet further another aspect of the present disclosure, a photographing optical lens system includes, in order from an object side to an image side, a first lens element, a second lens element, a third lens element, a fourth lens element, a fifth lens element and a sixth lens element. The first lens element has negative refractive power. The second lens element has an object-side surface being concave in a paraxial region thereof and an image-side surface being convex in a paraxial region thereof. The fourth lens element has an image-side surface being concave in a paraxial region thereof. The sixth lens element with negative refractive power has an object-side surface being concave in a paraxial region thereof and an image-side surface being planar or convex in a paraxial region thereof. The photographing optical lens system has a total of six lens elements. When a curvature radius of the object-side surface of the sixth lens element is R11, and a curvature radius of the image-side surface of the sixth lens element is R12, the following condition is satisfied:

$-1.0 \le (R11-R12)/(R11+R12) < 0.$

According to yet further another aspect of the present disclosure, an image capturing apparatus includes the photographing optical lens system according to the aforementioned aspect and an image sensor, wherein the image sensor is disposed on an image surface of the photographing optical lens system.

According to yet further another aspect of the present disclosure, an electronic device includes the image capturing apparatus according to the aforementioned aspect.

BRIEF DESCRIPTION OF THE DRAWINGS

The present disclosure can be more fully understood by reading the following detailed description of the embodiment, with reference made to the accompanying drawings as follows.

DETAILED DESCRIPTION

Figure 1:
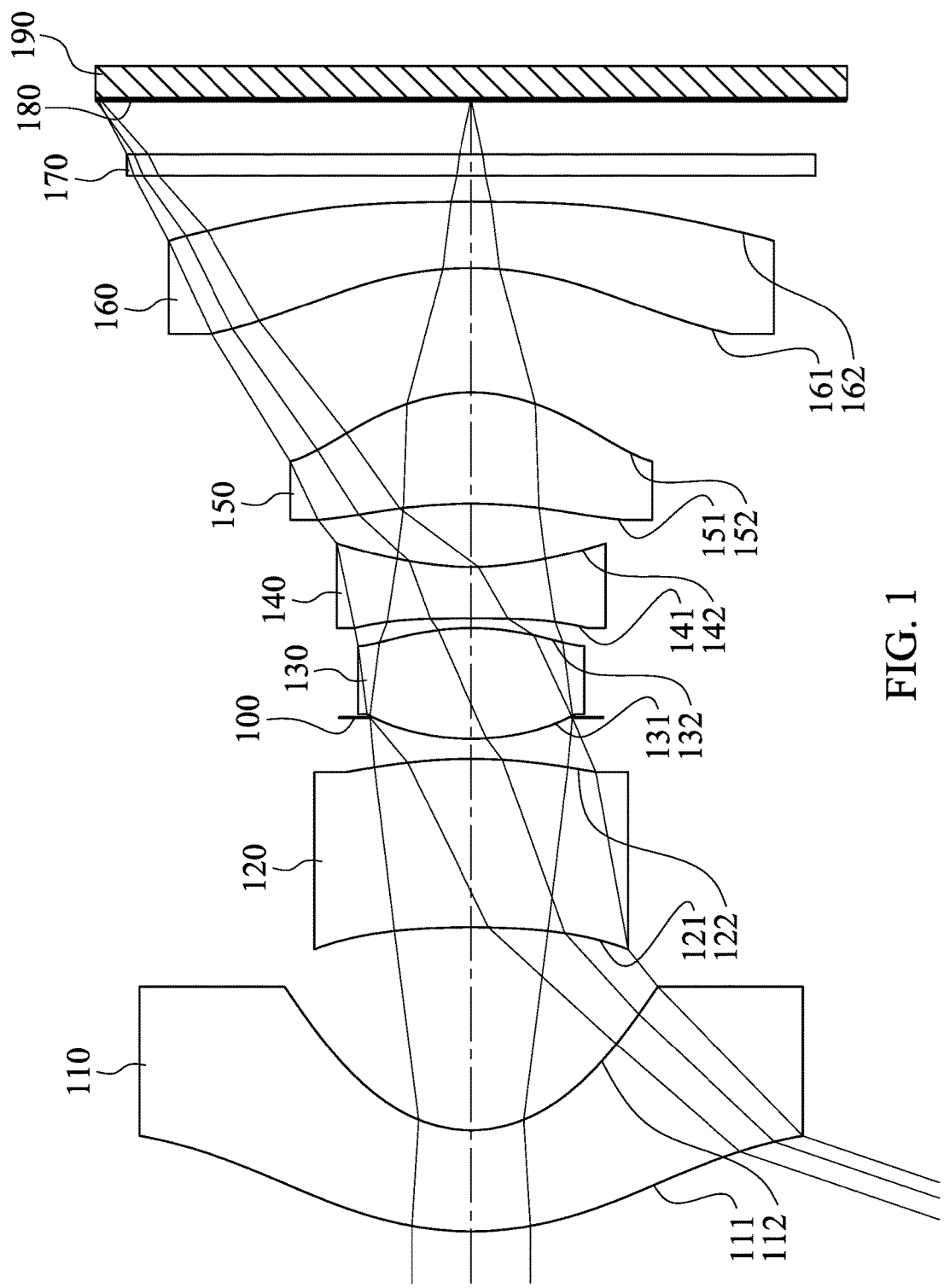
FIG. 1 is a schematic view of an image capturing apparatus according to the 1st embodiment of the present disclosure.

A photographing optical lens system includes, in order from an object side to an image side, a first lens element, a second lens element, a third lens element, a fourth lens element, a fifth lens element and a sixth lens element, wherein the photographing optical lens system has a total of six lens elements.

There is an air space between every two lens elements of the first lens element, the second lens element, the third lens element, the fourth lens element, the fifth lens element and the sixth lens element that are adjacent to each other. That is, each of the first through sixth lens elements is a single and non-cemented lens element, any two lens elements adjacent to each other are not cemented, and there is a space between the two lens elements. In other words, of the first lens element, the second lens element, the third lens element, the fourth lens element, the fifth lens element and the sixth lens element of the photographing optical lens system, there is a space in a paraxial region between every two lens elements that are adjacent to each other. Moreover, the manufacturing process of the cemented lenses is more complex than the non-cemented lenses. In particular, a second surface of one lens element and a first surface of the following lens element need to have accurate curvature to ensure these two lens elements will be highly cemented. However, during the cementing process, those two lens elements might not be highly cemented due to displacement and it is thereby not favorable for the image quality of the photographing optical lens system. Therefore, according to the photographing optical lens system of the present disclosure, an air space in a paraxial region between every two of the first lens element, the second lens element, the third lens element, the fourth lens element, the fifth lens element and the sixth lens element that are adjacent to each other avoids the problem generated by the cemented lens elements.

The first lens element with negative refractive power has an object-side surface being convex in a paraxial region thereof and can have an image-side surface being concave in a paraxial region thereof. Therefore, it is favorable to form a retro-focus structure, which enables the light rays of large field of view to enter into the photographing optical lens system.

The second lens element can have an object-side surface being concave in a paraxial region thereof and has an image-side surface being convex in a paraxial region thereof. Therefore, aberrations generated from the large field of view can be balanced, and the insufficient brightness of the peripheral image can be improved.

The third lens element can have positive refractive power. Therefore, the main light converging ability of the photographing optical lens system can be provided, which is favorable to reduce the total track length thereof.

The fourth lens element can have negative refractive power and has an image-side surface being concave in a paraxial region thereof. Therefore, the negative refractive power of the fourth lens element can be enhanced so as to balance the positive refractive power of the third lens element, and the chromatic aberration of the photographing optical lens system can be corrected.

The sixth lens element has negative refractive power. Therefore, the principal point of the photographing optical lens system can be shifted toward the object side so as to shorten the back focal length, and the total track length thereof can be accordingly controlled. The sixth lens element has an object-side surface being concave in a paraxial region thereof and an image-side surface being planar or convex in a paraxial region thereof. Therefore, aberrations of the image side of the photographing optical lens system can be corrected, and the light sensing area thereof can be increased so as to enhance the image brightness. Furthermore, at least one of the object-side surface and the image-side surface of the sixth lens element includes at least one inflection point. Therefore, aberrations of the off-axis field caused by the large field of view can be corrected.

When a curvature radius of the object-side surface of the sixth lens element is R11, and a curvature radius of the image-side surface of the sixth lens element is R12, the following condition is satisfied: −1.0≤(R11−R12)/(R11+R12)<0. Therefore, the shape of the sixth lens element can be adjusted so as to enhance the symmetry of the photographing optical lens system and to afford the photographing optical lens system a sufficient light sensing area. Accordingly, aberrations can be further corrected, and a better image quality can be obtained.

When a curvature radius of an object-side surface of the third lens element is R5, and a curvature radius of the image-side surface of the third lens element is R6, the following condition can be satisfied: −1.50<(R5+R6)/(R5−R6)<3.50. Therefore, the shape of the third lens element can be effectively controlled, which is favorable for molding the third lens element and correcting the spherical aberration of the photographing optical lens system. Preferably, the following condition can be satisfied: −1.0<(R5+R6)/(R5−R6)<1.0. More preferably, the following condition can be satisfied: −0.45<(R5+R6)/(R5−R6)<0.45.

When the curvature radius of the image-side surface of the third lens element is R6, and a curvature radius of an object-side surface of the fourth lens element is R7, the following condition can be satisfied: |R6/R7|<0.85. Therefore, the curvature configuration of the third lens element and the fourth lens element can be adjusted, which is favorable for assembling the lens elements.

The photographing optical lens system can further include a stop, the stop can be an aperture stop, and the stop can be disposed between the second lens element and the third lens element. When an axial distance between the stop and the image-side surface of the sixth lens element is SD, and an axial distance between the object-side surface of the first lens element and the image-side surface of the sixth lens element is TD, the following condition can be satisfied: 0.40<SD/TD<0.60. Therefore, the position of the stop is proper, which enables the light rays of large field of view to enter into the photographing optical lens system and can suppress the total track length thereof, so that the wide-angle property can be reinforced.

When a composite focal length of lens elements between an imaged object and the stop is ff, and a composite focal length of lens elements between the stop and an image surface is fr, the following condition can be satisfied: |fr/ff|<0.67. Therefore, the refractive power configuration of the object side and the image side of the photographing optical lens system can be adjusted, which provides the photographing optical lens system with the wide-angle characteristic.

When an axial distance between the image-side surface of the sixth lens element and the image surface is BL, and an axial distance between the object-side surface of the first lens element and the image surface is TL, the following condition can be satisfied: 0<BL/TL<0.20. Therefore, the back focal length of the photographing optical lens system can be controlled, which is favorable to correct Petzval field curvature and can further control the total track length thereof. Preferably, the following condition can be satisfied: 0<BL/TL<0.15.

When a focal length of the photographing optical lens system is f, and a central thickness of the second lens element is CT2, the following condition can be satisfied: 0<f/CT2<4.0. Therefore, the wide-angle with short focal length property can be reinforced, which is favorable for reducing the axial chromatic aberration. Furthermore, the central thickness of the second lens element can be properly adjusted, so that the progress of the light rays of large field of view of the first lens element can be moderated. Preferably, the following condition can be satisfied: 0<f/CT2<3.0.

When an Abbe number of the second lens element is V2, the following condition can be satisfied: V2<25.0. Therefore, the chromatic aberration of the photographing optical lens system can be corrected, which enables the imaging points of light rays in different wavelength range to be more concentrated. Furthermore, the progress of the light rays of large field of view of the first lens element can be moderated.

When a refractive power of the first lens element is P1, a refractive power of the second lens element is P2, a refractive power of the third lens element is P3, a refractive power of the fourth lens element is P4, a refractive power of the fifth lens element is P5, and a refractive power of the sixth lens element is P6, the following conditions can be satisfied: |P3|>|P1|; |P3|>|P2|; |P3|>|P5|; |P3|>|P6|; |P4|>|P1|; |P4|>|P2|; |P4|>|P5|; and |P4|>|P6|. Therefore, the refractive power configuration of the lens elements can be effectively adjusted, so that the ability for correcting aberrations of the object side and the image side of the photographing optical lens system can be reinforced, and the photosensitivity thereof can be reduced. Specifically, P1 is a ratio of the focal length of the photographing optical lens system and a focal length of the first lens element, P2 is a ratio of the focal length of the photographing optical lens system and a focal length of the second lens element, P3 is a ratio of the focal length of the photographing optical lens system and a focal length of the third lens element, P4 is a ratio of the focal length of the photographing optical lens system and a focal length of the fourth lens element, P5 is a ratio of the focal length of the photographing optical lens system and a focal length of the fifth lens element, and P6 is a ratio of the focal length of the photographing optical lens system and a focal length of the sixth lens element.

When an axial distance between the first lens element and the second lens element is T12, an axial distance between the second lens element and the third lens element is T23, an axial distance between the third lens element and the fourth lens element is T34, an axial distance between the fourth lens element and the fifth lens element is T45, and an axial distance between the fifth lens element and the sixth lens element is T56, the following conditions can be satisfied: T12>T23; T12>T34; T12>T45; T56>T23; T56>T34; and T56>T45. Therefore, the axial distance between every two lens element adjacent to each other can be adjusted, which is favorable to enhance the symmetry of the photographing optical lens system and improve the image quality.

When the curvature radius of the object-side surface of the sixth lens element is R11, a vertical distance between a maximum effective diameter position on the object-side surface of the sixth lens element and an optical axis is Y61, the following condition can be satisfied: $-1.85 < R11/Y61 < -0.50$. Therefore, the surface curvature and the maximum effective diameter position of the object-side surface of the sixth lens element can be properly adjusted, which can broaden the imaging range and is favorable for correcting aberrations of the off-axis field. Preferably, the following condition can be satisfied: $-1.50 < R11/Y61 < -0.50$.

When the axial distance between the first lens element and the second lens element is T12, and a central thickness of the first lens element is CT1, the following condition can be satisfied: $0.90 < T12/CT1 < 9.0$. Therefore, the axial distance between the first lens element and the second lens element is sufficient, which is favorable for assembling the photographing optical lens system.

When the axial distance between the image-side surface of the sixth lens element and the image surface is BL, and the axial distance between the fifth lens element and the sixth lens element is T56, the following condition can be satisfied: $0 < BL/T56 < 1.65$. Therefore, the axial distance between the fifth lens element and the sixth lens element can be adjusted so as to provide the image side of the photographing optical lens system a sufficient space for integrating light rays, and the back focal length thereof can be further reduced.

When a curvature radius of the image-side surface of the first lens element is R2, and the curvature radius of the object-side surface of the sixth lens element is R11, the following condition can be satisfied: $-1.0 < (R2+R11)/(R2-R11) < 1.0$. Therefore, the curvature configuration of lens elements of the object side and the image side of the photographing optical lens system can be properly adjusted, which can enhance the symmetry of the retro-focus structure, reduce the photosensitivity of the photographing optical lens system and improve the image quality. Preferably, the following condition can be satisfied: $-0.60 < (R2+R11)/(R2-R11) < 0.50$.

When an Abbe number of the fourth lens element is V4, the following condition can be satisfied: $V4 < 25.0$. Therefore, the chromatic aberration of the photographing optical lens system can be effectively corrected, so that the overlap of images can be avoided.

When a half of a maximum field of view of the photographing optical lens system is HFOV, the following condition can be satisfied: $|1/\tan(HFOV)| < 0.80$. Therefore, the field of view can be effectively increased, and the application scope of the photographing optical lens system can be broadened.

According to the photographing optical lens system of the present disclosure, the lens elements thereof can be made of a plastic or a glass material. When the lens elements are made of a plastic material, the manufacturing cost can be effectively reduced. When the lens elements are made of a glass material, the distribution of the refractive powers of the photographing optical lens system may be more flexible to design. Furthermore, surfaces of each lens element can be arranged to be aspheric (ASP), since the aspheric surface of the lens element is easy to form a shape other than spherical surface so as to have more controllable variables for eliminating aberrations thereof, and to further decrease the required number of the lens elements. Therefore, the total track length of the photographing optical lens system can also be reduced.

According to the photographing optical lens system of the present disclosure, each of an object-side surface and an image-side surface has a paraxial region and an off-axis region. The paraxial region refers to the region of the surface where light rays travel close to the optical axis, and the off-axis region refers to the region of the surface away from the paraxial region. Particularly, if not stated otherwise, when the lens element has a convex surface, it indicates that the surface is convex in the paraxial region thereof; when the lens element has a concave surface, it indicates that the surface is concave in the paraxial region thereof. According to the photographing optical lens system of the present disclosure, the positive refractive power or the negative refractive power of a lens element or the focal length of the lens element, that is, may refer to the refractive power or the focal length in the paraxial region of the lens element.

According to the photographing optical lens system of the present disclosure, the image surface of the photographing optical lens system, based on the corresponding image sensor, can be flat or curved. In particular, the image surface can be a curved surface being concave facing towards the object side.

According to the photographing optical lens system of the present disclosure, the photographing optical lens system can include at least one stop, such as an aperture stop, a glare stop or a field stop. Said glare stop or said field stop is for eliminating the stray light and thereby improving the image resolution thereof.

According to the photographing optical lens system of the present disclosure, an aperture stop can be configured as a front stop or a middle stop. The front stop disposed between an imaged object and the first lens element can provide a longer distance from an exit pupil of the photographing optical lens system to the image surface and thereby improves the image-sensing efficiency of an image sensor. A middle stop disposed between the first lens element and the image surface is favorable for enlarging the field of view of the photographing optical lens system and thereby provides a wider field of view for the same.

According to the photographing optical lens system of the present disclosure, the photographing optical lens system can be optionally applied to moving focus optical systems, and is featured with good ability for correcting aberrations and high image quality. The photographing optical lens system of the present disclosure also can be applied to 3D (three-dimensional) image capturing applications, in products such as digital cameras, mobile devices, digital tablets, smart TV, surveillance devices, game consoles with motion sensing function, vehicle cameras such as driving recording systems and rear view camera systems, aerial photography devices, sports photography equipment, all kinds of smart electronics and wearable devices.

According to the present disclosure, an image capturing apparatus is provided. The image capturing apparatus includes the aforementioned photographing optical lens system and an image sensor, wherein the image sensor is disposed at the image side of the aforementioned photographing optical lens system, that is, the image sensor can be disposed on or near the image surface of the aforementioned photographing optical lens system. In the photographing optical lens system, with the configuration of the lens elements, the photographing optical lens system is featured with a larger field of view, a compact size and high image quality. Preferably, the image capturing apparatus can further include a barrel member, a holding member or a combination thereof.

According to the present disclosure, an electronic device is provided. The electronic device includes the aforementioned image capturing apparatus. Therefore, the electronic device is featured with a larger field of view, a compact size and high image quality. Preferably, the electronic device can further include but not limited to a control unit, a display, a storage unit, a random access memory unit (RAM), a read only memory unit (ROM) or a combination thereof.

According to the above description of the present disclosure, the following 1st-13th specific embodiments are provided for further explanation.

1st Embodiment

Figure 2:
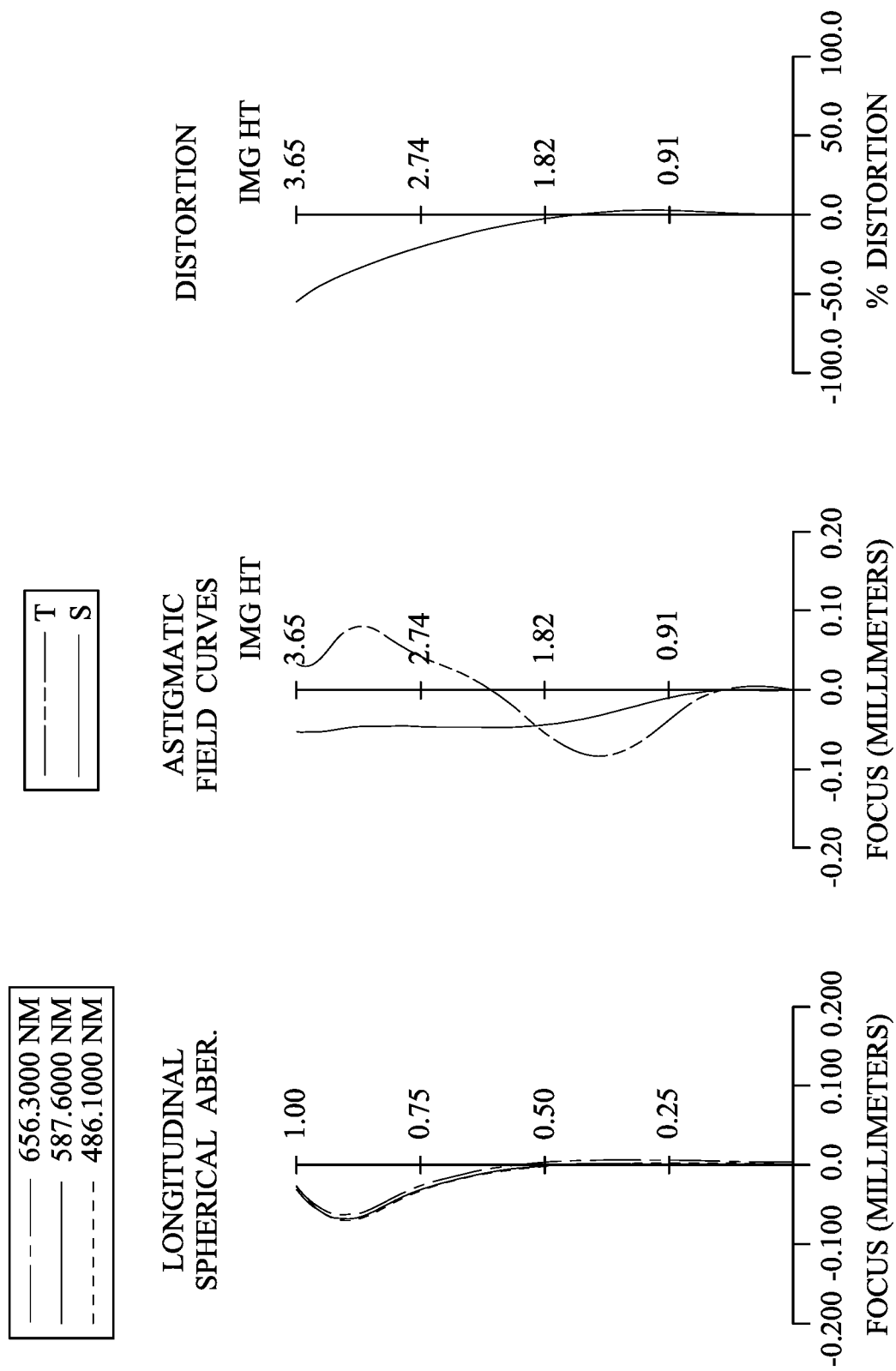
FIG. 2 shows spherical aberration curves, astigmatic field curves and a distortion curve of the image capturing apparatus according to the 1st embodiment.

FIG. 1 is a schematic view of an image capturing apparatus according to the 1st embodiment of the present disclosure. FIG. 2 shows spherical aberration curves, astigmatic field curves and a distortion curve of the image capturing apparatus according to the 1st embodiment. In FIG. 1, the image capturing apparatus includes a photographing optical lens system (its reference numeral is omitted) and an image sensor 190. The photographing optical lens system includes, in order from an object side to an image side, a first lens element 110, a second lens element 120, an aperture stop 100, a third lens element 130, a fourth lens element 140, a fifth lens element 150, a sixth lens element 160, an IR-cut filter 170 and an image surface 180, wherein the image sensor 190 is disposed on the image surface 180 of the photographing optical lens system. The photographing optical lens system has a total of six lens elements (110-160), and there is an air space between every two lens elements of the first lens element 110, the second lens element 120, the third lens element 130, the fourth lens element 140, the fifth lens element 150 and the sixth lens element 160 that are adjacent to each other.

The first lens element 110 with negative refractive power has an object-side surface 111 being convex in a paraxial region thereof and an image-side surface 112 being concave in a paraxial region thereof. The first lens element 110 is made of a plastic material, and has the object-side surface 111 and the image-side surface 112 being both aspheric.

The second lens element 120 with positive refractive power has an object-side surface 121 being concave in a paraxial region thereof and an image-side surface 122 being convex in a paraxial region thereof. The second lens element 120 is made of a plastic material, and has the object-side surface 121 and the image-side surface 122 being both aspheric.

The third lens element 130 with positive refractive power has an object-side surface 131 being convex in a paraxial region thereof and an image-side surface 132 being convex in a paraxial region thereof. The third lens element 130 is made of a plastic material, and has the object-side surface 131 and the image-side surface 132 being both aspheric.

The fourth lens element 140 with negative refractive power has an object-side surface 141 being concave in a paraxial region thereof and an image-side surface 142 being concave in a paraxial region thereof. The fourth lens element 140 is made of a plastic material, and has the object-side surface 141 and the image-side surface 142 being both aspheric.

The fifth lens element 150 with positive refractive power has an object-side surface 151 being concave in a paraxial region thereof and an image-side surface 152 being convex in a paraxial region thereof. The fifth lens element 150 is made of a plastic material, and has the object-side surface 151 and the image-side surface 152 being both aspheric.

The sixth lens element 160 with negative refractive power has an object-side surface 161 being concave in a paraxial region thereof and an image-side surface 162 being convex in a paraxial region thereof. The sixth lens element 160 is made of a plastic material, and has the object-side surface 161 and the image-side surface 162 being both aspheric. Furthermore, the object-side surface 161 and the image-side surface 162 of the sixth lens element 160 include at least one inflection point.

The IR-cut filter 170 is made of a glass material and located between the sixth lens element 160 and the image surface 180, and will not affect the focal length of the photographing optical lens system.

The equation of the aspheric surface profiles of the aforementioned lens elements of the 1st embodiment is expressed as follows:

$$X(Y) = (Y^2/R)/(1 + sqrt(1 - (1+k) \times (Y/R)^2)) + \sum_i (Ai) \times (Y^i),$$

where,

X is the relative distance between a point on the aspheric surface spaced at a distance Y from an optical axis and the tangential plane at the aspheric surface vertex on the optical axis;

Y is the vertical distance from the point on the aspheric surface to the optical axis;

R is the curvature radius;

k is the conic coefficient; and

Ai is the i-th aspheric coefficient.

In the photographing optical lens system according to the 1st embodiment, when a focal length of the photographing optical lens system is f, an f-number of the photographing optical lens system is Fno, and half of a maximum field of view of the photographing optical lens system is HFOV, these parameters have the following values: f=2.74 mm; Fno=2.40; and HFOV=71.1 degrees.

In the photographing optical lens system according to the 1st embodiment, when the half of the maximum field of view of the photographing optical lens system is HFOV, the following condition is satisfied: |1/tan(HFOV)|=0.34.

In the photographing optical lens system according to the 1st embodiment, when an Abbe number of the second lens element 120 is V2, the following condition is satisfied: V2=23.3.

In the photographing optical lens system according to the 1st embodiment, when an Abbe number of the fourth lens element 140 is V4, the following condition is satisfied: V4=20.4.

In the photographing optical lens system according to the 1st embodiment, when an axial distance between the first lens element 110 and the second lens element 120 is T12, and a central thickness of the first lens element 110 is CT1, the following condition is satisfied: T12/CT1=2.02.

In the photographing optical lens system according to the 1st embodiment, when an axial distance between the image-side surface 162 of the sixth lens element 160 and the image surface 180 is BL, and an axial distance between the fifth lens element 150 and the sixth lens element 160 is T56, the following condition is satisfied: BL/T56=0.82.

In the photographing optical lens system according to the 1st embodiment, when the axial distance between the image-side surface 162 of the sixth lens element 160 and the image surface 180 is BL, and an axial distance between the object-side surface 111 of the first lens element 110 and the image surface 180 is TL, the following condition is satisfied: BL/TL=0.09.

In the photographing optical lens system according to the 1st embodiment, when an axial distance between the aperture stop 100 and the image-side surface 162 of the sixth lens element 160 is SD, and an axial distance between the object-side surface 111 of the first lens element 110 and the image-side surface 162 of the sixth lens element 160 is TD, the following condition is satisfied: SD/TD=0.50.

In the photographing optical lens system according to the 1st embodiment, when a curvature radius of the image-side surface 132 of the third lens element 130 is R6, and a curvature radius of the object-side surface 141 of the fourth lens element 140 is R7, the following condition is satisfied: |R6/R7|=0.07.

In the photographing optical lens system according to the 1st embodiment, when a curvature radius of the object-side surface 131 of the third lens element 130 is R5, and the curvature radius of the image-side surface 132 of the third lens element 130 is R6, the following condition is satisfied: (R5+R6)/(R5−R6)=0.02.

In the photographing optical lens system according to the 1st embodiment, when a curvature radius of the object-side surface 161 of the sixth lens element 160 is R11, and a curvature radius of the image-side surface 162 of the sixth lens element 160 is R12, the following condition is satisfied: (R11−R12)/(R11+R12)=−0.70.

In the photographing optical lens system according to the 1st embodiment, when a curvature radius of the image-side surface 112 of the first lens element 110 is R2, and the curvature radius of the object-side surface 161 of the sixth lens element 160 is R11, the following condition is satisfied: (R2+R11)/(R2−R11)=−0.47.

Figure 21:
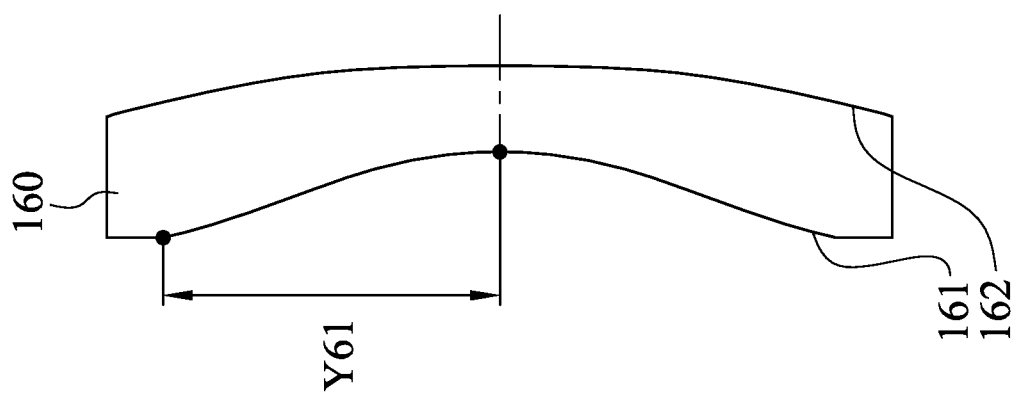
FIG. 21 shows a schematic view of the parameter Y61 of a sixth lens element according to the 1st embodiment.

FIG. 21 shows a schematic view of a parameter Y61 of the sixth lens element 160 according to the 1st embodiment. When the curvature radius of the object-side surface 161 of the sixth lens element 160 is R11, and a vertical distance between a maximum effective diameter position on the object-side surface 161 of the sixth lens element 160 and the optical axis is Y61, the following condition is satisfied: R11/Y61=−1.42.

In the photographing optical lens system according to the 1st embodiment, when the focal length of the photographing optical lens system is f, and a central thickness of the second lens element 120 is CT2, the following condition is satisfied: f/CT2=1.68.

In the photographing optical lens system according to the 1st embodiment, when a composite focal length of lens elements between an imaged object (not shown) and the aperture stop 100 is ff (in the 1st embodiment, ff is a composite focal length of the first lens element 110 and second lens element 120), and a composite focal length of lens elements between the aperture stop 100 and the image surface 180 is fr (in the 1st embodiment, fr is a composite focal length of the third lens element 130, the fourth lens element 140, the fifth lens element 150 and the sixth lens element 160), the following condition is satisfied: |fr/ff|=0.40.

In the photographing optical lens system according to the 1st embodiment, when a refractive power of the first lens element 110 is P1 (P1 equals to a ratio of the focal length of the photographing optical lens system and a focal length of the first lens element 110, i.e., P1=f/f1), a refractive power of the second lens element 120 is P2 (P2 equals to a ratio of the focal length of the photographing optical lens system and a focal length of the second lens element 120, i.e., P2=f/f2), a refractive power of the third lens element 130 is P3 (P3 equals to a ratio of the focal length of the photographing optical lens system and a focal length of the third lens element 130, i.e., P3=f/f3), a refractive power of the fourth lens element 140 is P4 (P4 equals to a ratio of the focal length of the photographing optical lens system and a focal length of the fourth lens element 140, i.e., P4=f/f4), a refractive power of the fifth lens element 150 is P5 (P5 equals to a ratio of the focal length of the photographing optical lens system and a focal length of the fifth lens element 150, i.e., P5=f/f5), and a refractive power of the sixth lens element 160 is P6 (P6 equals to a ratio of the focal length of the photographing optical lens system and a focal length of the sixth lens element 160, i.e., P6=f/f6), the following conditions are satisfied: |P3|>|P1|; |P3|>|P2|; |P3|>|P5|; |P3|>|P6|; |P4|>|P1|; |P4|>|P2|; |P4|>|P5|; and |P4|>|P6|.

In the photographing optical lens system according to the 1st embodiment, when the axial distance between the first lens element 110 and the second lens element 120 is T12, an axial distance between the second lens element 120 and the third lens element 130 is T23, an axial distance between the third lens element 130 and the fourth lens element 140 is T34, an axial distance between the fourth lens element 140 and the fifth lens element 150 is T45, and the axial distance between the fifth lens element 150 and the sixth lens element 160 is T56, the following conditions are satisfied: T12>T23; T12>T34; T12>T45; T56>T23; T56>T34; and T56>T45.

The detailed optical data of the 1st embodiment are shown in Table 1 and the aspheric surface data are shown in Table 2 below.

TABLE 1

1st Embodiment
f = 2.74 mm, Fno = 2.40, HFOV = 71.1 deg.

| Surface # | | Curvature Radius | Thickness | Material | Index | Abbe # | Focal Length |
|---|---|---|---|---|---|---|---|
| 0 | Object | Plano | Infinity | | | | |
| 1 | Lens 1 | 3.214 ASP | 0.980 | Plastic | 1.544 | 55.9 | −4.84 |
| 2 | | 1.291 ASP | 1.976 | | | | |
| 3 | Lens 2 | −8.194 ASP | 1.637 | Plastic | 1.639 | 23.3 | 19.53 |
| 4 | | −5.330 ASP | 0.401 | | | | |
| 5 | Ape. Stop | Plano | −0.205 | | | | |
| 6 | Lens 3 | 2.508 ASP | 1.075 | Plastic | 1.544 | 55.9 | 2.45 |
| 7 | | −2.405 ASP | 0.092 | | | | |
| 8 | Lens 4 | −32.258 ASP | 0.499 | Plastic | 1.660 | 20.4 | −3.82 |
| 9 | | 2.750 ASP | 0.620 | | | | |
| 10 | Lens 5 | −5.210 ASP | 1.079 | Plastic | 1.544 | 55.9 | 4.37 |
| 11 | | −1.750 ASP | 1.211 | | | | |
| 12 | Lens 6 | −3.591 ASP | 0.645 | Plastic | 1.650 | 21.5 | −6.83 |
| 13 | | −20.047 ASP | 0.250 | | | | |
| 14 | IR-cut filter | Plano | 0.210 | Glass | 1.517 | 64.2 | — |

TABLE 1-continued

1st Embodiment
f = 2.74 mm, Fno = 2.40, HFOV = 71.1 deg.

| Surface # | | Curvature Radius | Thickness | Material | Index | Abbe # | Focal Length |
|---|---|---|---|---|---|---|---|
| 15 | | Plano | 0.528 | | | | |
| 16 | Image | Plano | — | | | | |

Note:
Reference wavelength is 587.6 nm (d-line).

TABLE 2

Aspheric Coefficients

| Surface # | 1 | 2 | 3 | 4 | 6 | 7 |
|---|---|---|---|---|---|---|
| k = | −8.4811E−01 | −8.6526E−01 | −8.4016E+01 | −4.4709E+01 | −7.0373E+00 | −3.2165E+00 |
| A4 = | −8.8434E−04 | 1.4975E−02 | −2.4964E−02 | −2.4502E−02 | 7.7924E−02 | 4.6759E−02 |
| A6 = | −1.5726E−03 | −4.2952E−03 | 3.7438E−03 | −2.7093E−03 | −2.8041E−02 | −7.6043E−02 |
| A8 = | 1.1048E−04 | 1.6034E−03 | −2.6085E−03 | 1.2525E−02 | 9.2952E−03 | 6.2610E−02 |
| A10 = | 3.7551E−07 | −4.4529E−04 | 8.4511E−04 | −5.6567E−03 | 1.3218E−02 | −1.2950E−02 |
| A12 = | −1.8370E−07 | 2.5238E−06 | −8.9426E−05 | 1.3053E−03 | −6.0121E−03 | 5.2185E−03 |

| Surface # | 8 | 9 | 10 | 11 | 12 | 13 |
|---|---|---|---|---|---|---|
| k = | 9.0000E+01 | −1.3462E+01 | −5.8225E+00 | −8.0813E−01 | −7.1352E−01 | −2.1347E+01 |
| A4 = | −2.5037E−02 | 1.5865E−02 | −1.0967E−02 | 1.4625E−02 | −1.0721E−02 | 1.2351E−02 |
| A6 = | −7.5945E−02 | −2.1706E−02 | 1.2851E−02 | −1.4034E−02 | −1.4362E−03 | −1.9316E−02 |
| A8 = | 6.9398E−02 | 1.3071E−02 | −2.6787E−03 | 1.9237E−02 | 7.3560E−03 | 8.7113E−03 |
| A10 = | −1.6744E−02 | 1.3643E−03 | 5.1700E−04 | −9.1965E−03 | −3.2262E−03 | −1.9777E−03 |
| A12 = | −2.4297E−04 | −2.7748E−03 | −9.4089E−05 | 2.2327E−03 | 6.3266E−04 | 2.4319E−04 |
| A14 = | 1.1674E−15 | 5.4299E−04 | 1.3189E−15 | −2.1281E−04 | −5.9707E−05 | −1.5365E−05 |
| A16 = | | | | | 2.1952E−06 | 3.8905E−07 |

In Table 1, the curvature radius, the thickness and the focal length are shown in millimeters (mm). Surface numbers 0-16 represent the surfaces sequentially arranged from the object-side to the image-side along the optical axis. In Table 2, k represents the conic coefficient of the equation of the aspheric surface profiles. A4-A16 represent the aspheric coefficients ranging from the 4th order to the 16th order. The tables presented below for each embodiment are the corresponding schematic parameter and aberration curves, and the definitions of the tables are the same as Table 1 and Table 2 of the 1st embodiment. Therefore, an explanation in this regard will not be provided again.

2nd Embodiment

Figure 3:
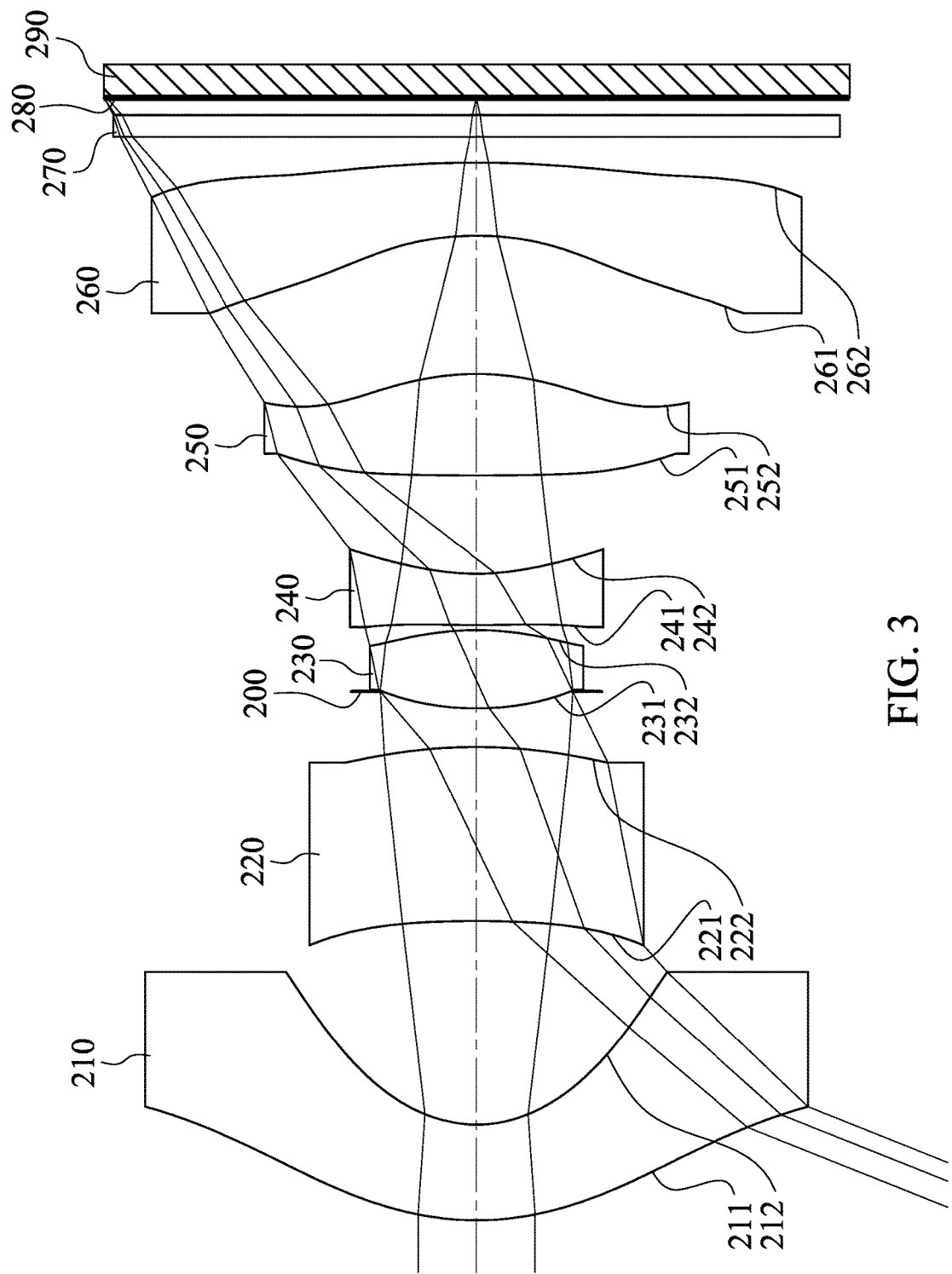
FIG. 3 is a schematic view of an image capturing apparatus according to the 2nd embodiment of the present disclosure.
Figure 4:
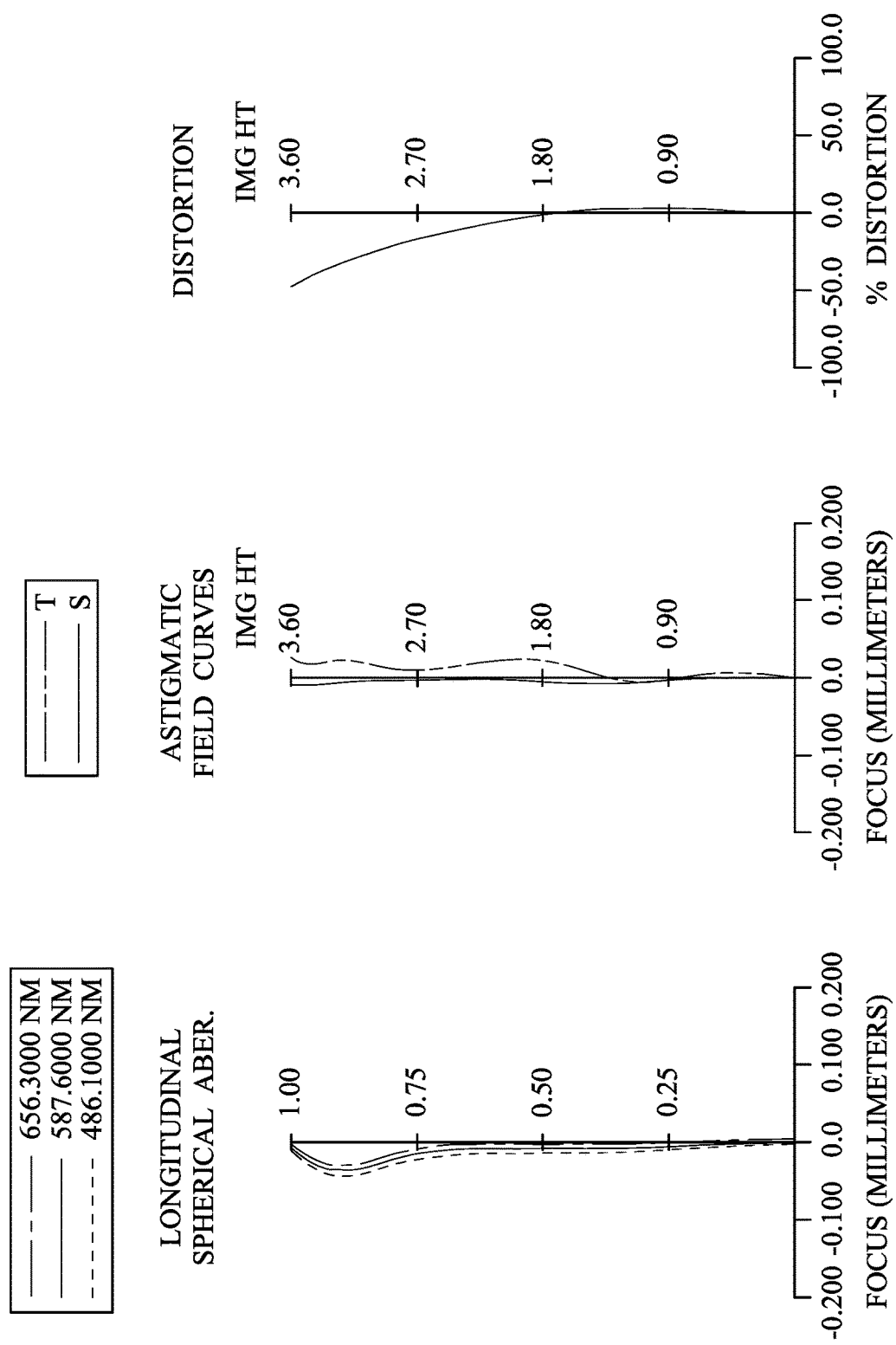
FIG. 4 shows spherical aberration curves, astigmatic field curves and a distortion curve of the image capturing apparatus according to the 2nd embodiment.

FIG. 3 is a schematic view of an image capturing apparatus according to the 2nd embodiment of the present disclosure. FIG. 4 shows spherical aberration curves, astigmatic field curves and a distortion curve of the image capturing apparatus according to the 2nd embodiment. In FIG. 3, the image capturing apparatus includes a photographing optical lens system (its reference numeral is omitted) and an image sensor 290. The photographing optical lens system includes, in order from an object side to an image side, a first lens element 210, a second lens element 220, an aperture stop 200, a third lens element 230, a fourth lens element 240, a fifth lens element 250, a sixth lens element 260, an IR-cut filter 270 and an image surface 280, wherein the image sensor 290 is disposed on the image surface 280 of the photographing optical lens system. The photographing optical lens system has a total of six lens elements (210-260), and there is an air space between every two lens elements of the first lens element 210, the second lens element 220, the third lens element 230, the fourth lens element 240, the fifth lens element 250 and the sixth lens element 260 that are adjacent to each other.

The first lens element 210 with negative refractive power has an object-side surface 211 being convex in a paraxial region thereof and an image-side surface 212 being concave in a paraxial region thereof. The first lens element 210 is made of a plastic material, and has the object-side surface 211 and the image-side surface 212 being both aspheric.

The second lens element 220 with positive refractive power has an object-side surface 221 being concave in a paraxial region thereof and an image-side surface 222 being convex in a paraxial region thereof. The second lens element 220 is made of a plastic material, and has the object-side surface 221 and the image-side surface 222 being both aspheric.

The third lens element 230 with positive refractive power has an object-side surface 231 being convex in a paraxial region thereof and an image-side surface 232 being convex in a paraxial region thereof. The third lens element 230 is made of a plastic material, and has the object-side surface 231 and the image-side surface 232 being both aspheric.

The fourth lens element 240 with negative refractive power has an object-side surface 241 being convex in a paraxial region thereof and an image-side surface 242 being concave in a paraxial region thereof. The fourth lens element 240 is made of a plastic material, and has the object-side surface 241 and the image-side surface 242 being both aspheric.

The fifth lens element 250 with positive refractive power has an object-side surface 251 being convex in a paraxial region thereof and an image-side surface 252 being convex in a paraxial region thereof. The fifth lens element 250 is made of a plastic material, and has the object-side surface 251 and the image-side surface 252 being both aspheric.

The sixth lens element 260 with negative refractive power has an object-side surface 261 being concave in a paraxial region thereof and an image-side surface 262 being convex in a paraxial region thereof. The sixth lens element 260 is made of a plastic material, and has the object-side surface 261 and the image-side surface 262 being both aspheric. Furthermore, the object-side surface 261 and the image-side surface 262 of the sixth lens element 260 include at least one inflection point.

The IR-cut filter 270 is made of a glass material and located between the sixth lens element 260 and the image surface 280, and will not affect the focal length of the photographing optical lens system.

The detailed optical data of the 2nd embodiment are shown in Table 3 and the aspheric surface data are shown in Table 4 below.

In the 2nd embodiment, the equation of the aspheric surface profiles of the aforementioned lens elements is the same as the equation of the 1st embodiment. Also, the definitions of these parameters shown in the following table are the same as those stated in the 1st embodiment with corresponding values for the 2nd embodiment, so an explanation in this regard will not be provided again.

Moreover, these parameters can be calculated from Table 3 and Table 4 as the following values and satisfy the following conditions:

| 2nd Embodiment | | | |
|---|---|---|---|
| f [mm] | 2.75 | SD/TD | 0.50 |
| Fno | 2.43 | |R6/R7| | 0.16 |
| HFOV [deg.] | 68.2 | (R5 + R6)/(R5 − R6) | 0.02 |
| |1/tan(HFOV)| | 0.40 | (R11 − R12)/(R11 + R12) | −0.60 |

TABLE 3

2nd Embodiment
f = 2.75 mm, Fno = 2.43, HFOV = 68.2 deg.

| Surface # | | Curvature Radius | Thickness | Material | Index | Abbe # | Focal Length |
|---|---|---|---|---|---|---|---|
| 0 | Object | Plano | Infinity | | | | |
| 1 | Lens 1 | 2.864 ASP | 0.922 | Plastic | 1.544 | 55.9 | −5.18 |
| 2 | | 1.259 ASP | 1.970 | | | | |
| 3 | Lens 2 | −10.353 ASP | 1.682 | Plastic | 1.639 | 23.3 | 16.58 |
| 4 | | −5.566 ASP | 0.535 | | | | |
| 5 | Ape. Stop | Plano | −0.162 | | | | |
| 6 | Lens 3 | 2.789 ASP | 0.756 | Plastic | 1.544 | 55.9 | 2.63 |
| 7 | | −2.661 ASP | 0.049 | | | | |
| 8 | Lens 4 | 16.273 ASP | 0.493 | Plastic | 1.660 | 20.4 | −4.22 |
| 9 | | 2.351 ASP | 0.954 | | | | |
| 10 | Lens 5 | 24.390 ASP | 0.978 | Plastic | 1.544 | 55.9 | 4.60 |
| 11 | | −2.745 ASP | 1.337 | | | | |
| 12 | Lens 6 | −3.414 ASP | 0.705 | Plastic | 1.650 | 21.5 | −7.17 |
| 13 | | −13.766 ASP | 0.250 | | | | |
| 14 | IR-cut filter | Plano | 0.210 | Glass | 1.517 | 64.2 | — |
| 15 | | Plano | 0.166 | | | | |
| 16 | Image | Plano | — | | | | |

Note:
Reference wavelength is 587.6 nm (d-line).

TABLE 4

Aspheric Coefficients

| Surface # | 1 | 2 | 3 | 4 | 6 | 7 |
|---|---|---|---|---|---|---|
| k = | −9.2536E−01 | −8.6696E−01 | −8.8333E+01 | −9.3955E+00 | −9.2478E+00 | −2.8069E+00 |
| A4 = | −8.8434E−04 | 1.4975E−02 | −2.3205E−02 | −1.4270E−02 | 6.7344E−02 | 6.2813E−02 |
| A6 = | −1.5726E−03 | −4.2952E−03 | 2.9398E−03 | −2.1565E−03 | −2.2460E−02 | −1.0179E−01 |
| A8 = | 1.1048E−04 | 1.6034E−03 | −2.7335E−03 | 7.5357E−03 | 2.1687E−03 | 7.6945E−02 |
| A10 = | 3.7551E−07 | −4.4529E−04 | 9.5603E−04 | −4.3006E−03 | 1.8041E−02 | −1.4525E−02 |
| A12 = | −1.8370E−07 | 2.5238E−06 | −8.9426E−05 | 1.3053E−03 | −6.0121E−03 | 5.2185E−03 |

| Surface # | 8 | 9 | 10 | 11 | 12 | 13 |
|---|---|---|---|---|---|---|
| k = | 9.0000E+01 | −1.0237E+01 | −6.0426E+01 | −7.7147E−01 | −6.1820E−01 | −9.0000E+01 |
| A4 = | −2.5037E−02 | 1.5865E−02 | −1.9085E−02 | −1.0947E−02 | −8.6315E−02 | −1.5595E−02 |
| A6 = | −7.5945E−02 | −2.1706E−02 | 2.8760E−02 | 1.5444E−02 | 6.8504E−02 | 6.7453E−03 |
| A8 = | 6.9398E−02 | 1.3071E−02 | −1.0946E−02 | 4.7779E−03 | −2.2889E−02 | −9.0838E−04 |
| A10 = | −1.6744E−02 | 1.3643E−03 | 1.9990E−03 | −3.5235E−03 | 4.4832E−03 | 2.2294E−06 |
| A12 = | −2.4297E−04 | −2.7748E−03 | −1.5994E−04 | 6.7285E−04 | −5.4032E−04 | 9.4290E−06 |
| A14 = | −1.1378E−13 | 5.4299E−04 | 2.0464E−06 | −4.3784E−05 | 3.7118E−05 | −7.9989E−07 |
| A16 = | | | | | −1.0998E−06 | 2.1137E−08 |

-continued

| 2nd Embodiment | | | |
|---|---|---|---|
| V2 | 23.3 | (R2 + R11)/(R2 − R11) | −0.46 |
| V4 | 20.4 | R11/Y61 | −1.32 |
| T12/CT1 | 2.14 | f/CT2 | 1.64 |
| BL/T56 | 0.47 | |fr/ff| | 0.32 |
| BL/TL | 0.06 | | |

In the photographing optical lens system according to the 2nd embodiment, when a refractive power of the first lens element 210 is P1, a refractive power of the second lens element 220 is P2, a refractive power of the third lens element 230 is P3, a refractive power of the fourth lens element 240 is P4, a refractive power of the fifth lens element 250 is P5, and a refractive power of the sixth lens element 260 is P6, the following conditions are satisfied: |P3|>|P1|; |P3|>|P2|; |P3|>|P5|; |P3|>|P6|; |P4|>|P4|>|P2|; |P4|>|P5|; and |P4|>|P6|.

In the photographing optical lens system according to the 2nd embodiment, when an axial distance between the first lens element 210 and the second lens element 220 is T12, an axial distance between the second lens element 220 and the third lens element 230 is T23, an axial distance between the third lens element 230 and the fourth lens element 240 is T34, an axial distance between the fourth lens element 240 and the fifth lens element 250 is T45, and an axial distance between the fifth lens element 250 and the sixth lens element 260 is T56, the following conditions are satisfied: T12>T23; T12>T34; T12>T45; T56>T23; T56>T34; and T56>T45.

3rd Embodiment

Figure 5:
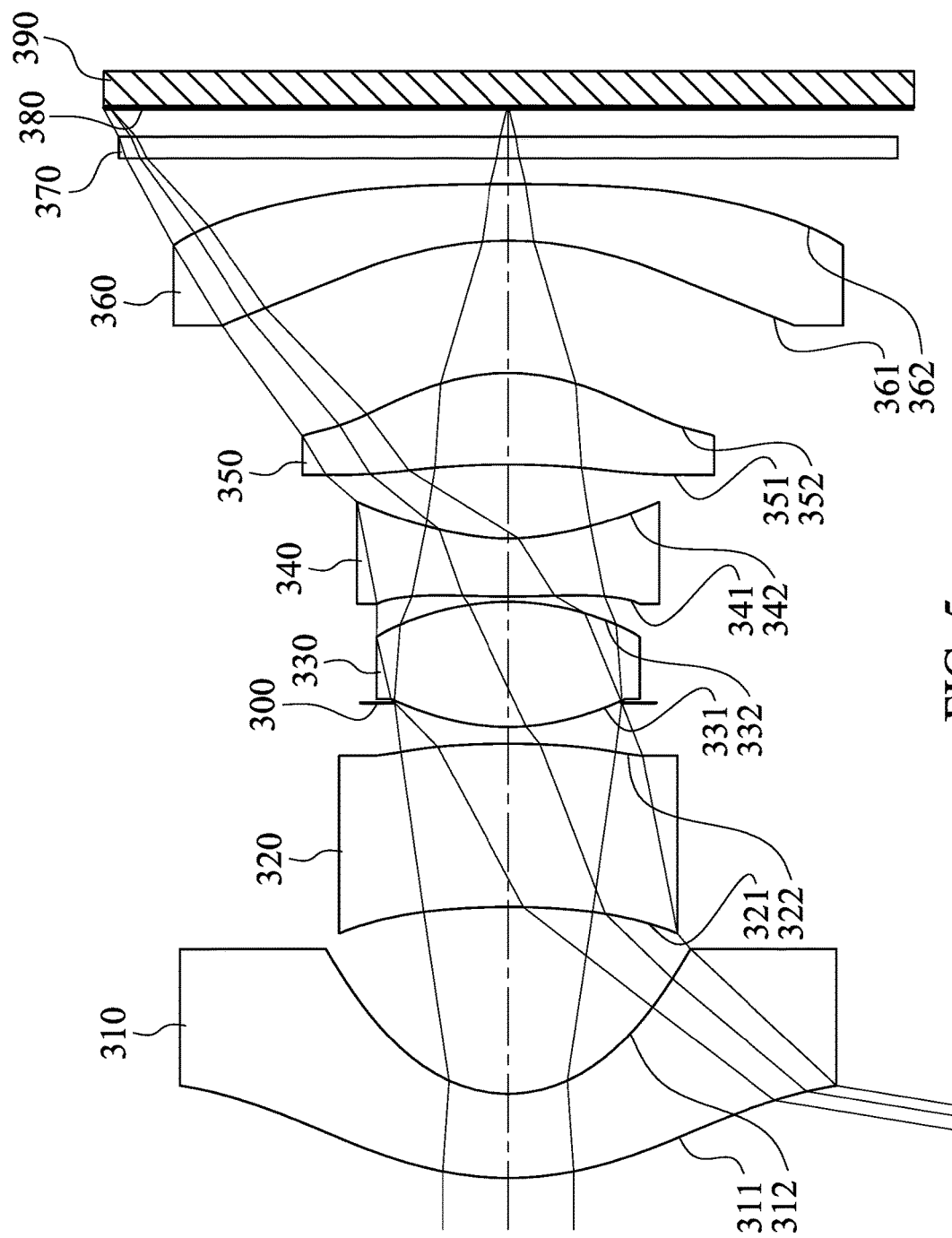
FIG. 5 is a schematic view of an image capturing apparatus according to the 3rd embodiment of the present disclosure.
Figure 6:
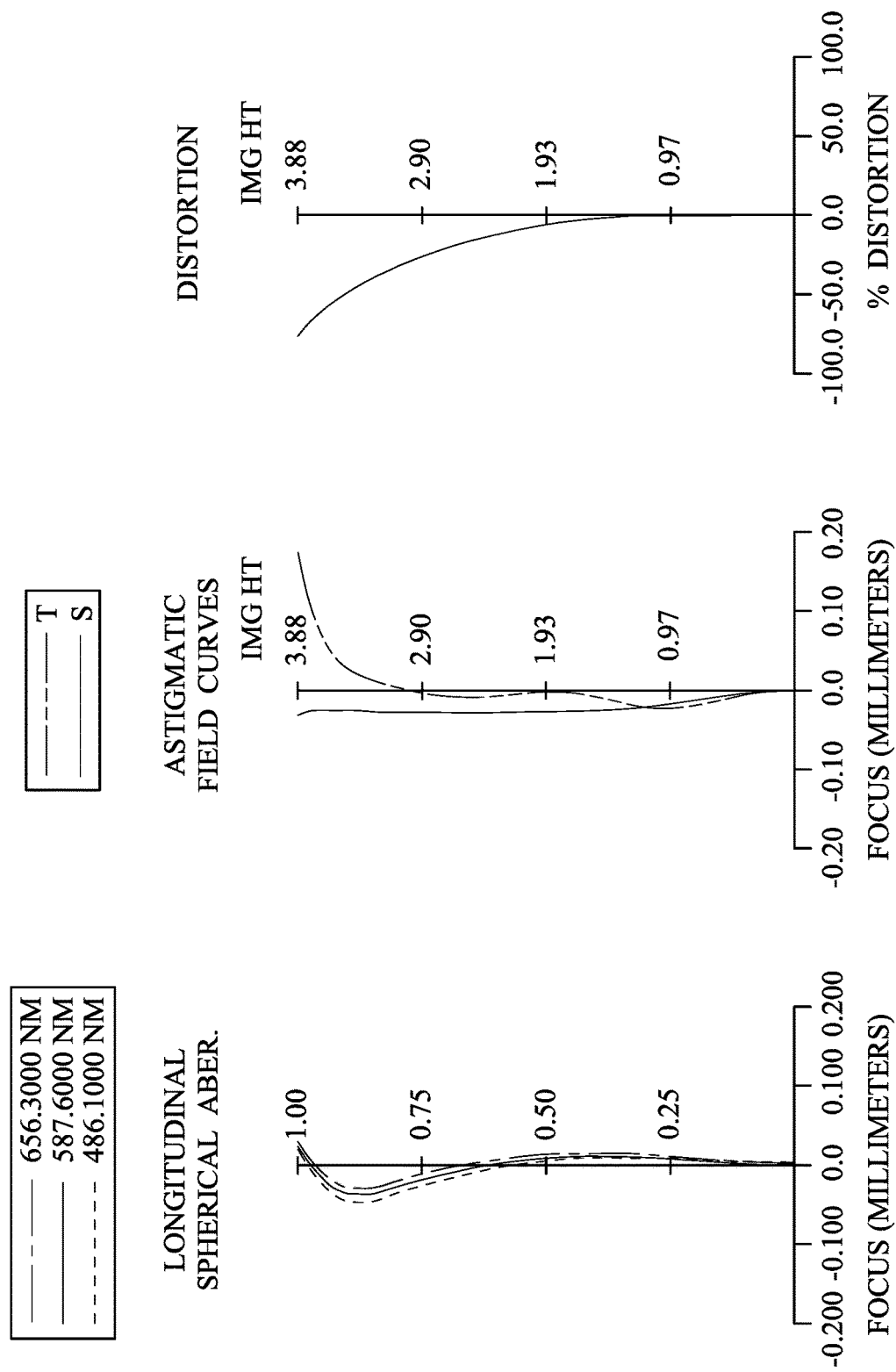
FIG. 6 shows spherical aberration curves, astigmatic field curves and a distortion curve of the image capturing apparatus according to the 3rd embodiment.

FIG. 5 is a schematic view of an image capturing apparatus according to the 3rd embodiment of the present disclosure. FIG. 6 shows spherical aberration curves, astigmatic field curves and a distortion curve of the image capturing apparatus according to the 3rd embodiment. In FIG. 5, the image capturing apparatus includes a photographing optical lens system (its reference numeral is omitted) and an image sensor 390. The photographing optical lens system includes, in order from an object side to an image side, a first lens element 310, a second lens element 320, an aperture stop 300, a third lens element 330, a fourth lens element 340, a fifth lens element 350, a sixth lens element 360, an IR-cut filter 370 and an image surface 380, wherein the image sensor 390 is disposed on the image surface 380 of the photographing optical lens system. The photographing optical lens system has a total of six lens elements (310-360), and there is an air space between every two lens elements of the first lens element 310, the second lens element 320, the third lens element 330, the fourth lens element 340, the fifth lens element 350 and the sixth lens element 360 that are adjacent to each other.

The first lens element 310 with negative refractive power has an object-side surface 311 being convex in a paraxial region thereof and an image-side surface 312 being concave in a paraxial region thereof. The first lens element 310 is made of a plastic material, and has the object-side surface 311 and the image-side surface 312 being both aspheric.

The second lens element 320 with negative refractive power has an object-side surface 321 being concave in a paraxial region thereof and an image-side surface 322 being convex in a paraxial region thereof. The second lens element 320 is made of a plastic material, and has the object-side surface 321 and the image-side surface 322 being both aspheric.

The third lens element 330 with positive refractive power has an object-side surface 331 being convex in a paraxial region thereof and an image-side surface 332 being convex in a paraxial region thereof. The third lens element 330 is made of a plastic material, and has the object-side surface 331 and the image-side surface 332 being both aspheric.

The fourth lens element 340 with negative refractive power has an object-side surface 341 being convex in a paraxial region thereof and an image-side surface 342 being concave in a paraxial region thereof. The fourth lens element 340 is made of a plastic material, and has the object-side surface 341 and the image-side surface 342 being both aspheric.

The fifth lens element 350 with positive refractive power has an object-side surface 351 being concave in a paraxial region thereof and an image-side surface 352 being convex in a paraxial region thereof. The fifth lens element 350 is made of a plastic material, and has the object-side surface 351 and the image-side surface 352 being both aspheric.

The sixth lens element 360 with negative refractive power has an object-side surface 361 being concave in a paraxial region thereof and an image-side surface 362 being convex in a paraxial region thereof. The sixth lens element 360 is made of a plastic material, and has the object-side surface 361 and the image-side surface 362 being both aspheric. Furthermore, the object-side surface 361 of the sixth lens element 360 includes at least one inflection point.

The IR-cut filter 370 is made of a glass material and located between the sixth lens element 360 and the image surface 380, and will not affect the focal length of the photographing optical lens system.

The detailed optical data of the 3rd embodiment are shown in Table 5 and the aspheric surface data are shown in Table 6 below.

TABLE 5

3rd Embodiment
f = 2.65 mm, Fno = 2.08, HFOV = 80.7 deg.

| Surface # | | Curvature Radius | Thickness | Material | Index | Abbe # | Focal Length |
|---|---|---|---|---|---|---|---|
| 0 | Object | Plano | Infinity | | | | |
| 1 | Lens 1 | 3.251 ASP | 0.816 | Plastic | 1.544 | 55.9 | −4.80 |
| 2 | | 1.319 ASP | 1.821 | | | | |
| 3 | Lens 2 | −7.830 ASP | 1.591 | Plastic | 1.639 | 23.3 | −59.23 |
| 4 | | −10.655 ASP | 0.397 | | | | |
| 5 | Ape. Stop | Plano | −0.235 | | | | |
| 6 | Lens 3 | 2.159 ASP | 1.217 | Plastic | 1.544 | 55.9 | 2.33 |
| 7 | | −2.462 ASP | 0.051 | | | | |
| 8 | Lens 4 | 9.099 ASP | 0.564 | Plastic | 1.660 | 20.4 | −4.64 |

TABLE 5-continued

3rd Embodiment
f = 2.65 mm, Fno = 2.08, HFOV = 80.7 deg.

| Surface # | | Curvature Radius | Thickness | Material | Index | Abbe # | Focal Length |
|---|---|---|---|---|---|---|---|
| 9 | | 2.235 ASP | 0.723 | | | | |
| 10 | Lens 5 | −8.851 ASP | 0.890 | Plastic | 1.544 | 55.9 | 4.85 |
| 11 | | −2.104 ASP | 1.290 | | | | |
| 12 | Lens 6 | −3.732 ASP | 0.549 | Plastic | 1.639 | 23.3 | −6.56 |
| 13 | | −35.976 ASP | 0.250 | | | | |
| 14 | IR-cut filter | Plano | 0.210 | Glass | 1.517 | 64.2 | — |
| 15 | | Plano | 0.282 | | | | |
| 16 | Image | Plano | — | | | | |

Note:
Reference wavelength is 587.6 nm (d-line).

TABLE 6

Aspheric Coefficients

| Surface # | 1 | 2 | 3 | 4 | 6 | 7 |
|---|---|---|---|---|---|---|
| k = | −8.5763E−01 | −7.4265E−01 | −4.7819E+01 | 4.1003E+01 | −7.2187E+00 | −1.1610E+00 |
| A4 = | −8.8434E−04 | 1.4975E−02 | −2.1982E−02 | −4.3624E−02 | 3.1676E−02 | 2.2898E−02 |
| A6 = | −1.5726E−03 | −4.2952E−03 | 4.3302E−03 | 3.1795E−02 | −1.7818E−03 | −6.7105E−02 |
| A8 = | 1.1048E−04 | 1.6034E−03 | −2.9557E−03 | −8.9712E−03 | −8.7531E−03 | 7.7991E−02 |
| A10 = | 3.7551E−07 | −4.4529E−04 | 9.4799E−04 | −3.6874E−04 | 1.3546E−02 | −3.7559E−02 |
| A12 = | −1.8370E−07 | 2.5238E−06 | −8.9426E−05 | 1.3053E−03 | −6.0121E−03 | 5.2185E−03 |

| Surface # | 8 | 9 | 10 | 11 | 12 | 13 |
|---|---|---|---|---|---|---|
| k = | −4.1233E+01 | −9.4216E+00 | 2.0238E+01 | −7.5418E−01 | 2.1920E−01 | 7.4119E+01 |
| A4 = | −5.1709E−02 | 1.7743E−02 | −1.0164E−02 | 5.2142E−03 | −7.2729E−03 | −6.2775E−03 |
| A6 = | −3.1009E−02 | −1.6790E−02 | 1.3351E−02 | 5.7844E−03 | 3.4024E−03 | −1.0945E−04 |
| A8 = | 4.7291E−02 | 9.8225E−03 | −2.5156E−03 | −4.7810E−04 | 4.4652E−04 | 1.0577E−04 |
| A10 = | −1.7856E−02 | 1.9194E−03 | 5.7445E−04 | 5.2942E−04 | −2.4902E−04 | 4.2734E−06 |
| A12 = | −2.4297E−04 | −2.7748E−03 | −9.4089E−05 | −1.2208E−04 | 3.7078E−05 | −3.0380E−06 |
| A14 = | −2.4994E−19 | 5.4299E−04 | −2.8527E−19 | 1.4340E−06 | −2.4888E−06 | 2.6933E−07 |
| A16 = | | | | | 6.4995E−08 | −7.6831E−09 |

In the 3rd embodiment, the equation of the aspheric surface profiles of the aforementioned lens elements is the same as the equation of the 1st embodiment. Also, the definitions of these parameters shown in the following table are the same as those stated in the 1st embodiment with corresponding values for the 3rd embodiment, so an explanation in this regard will not be provided again.

Moreover, these parameters can be calculated from Table 5 and Table 6 as the following values and satisfy the following conditions:

| 3rd Embodiment | | | |
|---|---|---|---|
| f [mm] | 2.65 | SD/TD | 0.52 |
| Fno | 2.08 | |R6/R7| | 0.27 |
| HFOV [deg.] | 80.7 | (R5 + R6)/(R5 − R6) | −0.07 |
| |1/tan(HFOV)| | 0.16 | (R11 − R12)/(R11 + R12) | −0.81 |
| V2 | 23.3 | (R2 + R11)/(R2 − R11) | −0.48 |
| V4 | 20.4 | R11/Y61 | −1.34 |
| T12/CT1 | 2.23 | f/CT2 | 1.67 |
| BL/T56 | 0.58 | |fr/ff| | 0.59 |
| BL/TL | 0.07 | | |

In the photographing optical lens system according to the 3rd embodiment, when a refractive power of the first lens element 310 is P1, a refractive power of the second lens element 320 is P2, a refractive power of the third lens element 330 is P3, a refractive power of the fourth lens element 340 is P4, a refractive power of the fifth lens element 350 is P5, and a refractive power of the sixth lens element 360 is P6, the following conditions are satisfied: |P3|>|P1|; |P3|>|P2|; |P3|>|P5|; |P3|>|P6|; |P4|>|P1|; |P4|>|P2|; |P4|>|P5|; and |P4|>|P6|.

In the photographing optical lens system according to the 3rd embodiment, when an axial distance between the first lens element 310 and the second lens element 320 is T12, an axial distance between the second lens element 320 and the third lens element 330 is T23, an axial distance between the third lens element 330 and the fourth lens element 340 is T34, an axial distance between the fourth lens element 340 and the fifth lens element 350 is T45, and an axial distance between the fifth lens element 350 and the sixth lens element 360 is T56, the following conditions are satisfied: T12>T23; T12>T34; T12>T45; T56>T23; T56>T34; and T56>T45.

4th Embodiment

Figure 7:
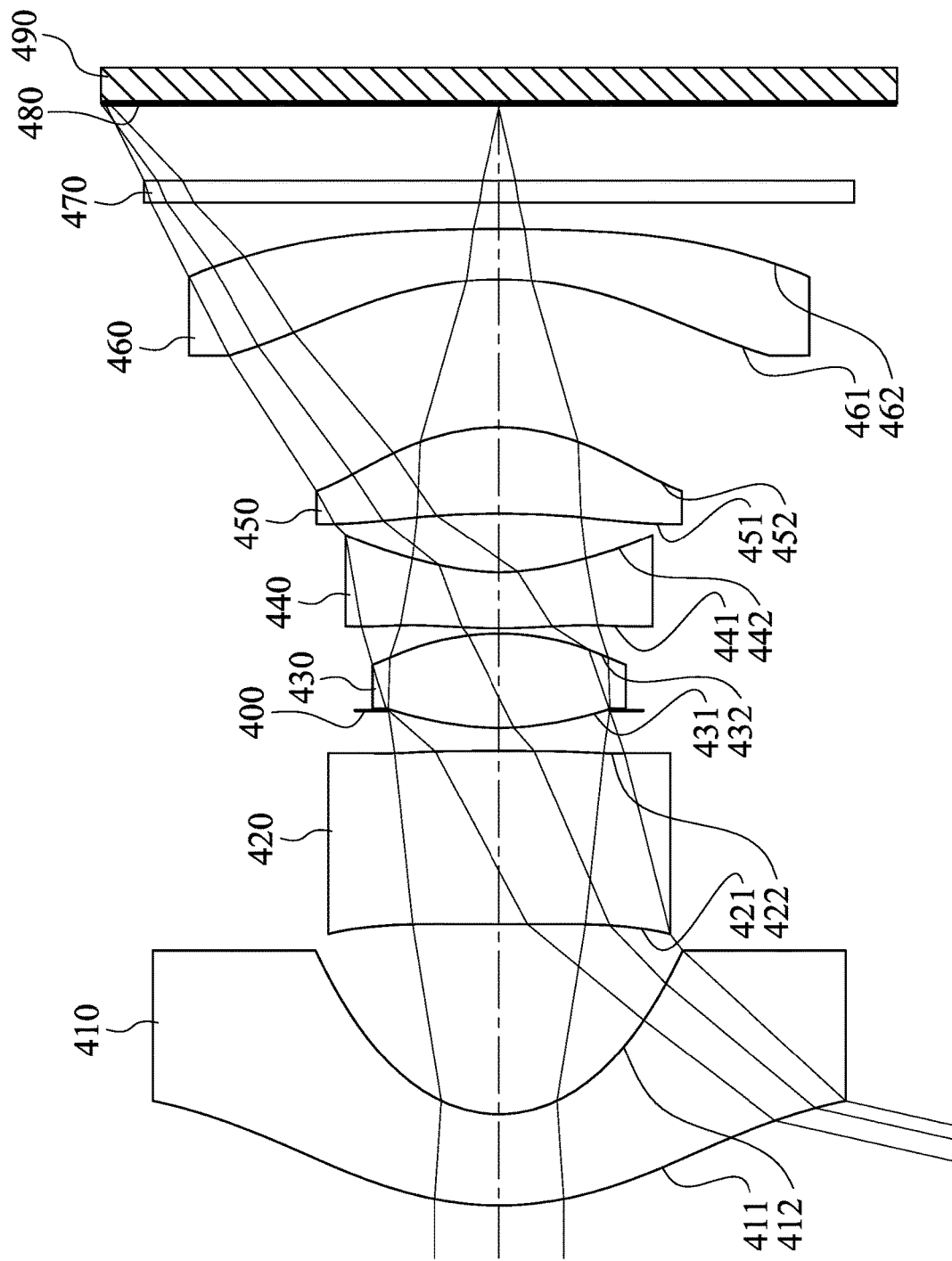
FIG. 7 is a schematic view of an image capturing apparatus according to the 4th embodiment of the present disclosure.
Figure 8:
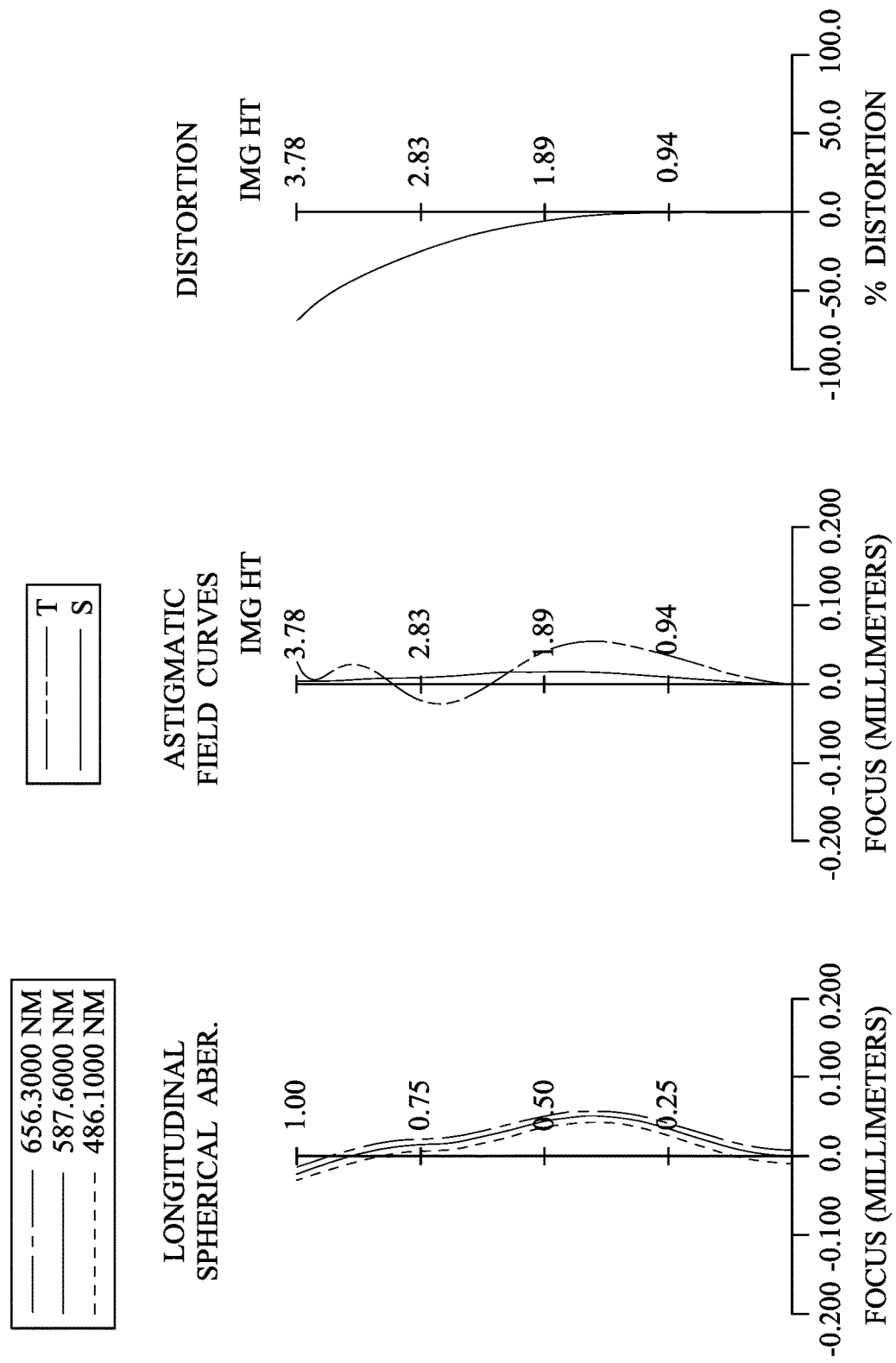
FIG. 8 shows spherical aberration curves, astigmatic field curves and a distortion curve of the image capturing apparatus according to the 4th embodiment.

FIG. 7 is a schematic view of an image capturing apparatus according to the 4th embodiment of the present disclosure. FIG. 8 shows spherical aberration curves, astigmatic field curves and a distortion curve of the image capturing apparatus according to the 4th embodiment. In FIG. 7, the image capturing apparatus includes a photographing optical lens system (its reference numeral is omitted) and an image sensor 490. The photographing optical lens system includes, in order from an object side to an image side, a first lens element 410, a second lens element 420, an aperture stop 400, a third lens element 430, a fourth lens element 440, a fifth lens element 450, a sixth lens element 460, an IR-cut filter 470 and an image surface 480, wherein the image sensor 490 is disposed on the image surface 480 of the photographing optical lens system. The photographing optical lens system has a total of six lens elements (410-460), and there is an air space between every two lens elements of the first lens element 410, the second lens element 420, the third lens element 430, the fourth lens element 440, the fifth lens element 450 and the sixth lens element 460 that are adjacent to each other.

The first lens element 410 with negative refractive power has an object-side surface 411 being convex in a paraxial region thereof and an image-side surface 412 being concave in a paraxial region thereof. The first lens element 410 is made of a plastic material, and has the object-side surface 411 and the image-side surface 412 being both aspheric.

The second lens element 420 with positive refractive power has an object-side surface 421 being convex in a paraxial region thereof and an image-side surface 422 being convex in a paraxial region thereof. The second lens element 420 is made of a plastic material, and has the object-side surface 421 and the image-side surface 422 being both aspheric.

The third lens element 430 with positive refractive power has an object-side surface 431 being convex in a paraxial region thereof and an image-side surface 432 being convex in a paraxial region thereof. The third lens element 430 is made of a plastic material, and has the object-side surface 431 and the image-side surface 432 being both aspheric.

The fourth lens element 440 with negative refractive power has an object-side surface 441 being convex in a paraxial region thereof and an image-side surface 442 being concave in a paraxial region thereof. The fourth lens element 440 is made of a plastic material, and has the object-side surface 441 and the image-side surface 442 being both aspheric.

The fifth lens element 450 with positive refractive power has an object-side surface 451 being concave in a paraxial region thereof and an image-side surface 452 being convex in a paraxial region thereof. The fifth lens element 450 is made of a plastic material, and has the object-side surface 451 and the image-side surface 452 being both aspheric.

The sixth lens element 460 with negative refractive power has an object-side surface 461 being concave in a paraxial region thereof and an image-side surface 462 being convex in a paraxial region thereof. The sixth lens element 460 is made of a plastic material, and has the object-side surface 461 and the image-side surface 462 being both aspheric. Furthermore, the object-side surface 461 of the sixth lens element 460 includes at least one inflection point.

The IR-cut filter 470 is made of a glass material and located between the sixth lens element 460 and the image surface 480, and will not affect the focal length of the photographing optical lens system.

The detailed optical data of the 4th embodiment are shown in Table 7 and the aspheric surface data are shown in Table 8 below.

TABLE 7

4th Embodiment
f = 2.76 mm, Fno = 2.25, HFOV = 77.2 deg.

| Surface # | | Curvature Radius | | Thickness | Material | Index | Abbe # | Focal Length |
|---|---|---|---|---|---|---|---|---|
| 0 | Object | Plano | | Infinity | | | | |
| 1 | Lens 1 | 3.173 | ASP | 0.864 | Plastic | 1.544 | 55.9 | −4.31 |
| 2 | | 1.218 | ASP | 1.810 | | | | |
| 3 | Lens 2 | 83.333 | ASP | 1.650 | Plastic | 1.639 | 23.3 | 46.66 |
| 4 | | −46.034 | ASP | 0.384 | | | | |
| 5 | Ape. Stop | Plano | | −0.165 | | | | |
| 6 | Lens 3 | 2.941 | ASP | 0.894 | Plastic | 1.544 | 55.9 | 2.58 |
| 7 | | −2.402 | ASP | 0.050 | | | | |
| 8 | Lens 4 | 5.587 | ASP | 0.533 | Plastic | 1.660 | 20.4 | −5.61 |
| 9 | | 2.142 | ASP | 0.562 | | | | |
| 10 | Lens 5 | −8.644 | ASP | 0.819 | Plastic | 1.544 | 55.9 | 4.65 |
| 11 | | −2.022 | ASP | 1.406 | | | | |
| 12 | Lens 6 | −3.611 | ASP | 0.480 | Plastic | 1.639 | 23.3 | −6.51 |
| 13 | | −28.810 | ASP | 0.250 | | | | |
| 14 | IR-cut filter | Plano | | 0.210 | Glass | 1.517 | 64.2 | — |
| 15 | | Plano | | 0.731 | | | | |
| 16 | Image | Plano | | — | | | | |

Note: Reference wavelength is 587.6 nm (d-line).

TABLE 8

Aspheric Coefficients

| Surface # | 1 | 2 | 3 | 4 | 6 | 7 |
|---|---|---|---|---|---|---|
| k = | −7.9438E−01 | −7.1225E−01 | −3.1509E+01 | 5.9037E+01 | 2.1617E+00 | 1.6987E+00 |
| A4 = | −8.8434E−04 | 1.4975E−02 | −2.1251E−02 | −2.7130E−03 | −2.2694E−02 | 3.8027E−02 |
| A6 = | −1.5726E−03 | −4.2952E−03 | 1.7624E−02 | −5.5472E−02 | 1.1355E−02 | −3.1360E−02 |
| A8 = | 1.1048E−04 | 1.6034E−03 | −1.5437E−02 | 8.9996E−02 | −4.4025E−02 | 2.6190E−02 |
| A10 = | 3.7551E−07 | −4.4529E−04 | 5.3513E−03 | −6.2344E−02 | 3.3450E−02 | −9.3163E−03 |
| A12 = | −1.8370E−07 | 2.5238E−06 | −6.5685E−04 | 1.8496E−02 | −6.0121E−03 | 5.2185E−03 |

TABLE 8-continued

| Aspheric Coefficients | | | | | | |
|---|---|---|---|---|---|---|
| Surface # | 8 | 9 | 10 | 11 | 12 | 13 |
| k = | −3.3284E+01 | −8.7823E+00 | 2.4083E+01 | −6.4214E−01 | 1.5637E−01 | 7.7200E+01 |
| A4 = | −3.9789E−02 | 1.8993E−02 | −7.3958E−03 | 2.7581E−03 | −1.2926E−02 | −8.0770E−03 |
| A6 = | −3.3079E−02 | −2.3139E−02 | 1.3476E−02 | 5.5019E−03 | 8.6961E−03 | 4.9101E−04 |
| A8 = | 3.2533E−02 | 1.2216E−02 | −2.3841E−03 | −4.1748E−04 | −6.5561E−04 | 6.3862E−04 |
| A10 = | −6.0273E−03 | 1.8094E−03 | 5.8443E−04 | 5.6660E−04 | −4.3932E−04 | −2.7967E−04 |
| A12 = | −2.4297E−04 | −2.7748E−03 | −9.4089E−05 | −1.2208E−04 | 1.4200E−04 | 4.8744E−05 |
| A14 = | 5.6551E−13 | 5.4299E−04 | 6.4534E−13 | 1.4340E−06 | −1.6590E−05 | −3.8718E−06 |
| A16 = | | | | | 6.9621E−07 | 1.1557E−07 |

In the 4th embodiment, the equation of the aspheric surface profiles of the aforementioned lens elements is the same as the equation of the 1st embodiment. Also, the definitions of these parameters shown in the following table are the same as those stated in the 1st embodiment with corresponding values for the 4th embodiment, so an explanation in this regard will not be provided again.

Moreover, these parameters can be calculated from Table 7 and Table 8 as the following values and satisfy the following conditions:

| 4th Embodiment | | | |
|---|---|---|---|
| f [mm] | 2.76 | SD/TD | 0.49 |
| Fno | 2.25 | |R6/R7| | 0.43 |
| HFOV [deg.] | 77.2 | (R5 + R6)/(R5 − R6) | 0.10 |
| |1/tan(HFOV)| | 0.23 | (R11 − R12)/(R11 + R12) | −0.78 |
| V2 | 23.3 | (R2 + R11)/(R2 − R11) | −0.50 |
| V4 | 20.4 | R11/Y61 | −1.41 |
| T12/CT1 | 2.09 | f/CT2 | 1.67 |
| BL/T56 | 0.85 | |fr/f| | 0.56 |
| BL/TL | 0.11 | | |

In the photographing optical lens system according to the 4th embodiment, when an axial distance between the first lens element 410 and the second lens element 420 is T12, an axial distance between the second lens element 420 and the third lens element 430 is T23, an axial distance between the third lens element 430 and the fourth lens element 440 is T34, an axial distance between the fourth lens element 440 and the fifth lens element 450 is T45, and an axial distance between the fifth lens element 450 and the sixth lens element 460 is T56, the following conditions are satisfied: T12>T23; T12>T34; T12>T45; T56>T23; T56>T34; and T56>T45.

5th Embodiment

Figure 9:
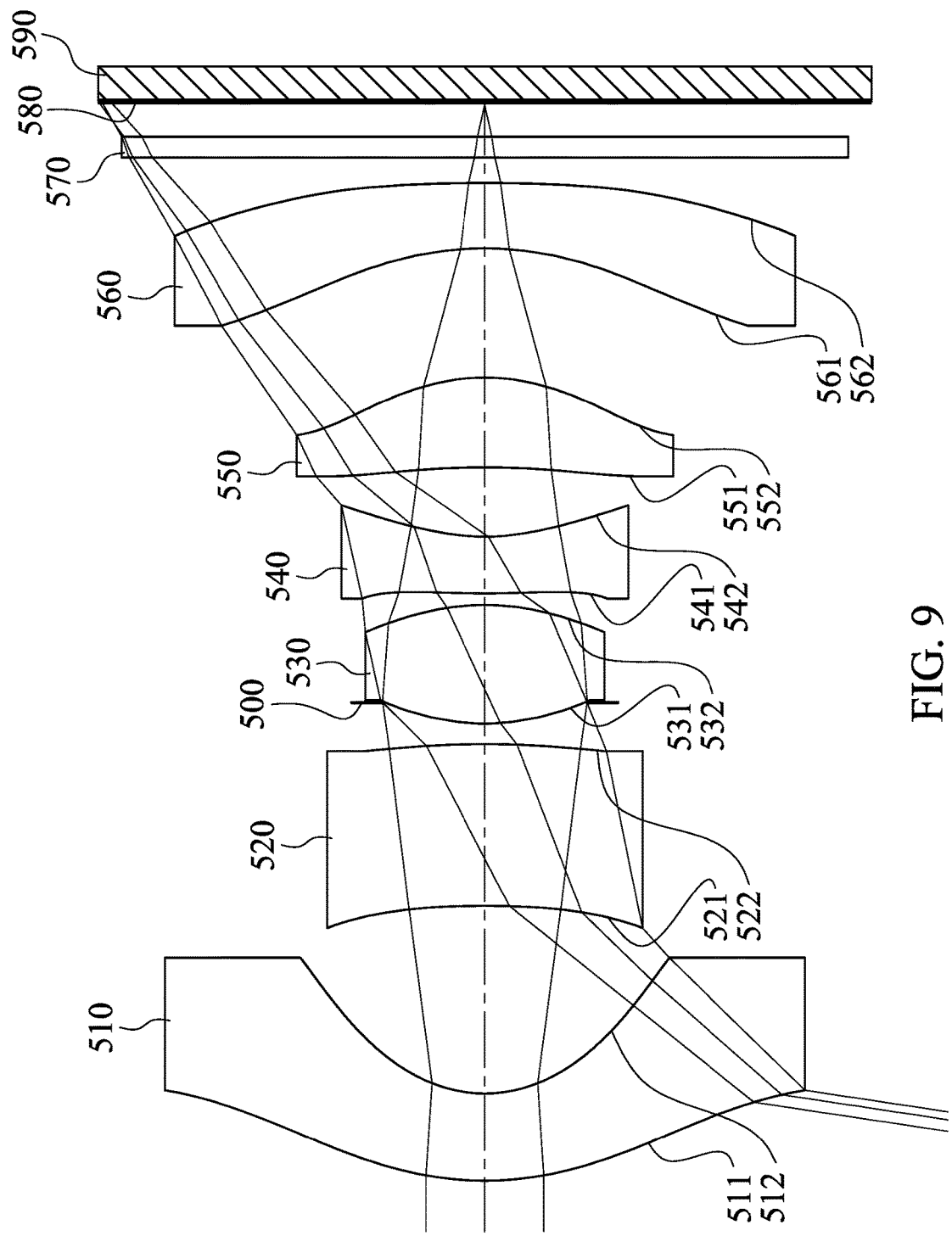
FIG. 9 is a schematic view of an image capturing apparatus according to the 5th embodiment of the present disclosure.
Figure 10:
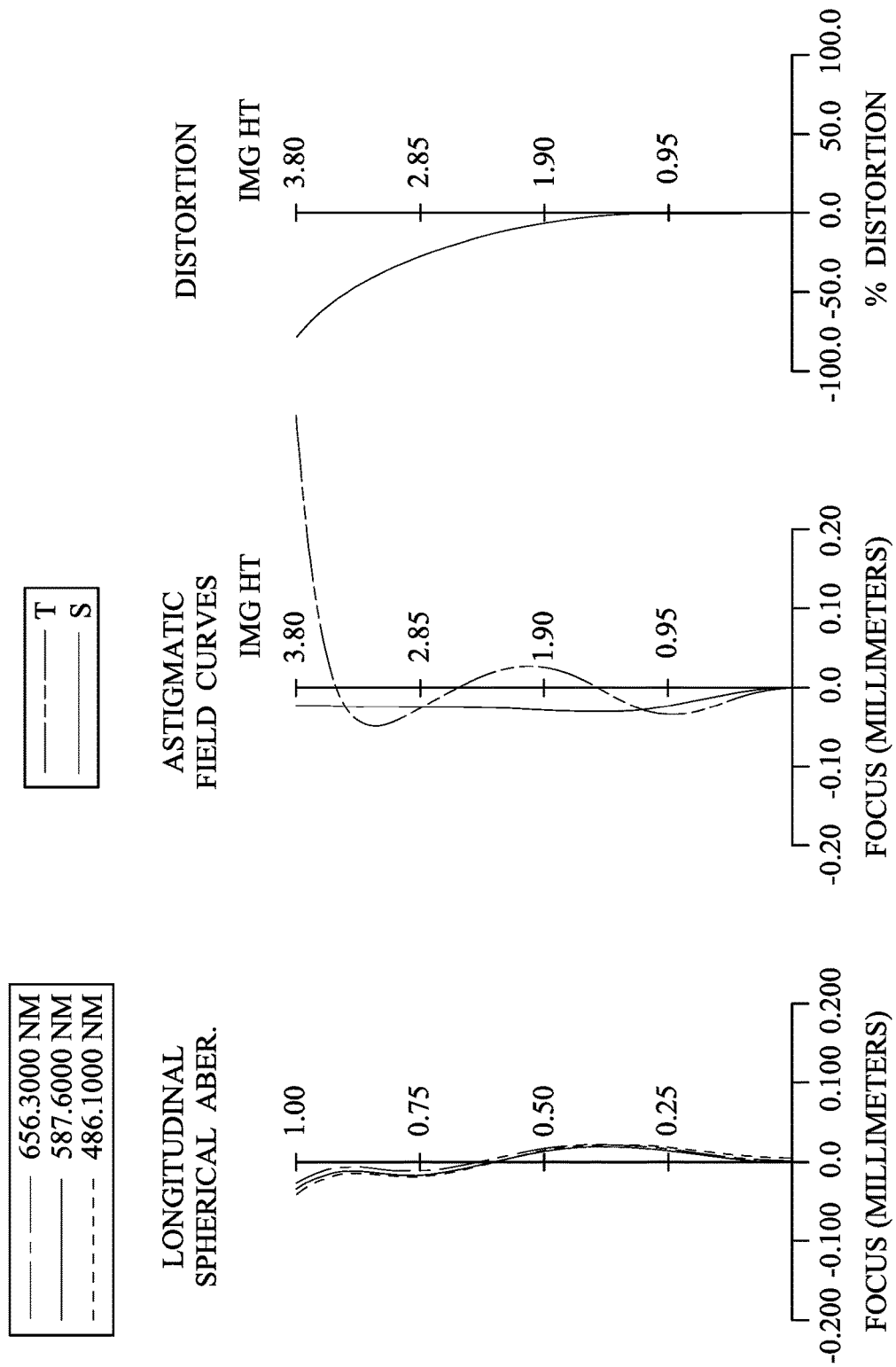
FIG. 10 shows spherical aberration curves, astigmatic field curves and a distortion curve of the image capturing apparatus according to the 5th embodiment.

FIG. 9 is a schematic view of an image capturing apparatus according to the 5th embodiment of the present disclosure. FIG. 10 shows spherical aberration curves, astigmatic field curves and a distortion curve of the image capturing apparatus according to the 5th embodiment. In FIG. 9, the image capturing apparatus includes a photographing optical lens system (its reference numeral is omitted) and an image sensor 590. The photographing optical lens system includes, in order from an object side to an image side, a first lens element 510, a second lens element 520, an aperture stop 500, a third lens element 530, a fourth lens element 540, a fifth lens element 550, a sixth lens element 560, an IR-cut filter 570 and an image surface 580, wherein the image sensor 590 is disposed on the image surface 580 of the photographing optical lens system. The photographing optical lens system has a total of six lens elements (510-560), and there is an air space between every two lens elements of the first lens element 510, the second lens element 520, the third lens element 530, the fourth lens element 540, the fifth lens element 550 and the sixth lens element 560 that are adjacent to each other.

The first lens element 510 with negative refractive power has an object-side surface 511 being convex in a paraxial region thereof and an image-side surface 512 being concave in a paraxial region thereof. The first lens element 510 is made of a glass material, and has the object-side surface 511 and the image-side surface 512 being both aspheric.

The second lens element 520 with negative refractive power has an object-side surface 521 being concave in a paraxial region thereof and an image-side surface 522 being convex in a paraxial region thereof. The second lens element 520 is made of a plastic material, and has the object-side surface 521 and the image-side surface 522 being both aspheric.

The third lens element 530 with positive refractive power has an object-side surface 531 being convex in a paraxial region thereof and an image-side surface 532 being convex in a paraxial region thereof. The third lens element 530 is made of a plastic material, and has the object-side surface 531 and the image-side surface 532 being both aspheric.

The fourth lens element 540 with negative refractive power has an object-side surface 541 being convex in a paraxial region thereof and an image-side surface 542 being concave in a paraxial region thereof. The fourth lens element 540 is made of a plastic material, and has the object-side surface 541 and the image-side surface 542 being both aspheric.

The fifth lens element 550 with positive refractive power has an object-side surface 551 being concave in a paraxial region thereof and an image-side surface 552 being convex in a paraxial region thereof. The fifth lens element 550 is made of a plastic material, and has the object-side surface 551 and the image-side surface 552 being both aspheric.

The sixth lens element 560 with negative refractive power has an object-side surface 561 being concave in a paraxial region thereof and an image-side surface 562 being convex in a paraxial region thereof. The sixth lens element 560 is made of a plastic material, and has the object-side surface 561 and the image-side surface 562 being both aspheric. Furthermore, the object-side surface 561 of the sixth lens element 560 includes at least one inflection point.

The IR-cut filter 570 is made of a glass material and located between the sixth lens element 560 and the image surface 580, and will not affect the focal length of the photographing optical lens system.

The detailed optical data of the 5th embodiment are shown in Table 9 and the aspheric surface data are shown in Table 10 below.

TABLE 9

5th Embodiment
f = 2.69 mm, Fno = 2.32, HFOV = 81.4 deg.

| Surface # | | Curvature Radius | | Thickness | Material | Index | Abbe # | Focal Length |
|---|---|---|---|---|---|---|---|---|
| 0 | Object | Plano | | Infinity | | | | |
| 1 | Lens 1 | 3.244 | ASP | 0.861 | Glass | 1.589 | 61.3 | −4.77 |
| 2 | | 1.358 | ASP | 1.845 | | | | |
| 3 | Lens 2 | −8.342 | ASP | 1.591 | Plastic | 1.639 | 23.3 | −51.75 |
| 4 | | −11.988 | ASP | 0.409 | | | | |
| 5 | Ape. Stop | Plano | | −0.205 | | | | |
| 6 | Lens 3 | 2.315 | ASP | 1.170 | Plastic | 1.544 | 55.9 | 2.33 |
| 7 | | −2.308 | ASP | 0.112 | | | | |
| 8 | Lens 4 | 8.856 | ASP | 0.557 | Plastic | 1.660 | 20.4 | −4.48 |
| 9 | | 2.162 | ASP | 0.681 | | | | |
| 10 | Lens 5 | −9.105 | ASP | 0.888 | Plastic | 1.544 | 55.9 | 4.62 |
| 11 | | −2.036 | ASP | 1.268 | | | | |
| 12 | Lens 6 | −3.398 | ASP | 0.642 | Plastic | 1.639 | 23.3 | −6.52 |
| 13 | | −19.810 | ASP | 0.250 | | | | |
| 14 | IR-cut filter | Plano | | 0.210 | Glass | 1.517 | 64.2 | — |
| 15 | | Plano | | 0.347 | | | | |
| 16 | Image | Plano | | — | | | | |

Note: Reference wavelength is 587.6 nm (d-line).

TABLE 10

Aspheric Coefficients

| Surface # | 1 | 2 | 3 | 4 | 6 | 7 |
|---|---|---|---|---|---|---|
| k = | −8.4392E−01 | −8.4824E−01 | −4.3706E+01 | −3.9165E+01 | −2.5637E+00 | −1.4051E+00 |
| A4 = | −8.6467E−04 | 1.5883E−02 | −2.2367E−02 | −2.7644E−02 | −1.0947E−02 | 2.3939E−02 |
| A6 = | −1.5691E−03 | −4.2319E−03 | 5.5102E−03 | 1.6146E−02 | 5.0685E−02 | −3.0853E−02 |
| A8 = | 1.1069E−04 | 1.5749E−03 | −3.1462E−03 | 2.4420E−04 | −4.7069E−02 | 4.2378E−02 |
| A10 = | 2.4302E−07 | −4.6698E−04 | 8.3483E−04 | −2.9678E−03 | 2.6290E−02 | −2.6449E−02 |
| A12 = | −1.8370E−07 | 2.5238E−06 | −8.9426E−05 | 1.3053E−03 | −6.0121E−03 | 5.2185E−03 |

| Surface # | 8 | 9 | 10 | 11 | 12 | 13 |
|---|---|---|---|---|---|---|
| k = | −5.6009E+01 | −9.7790E+00 | 6.3970E+00 | −7.7584E−01 | −4.6745E−01 | 2.0866E+01 |
| A4 = | −5.1350E−02 | 1.8020E−02 | −1.0533E−02 | 5.1030E−03 | −7.3476E−03 | −5.9290E−03 |
| A6 = | −3.9131E−03 | −1.5428E−02 | 1.3097E−02 | 5.8877E−03 | 3.3792E−03 | −8.6363E−05 |
| A8 = | 1.4126E−02 | 3.6293E−03 | −2.6798E−03 | −4.1755E−04 | 4.4239E−04 | 1.0759E−04 |
| A10 = | −9.0248E−03 | 3.7868E−03 | 4.7720E−03 | 5.5647E−04 | −2.4978E−04 | 4.4545E−06 |
| A12 = | −2.4297E−04 | −2.7748E−03 | −9.4089E−05 | −1.2208E−04 | 3.7078E−05 | −3.0380E−06 |
| A14 = | 8.5988E−20 | 5.4299E−04 | 9.8143E−20 | 1.4340E−06 | −2.4888E−06 | 2.6933E−07 |
| A16 = | | | | | 6.4995E−08 | −7.6831E−09 |

In the 5th embodiment, the equation of the aspheric surface profiles of the aforementioned lens elements is the same as the equation of the 1st embodiment. Also, the definitions of these parameters shown in the following table are the same as those stated in the 1st embodiment with corresponding values for the 5th embodiment, so an explanation in this regard will not be provided again.

Moreover, these parameters can be calculated from Table 9 and Table 10 as the following values and satisfy the following conditions:

| 5th Embodiment | | | |
|---|---|---|---|
| f [mm] | 2.69 | SD/TD | 0.52 |
| Fno | 2.32 | |R6/R7| | 0.26 |
| HFOV [deg.] | 81.4 | (R5 + R6)/(R5 − R6) | 0.00 |
| |1/tan(HFOV)| | 0.15 | (R11 − R12)/(R11 + R12) | −0.71 |
| V2 | 23.3 | (R2 + R11)/(R2 − R11) | −0.43 |
| V4 | 20.4 | R11/Y61 | −1.31 |
| T12/CT1 | 2.14 | f/CT2 | 1.69 |
| BL/T56 | 0.64 | |fr/f| | 0.61 |
| BL/TL | 0.08 | | |

In the photographing optical lens system according to the 5th embodiment, when a refractive power of the first lens element 510 is P1, a refractive power of the second lens element 520 is P2, a refractive power of the third lens element 530 is P3, a refractive power of the fourth lens element 540 is P4, a refractive power of the fifth lens element 550 is P5, and a refractive power of the sixth lens element 560 is P6, the following conditions are satisfied: |P3|>|P1|; |P3|>|P2|; |P3|>|P5|; |P3|>|P6|; |P4|>|P1|; |P4|>|P2|; |P4|>|P5|; and |P4|>|P6|.

In the photographing optical lens system according to the 5th embodiment, when an axial distance between the first lens element 510 and the second lens element 520 is T12, an axial distance between the second lens element 520 and the third lens element 530 is T23, an axial distance between the third lens element 530 and the fourth lens element 540 is T34, an axial distance between the fourth lens element 540 and the fifth lens element 550 is T45, and an axial distance between the fifth lens element 550 and the sixth lens element 560 is T56, the following conditions are satisfied: T12>T23; T12>T34; T12>T45; T56>T23; T56>T34; and T56>T45.

6th Embodiment

Figure 11:
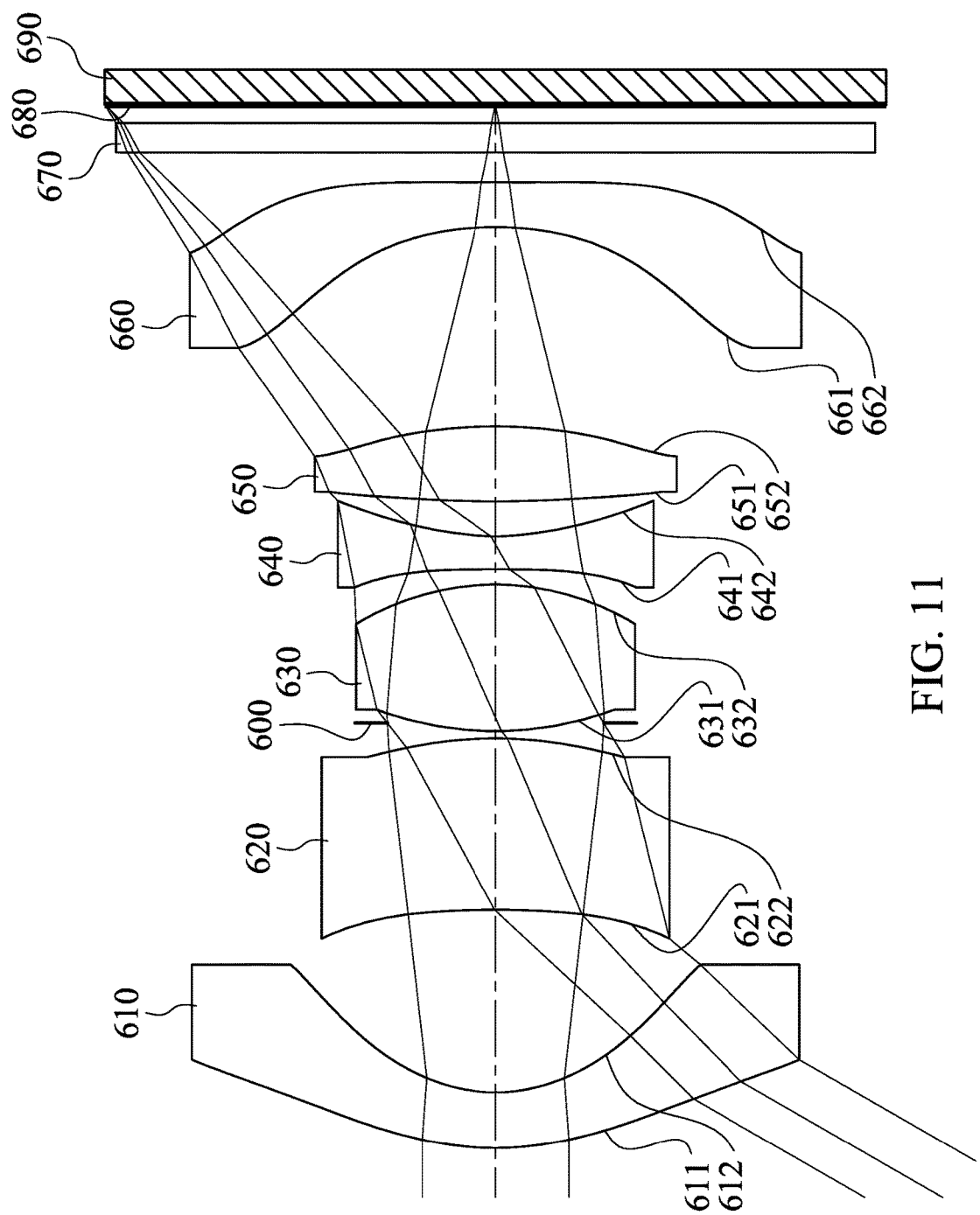
FIG. 11 is a schematic view of an image capturing apparatus according to the 6th embodiment of the present disclosure.
Figure 12:
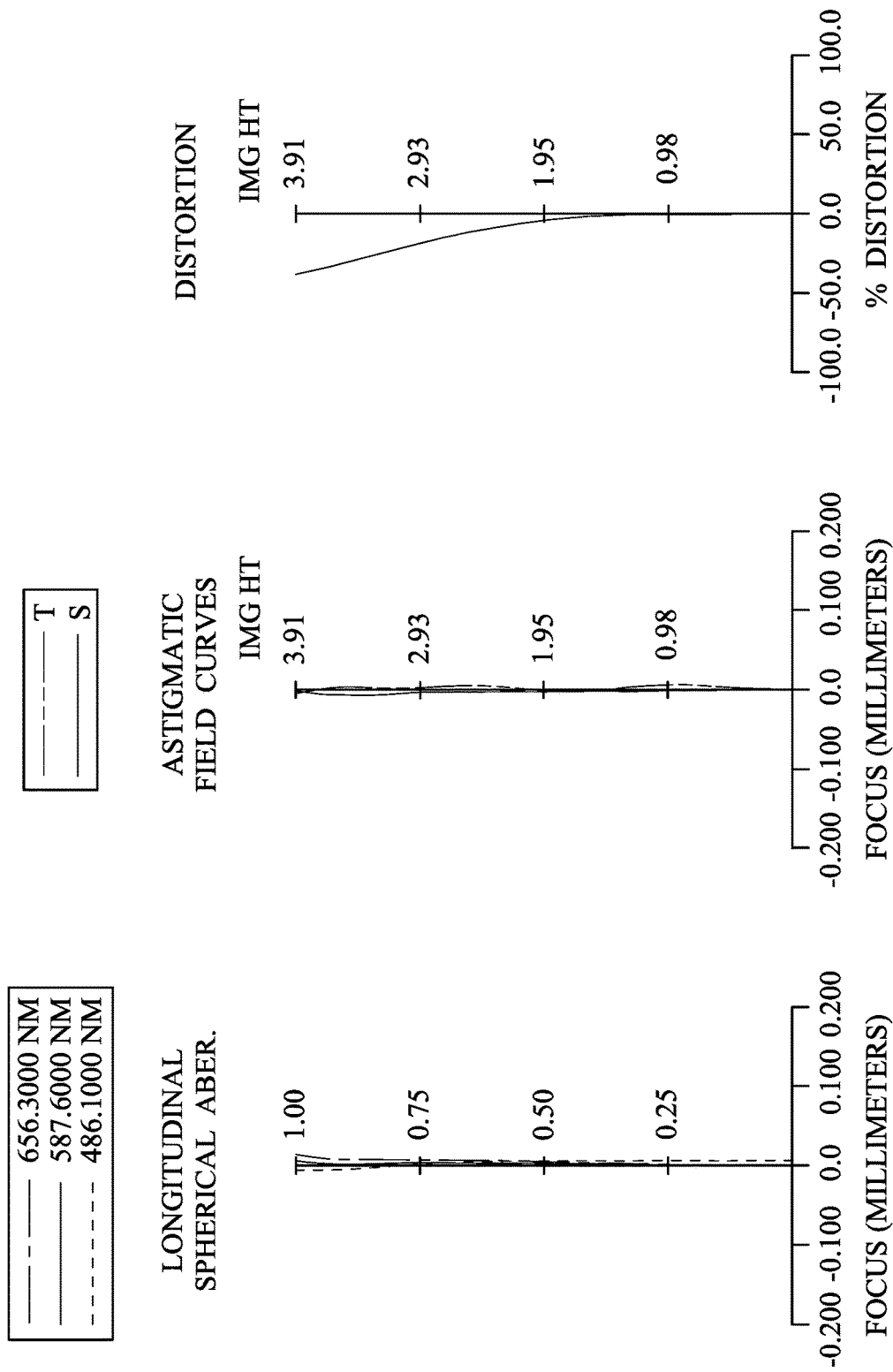
FIG. 12 shows spherical aberration curves, astigmatic field curves and a distortion curve of the image capturing apparatus according to the 6th embodiment.

FIG. 11 is a schematic view of an image capturing apparatus according to the 6th embodiment of the present disclosure. FIG. 12 shows spherical aberration curves, astigmatic field curves and a distortion curve of the image capturing apparatus according to the 6th embodiment. In FIG. 11, the image capturing apparatus includes a photographing optical lens system (its reference numeral is omitted) and an image sensor 690. The photographing optical lens system includes, in order from an object side to an image side, a first lens element 610, a second lens element 620, an aperture stop 600, a third lens element 630, a fourth lens element 640, a fifth lens element 650, a sixth lens element 660, an IR-cut filter 670 and an image surface 680, wherein the image sensor 690 is disposed on the image surface 680 of the photographing optical lens system. The photographing optical lens system has a total of six lens elements (610-660), and there is an air space between every two lens elements of the first lens element 610, the second lens element 620, the third lens element 630, the fourth lens element 640, the fifth lens element 650 and the sixth lens element 660 that are adjacent to each other.

The first lens element 610 with negative refractive power has an object-side surface 611 being convex in a paraxial region thereof and an image-side surface 612 being concave in a paraxial region thereof. The first lens element 610 is made of a plastic material, and has the object-side surface 611 and the image-side surface 612 being both aspheric.

The second lens element 620 with positive refractive power has an object-side surface 621 being concave in a paraxial region thereof and an image-side surface 622 being convex in a paraxial region thereof. The second lens element 620 is made of a plastic material, and has the object-side surface 621 and the image-side surface 622 being both aspheric.

The third lens element 630 with positive refractive power has an object-side surface 631 being convex in a paraxial region thereof and an image-side surface 632 being convex in a paraxial region thereof. The third lens element 630 is made of a plastic material, and has the object-side surface 631 and the image-side surface 632 being both aspheric.

The fourth lens element 640 with negative refractive power has an object-side surface 641 being concave in a paraxial region thereof and an image-side surface 642 being concave in a paraxial region thereof. The fourth lens element 640 is made of a plastic material, and has the object-side surface 641 and the image-side surface 642 being both aspheric.

The fifth lens element 650 with positive refractive power has an object-side surface 651 being convex in a paraxial region thereof and an image-side surface 652 being convex in a paraxial region thereof. The fifth lens element 650 is made of a plastic material, and has the object-side surface 651 and the image-side surface 652 being both aspheric.

The sixth lens element 660 with negative refractive power has an object-side surface 661 being concave in a paraxial region thereof and an image-side surface 662 being planar in a paraxial region thereof. The sixth lens element 660 is made of a plastic material, and has the object-side surface 661 and the image-side surface 662 being both aspheric. Furthermore, the object-side surface 661 and the image-side surface 662 of the sixth lens element 660 include at least one inflection point.

The IR-cut filter 670 is made of a glass material and located between the sixth lens element 660 and the image surface 680, and will not affect the focal length of the photographing optical lens system.

The detailed optical data of the 6th embodiment are shown in Table 11 and the aspheric surface data are shown in Table 12 below.

TABLE 11

6th Embodiment f = 3.63 mm, Fno = 2.46, HFOV = 60.0 deg.

| Surface # | | Curvature Radius | | Thickness | Material | Index | Abbe # | Focal Length |
|---|---|---|---|---|---|---|---|---|
| 0 | Object | Plano | | Infinity | | | | |
| 1 | Lens 1 | 3.290 | ASP | 0.559 | Plastic | 1.544 | 55.9 | −7.30 |
| 2 | | 1.691 | ASP | 1.832 | | | | |
| 3 | Lens 2 | −10.015 | ASP | 1.723 | Plastic | 1.535 | 55.8 | 12.71 |
| 4 | | −4.293 | ASP | 0.153 | | | | |
| 5 | Ape. Stop | Plano | | −0.080 | | | | |
| 6 | Lens 3 | 3.408 | ASP | 1.477 | Plastic | 1.535 | 55.8 | 2.93 |
| 7 | | −2.465 | ASP | 0.152 | | | | |
| 8 | Lens 4 | −30.318 | ASP | 0.330 | Plastic | 1.639 | 23.5 | −3.53 |
| 9 | | 2.448 | ASP | 0.350 | | | | |
| 10 | Lens 5 | 9.408 | ASP | 0.753 | Plastic | 1.544 | 55.9 | 6.14 |
| 11 | | −5.023 | ASP | 2.004 | | | | |
| 12 | Lens 6 | −3.390 | ASP | 0.449 | Plastic | 1.544 | 55.9 | −6.24 |
| 13 | | Infinity | ASP | 0.300 | | | | |
| 14 | IR-cut filter | Plano | | 0.300 | Glass | 1.517 | 64.2 | — |
| 15 | | Plano | | 0.181 | | | | |
| 16 | Image | Plano | | — | | | | |

Note: Reference wavelength is 587.6 nm (d-line).

TABLE 12

Aspheric Coefficients

| Surface # | 1 | 2 | 3 | 4 | 6 | 7 |
|---|---|---|---|---|---|---|
| k = | −7.4920E−01 | −7.8264E−01 | −5.2350E+01 | −8.4672E+00 | 2.1229E+00 | −3.9891E−01 |
| A4 = | −5.8080E−03 | 3.2856E−03 | −1.8950E−02 | −1.4844E−02 | −7.0633E−03 | 2.8042E−02 |
| A6 = | −8.1238E−04 | −6.9721E−04 | 1.1658E−03 | 4.5143E−03 | 1.9740E−03 | −2.5383E−02 |
| A8 = | 9.0935E−05 | −9.5594E−05 | −1.2146E−03 | −3.8968E−04 | −4.8219E−03 | 1.2680E−02 |
| A10 = | −1.9596E−06 | 8.2830E−05 | 3.2382E−04 | 2.3645E−04 | 3.0634E−03 | −3.8091E−03 |
| A12 = | | −3.1044E−05 | −1.4062E−05 | 9.0843E−05 | −9.1730E−04 | 4.7483E−04 |

| Surface # | 8 | 9 | 10 | 11 | 12 | 13 |
|---|---|---|---|---|---|---|
| k = | 9.0000E+01 | −1.2512E+01 | −7.2882E+01 | 2.4659E+00 | 1.7041E−01 | −5.8959E+01 |
| A4 = | −6.3391E−02 | 1.2476E−03 | −9.2357E−03 | 2.6413E−05 | −1.8881E−02 | 3.5862E−03 |
| A6 = | 4.4838E−02 | 1.0994E−02 | 3.3671E−03 | −3.3010E−03 | −1.9121E−03 | −8.1695E−03 |
| A8 = | −3.7237E−02 | −6.6640E−03 | −1.4129E−03 | 2.9954E−03 | 2.5340E−03 | 2.4346E−03 |
| A10 = | 1.9025E−02 | 2.2088E−03 | 1.0837E−03 | −1.4320E−03 | −7.9559E−04 | −4.4291E−04 |
| A12 = | −5.7209E−03 | −4.3328E−04 | −2.7080E−04 | 5.0653E−04 | 1.5137E−04 | 4.8920E−05 |
| A14 = | 7.8196E−04 | 4.4802E−05 | 1.6499E−05 | −5.9141E−05 | −1.4345E−05 | −2.9457E−06 |
| A16 = | | | | −1.7945E−20 | 5.1916E−07 | 7.5660E−08 |

In the 6th embodiment, the equation of the aspheric surface profiles of the aforementioned lens elements is the same as the equation of the 1st embodiment. Also, the definitions of these parameters shown in the following table are the same as those stated in the 1st embodiment with corresponding values for the 6th embodiment, so an explanation in this regard will not be provided again.

Moreover, these parameters can be calculated from Table 11 and Table 12 as the following values and satisfy the following conditions:

| 6th Embodiment | | | |
|---|---|---|---|
| f [mm] | 3.63 | SD/TD | 0.56 |
| Fno | 2.46 | |R6/R7| | 0.08 |
| HFOV [deg.] | 60.0 | (R5 + R6)/(R5 − R6) | 0.16 |
| |1/tan(HFOV)| | 0.58 | (R11 − R12)/(R11 + R12) | −1.00 |
| V2 | 55.8 | (R2 + R11)/(R2 − R11) | −0.33 |
| V4 | 23.5 | R11/Y61 | −1.32 |
| T12/CT1 | 3.28 | f/CT2 | 2.11 |
| BL/T56 | 0.39 | |fr/ff| | 0.11 |
| BL/TL | 0.07 | | |

In the photographing optical lens system according to the 6th embodiment, when a refractive power of the first lens element 610 is P1, a refractive power of the second lens element 620 is P2, a refractive power of the third lens element 630 is P3, a refractive power of the fourth lens element 640 is P4, a refractive power of the fifth lens element 650 is P5, and a refractive power of the sixth lens element 660 is P6, the following conditions are satisfied: |P3|>|P1|; |P3|>|P2|; |P3|>|P5|; |P3|>|P6|; |P4|>|P1|; |P4|>|P2|; |P4|>|P5|; and |P4|>|P6|.

In the photographing optical lens system according to the 6th embodiment, when an axial distance between the first lens element 610 and the second lens element 620 is T12, an axial distance between the second lens element 620 and the third lens element 630 is T23, an axial distance between the third lens element 630 and the fourth lens element 640 is T34, an axial distance between the fourth lens element 640 and the fifth lens element 650 is T45, and an axial distance between the fifth lens element 650 and the sixth lens element 660 is T56, the following conditions are satisfied: T12>T23; T12>T34; T12>T45; T56>T23; T56>T34; and T56>T45.

7th Embodiment

Figure 13:
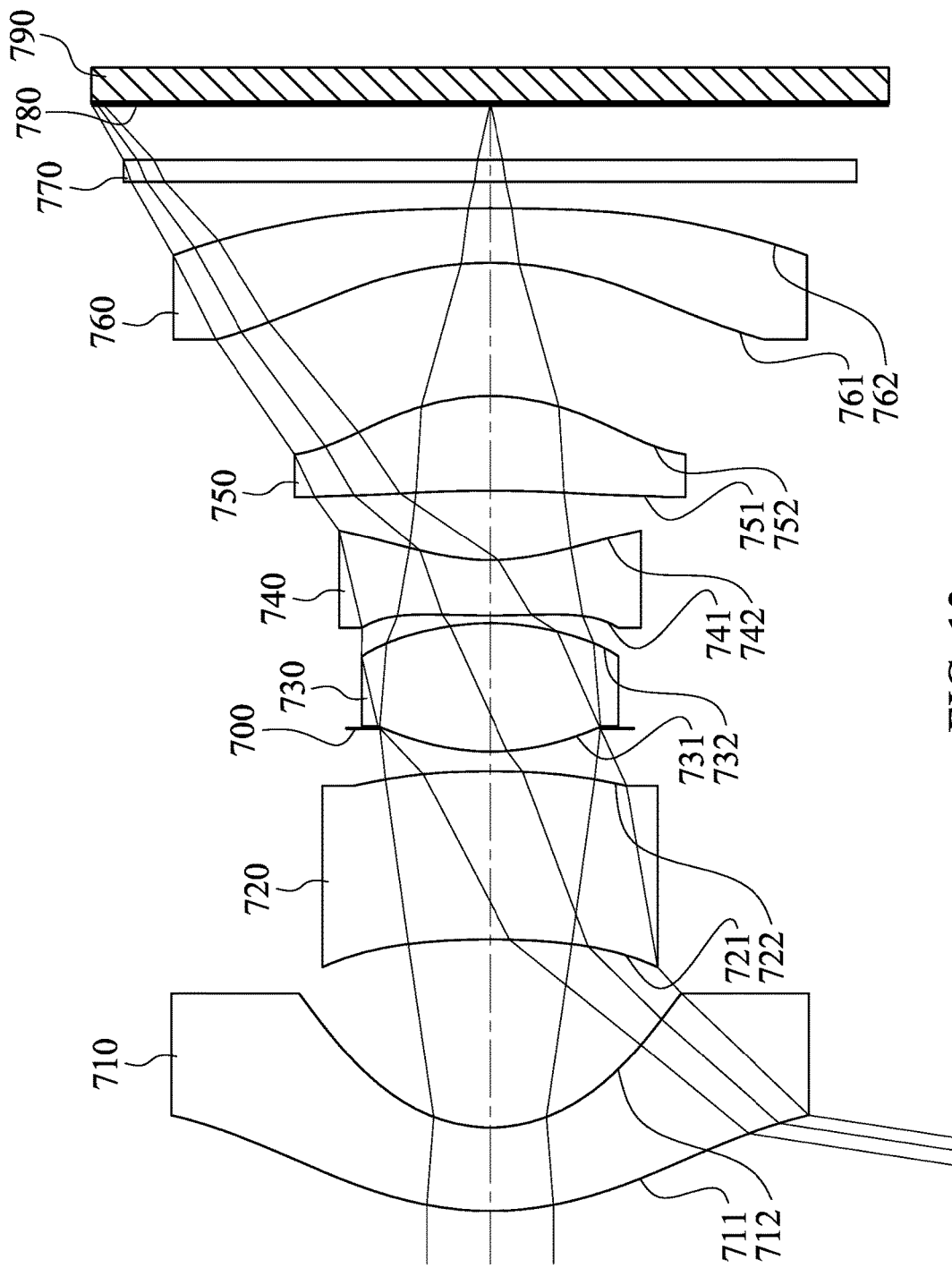
FIG. 13 is a schematic view of an image capturing apparatus according to the 7th embodiment of the present disclosure.
Figure 14:
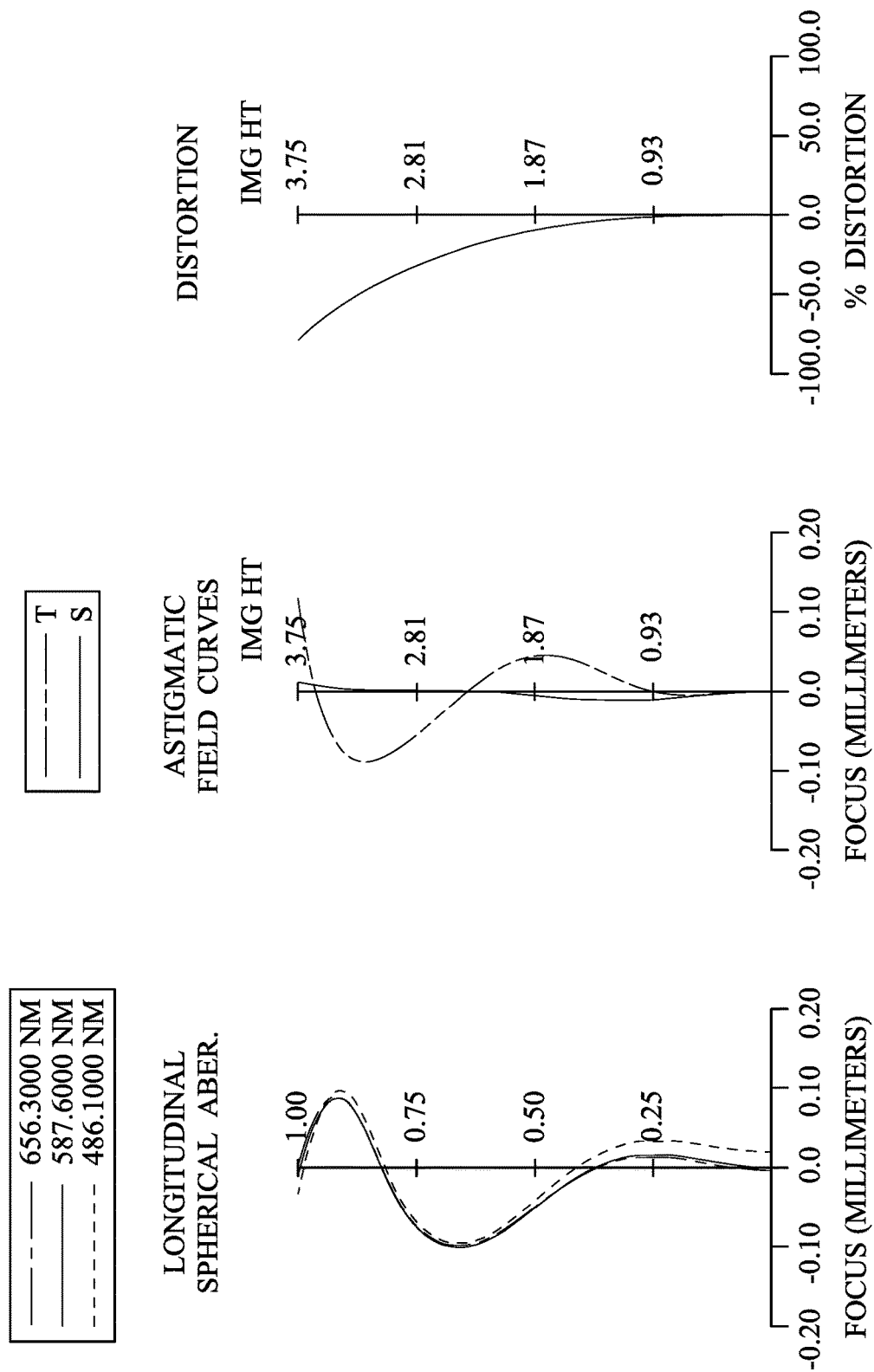
FIG. 14 shows spherical aberration curves, astigmatic field curves and a distortion curve of the image capturing apparatus according to the 7th embodiment.

FIG. 13 is a schematic view of an image capturing apparatus according to the 7th embodiment of the present disclosure. FIG. 14 shows spherical aberration curves, astigmatic field curves and a distortion curve of the image capturing apparatus according to the 7th embodiment. In FIG. 13, the image capturing apparatus includes a photographing optical lens system (its reference numeral is omitted) and an image sensor 790. The photographing optical lens system includes, in order from an object side to an image side, a first lens element 710, a second lens element 720, an aperture stop 700, a third lens element 730, a fourth lens element 740, a fifth lens element 750, a sixth lens element 760, an IR-cut filter 770 and an image surface 780, wherein the image sensor 790 is disposed on the image surface 780 of the photographing optical lens system. The photographing optical lens system has a total of six lens elements (710-760), and there is an air space between every two lens elements of the first lens element 710, the second lens element 720, the third lens element 730, the fourth lens element 740, the fifth lens element 750 and the sixth lens element 760 that are adjacent to each other.

The first lens element 710 with negative refractive power has an object-side surface 711 being convex in a paraxial region thereof and an image-side surface 712 being concave in a paraxial region thereof. The first lens element 710 is made of a glass material, and has the object-side surface 711 and the image-side surface 712 being both aspheric.

The second lens element 720 with negative refractive power has an object-side surface 721 being concave in a paraxial region thereof and an image-side surface 722 being convex in a paraxial region thereof. The second lens element 720 is made of a plastic material, and has the object-side surface 721 and the image-side surface 722 being both aspheric.

The third lens element 730 with positive refractive power has an object-side surface 731 being convex in a paraxial region thereof and an image-side surface 732 being convex in a paraxial region thereof. The third lens element 730 is made of a plastic material, and has the object-side surface 731 and the image-side surface 732 being both aspheric.

The fourth lens element 740 with negative refractive power has an object-side surface 741 being convex in a paraxial region thereof and an image-side surface 742 being concave in a paraxial region thereof. The fourth lens element 740 is made of a plastic material, and has the object-side surface 741 and the image-side surface 742 being both aspheric.

The fifth lens element 750 with positive refractive power has an object-side surface 751 being concave in a paraxial region thereof and an image-side surface 752 being convex in a paraxial region thereof. The fifth lens element 750 is made of a plastic material, and has the object-side surface 751 and the image-side surface 752 being both aspheric.

The sixth lens element 760 with negative refractive power has an object-side surface 761 being concave in a paraxial region thereof and an image-side surface 762 being convex in a paraxial region thereof. The sixth lens element 760 is made of a plastic material, and has the object-side surface 761 and the image-side surface 762 being both aspheric. Furthermore, the object-side surface 761 of the sixth lens element 760 includes at least one inflection point.

The IR-cut filter 770 is made of a glass material and located between the sixth lens element 760 and the image surface 780, and will not affect the focal length of the photographing optical lens system.

The detailed optical data of the 7th embodiment are shown in Table 13 and the aspheric surface data are shown in Table 14 below.

In the 7th embodiment, the equation of the aspheric surface profiles of the aforementioned lens elements is the same as the equation of the 1st embodiment. Also, the definitions of these parameters shown in the following table are the same as those stated in the 1st embodiment with corresponding values for the 7th embodiment, so an explanation in this regard will not be provided again.

Moreover, these parameters can be calculated from Table 13 and Table 14 as the following values and satisfy the following conditions:

| 7th Embodiment | | | |
|---|---|---|---|
| f [mm] | 2.76 | SD/TD | 0.52 |
| Fno | 2.28 | |R6/R7| | 0.24 |
| HFOV [deg.] | 81.3 | (R5 + R6)/(R5 − R6) | −0.06 |
| |1/tan(HFOV)| | 0.15 | (R11 − R12)/(R11 + R12) | −0.76 |
| V2 | 23.3 | (R2 + R11)/(R2 − R11) | −0.41 |
| V4 | 20.4 | R11/Y61 | −1.35 |

TABLE 13

7th Embodiment
f = 2.76 mm, Fno = 2.28, HFOV = 81.2 deg.

| Surface # | | Curvature Radius | Thickness | Material | Index | Abbe # | Focal Length |
|---|---|---|---|---|---|---|---|
| 0 | Object | Plano | Infinity | | | | |
| 1 | Lens 1 | 3.199 ASP | 0.793 | Glass | 1.723 | 38.7 | −4.58 |
| 2 | | 1.458 ASP | 1.796 | | | | |
| 3 | Lens 2 | −7.759 ASP | 1.605 | Plastic | 1.639 | 23.3 | −94.5 |
| 4 | | −9.622 ASP | 0.409 | | | | |
| 5 | Ape. Stop | Plano | −0.222 | | | | |
| 6 | Lens 3 | 2.177 ASP | 1.223 | Plastic | 1.544 | 55.9 | 2.33 |
| 7 | | −2.436 ASP | 0.073 | | | | |
| 8 | Lens 4 | 10.366 ASP | 0.527 | Plastic | 1.660 | 20.4 | −4.04 |
| 9 | | 2.080 ASP | 0.665 | | | | |
| 10 | Lens 5 | −15.212 ASP | 0.901 | Plastic | 1.544 | 55.9 | 4.47 |
| 11 | | −2.139 ASP | 1.273 | | | | |
| 12 | Lens 6 | −3.518 ASP | 0.520 | Plastic | 1.639 | 23.3 | −6.46 |
| 13 | | −25.305 ASP | 0.250 | | | | |
| 14 | IR-cut filter | Plano | 0.210 | Glass | 1.517 | 64.2 | — |
| 15 | | Plano | 0.534 | | | | |
| 16 | Image | Plano | — | | | | |

Note: Reference wavelength is 587.6 nm (d-line).

TABLE 14

Aspheric Coefficients

| Surface # | 1 | 2 | 3 | 4 | 6 | 7 |
|---|---|---|---|---|---|---|
| k = | −8.1070E−01 | −7.8043E−01 | −4.0103E+01 | 2.3127E+01 | −1.0560E+01 | −1.1868E+00 |
| A4 = | −8.8434E−04 | 1.4975E−02 | −2.3424E−02 | −4.0742E−02 | 5.6205E−02 | 2.3033E−02 |
| A6 = | −1.5726E−03 | −4.2952E−03 | 4.1914E−03 | 2.1502E−02 | 2.0903E−02 | −1.4426E−02 |
| A8 = | 1.1048E−04 | 1.6034E−03 | −3.4402E−03 | −1.2801E−03 | −5.9454E−02 | 1.2880E−02 |
| A10 = | 3.7551E−07 | −4.4529E−04 | 1.0492E−03 | −3.3110E−03 | 3.4284E−02 | −1.8704E−02 |
| A12 = | −1.8370E−07 | 2.5238E−06 | −8.9426E−05 | 1.3053E−03 | −6.0121E−03 | 5.2185E−03 |

| Surface # | 8 | 9 | 10 | 11 | 12 | 13 |
|---|---|---|---|---|---|---|
| k = | −6.6819E+01 | −9.6589E+00 | 4.4044E+01 | −7.0567E−01 | −2.1809E−01 | 4.7621E+01 |
| A4 = | −5.7099E−02 | 1.6802E−02 | −9.6122E−03 | 4.1328E−03 | −7.0576E−03 | −5.8246E−03 |
| A6 = | 2.5991E−03 | −1.8224E−02 | 1.3038E−02 | 5.7632E−03 | 3.4075E−03 | −8.3372E−05 |
| A8 = | −1.9069E−02 | 1.1045E−02 | −2.8455E−03 | −4.2321E−04 | 4.4625E−04 | 1.0800E−04 |
| A10 = | 4.9871E−03 | 5.2491E−03 | 3.3041E−04 | 5.5833E−04 | −2.4908E−04 | 4.5089E−06 |
| A12 = | −2.4297E−04 | −2.7748E−03 | −9.4089E−05 | −1.2208E−04 | 3.7078E−05 | −3.0380E−06 |
| A14 = | −1.9900E−17 | 5.4299E−04 | −2.2713E−17 | 1.4340E−06 | −2.4888E−06 | 2.6933E−07 |
| A16 = | | | | 6.4995E−08 | | −7.6831E−09 |

-continued

7th Embodiment

| T12/CT1 | 2.26 | f/CT2 | 1.72 |
|---|---|---|---|
| BL/T56 | 0.78 | |fr/ff| | 0.61 |
| BL/TL | 0.09 | | |

In the photographing optical lens system according to the 7th embodiment, when a refractive power of the first lens element 710 is P1, a refractive power of the second lens element 720 is P2, a refractive power of the third lens element 730 is P3, a refractive power of the fourth lens element 740 is P4, a refractive power of the fifth lens element 750 is P5, and a refractive power of the sixth lens element 760 is P6, the following conditions are satisfied: |P3|>|P1|; |P3|>|P2|; |P3|>|P5|; |P3|>|P6|; |P4|>|P4|>|P2|; |P4|>|P5|; and |P4|>|P6|.

In the photographing optical lens system according to the 7th embodiment, when an axial distance between the first lens element 710 and the second lens element 720 is T12, an axial distance between the second lens element 720 and the third lens element 730 is T23, an axial distance between the third lens element 730 and the fourth lens element 740 is T34, an axial distance between the fourth lens element 740 and the fifth lens element 750 is T45, and an axial distance between the fifth lens element 750 and the sixth lens element 760 is T56, the following conditions are satisfied: T12>T23; T12>T34; T12>T45; T56>T23; T56>T34; and T56>T45.

8th Embodiment

Figure 15:
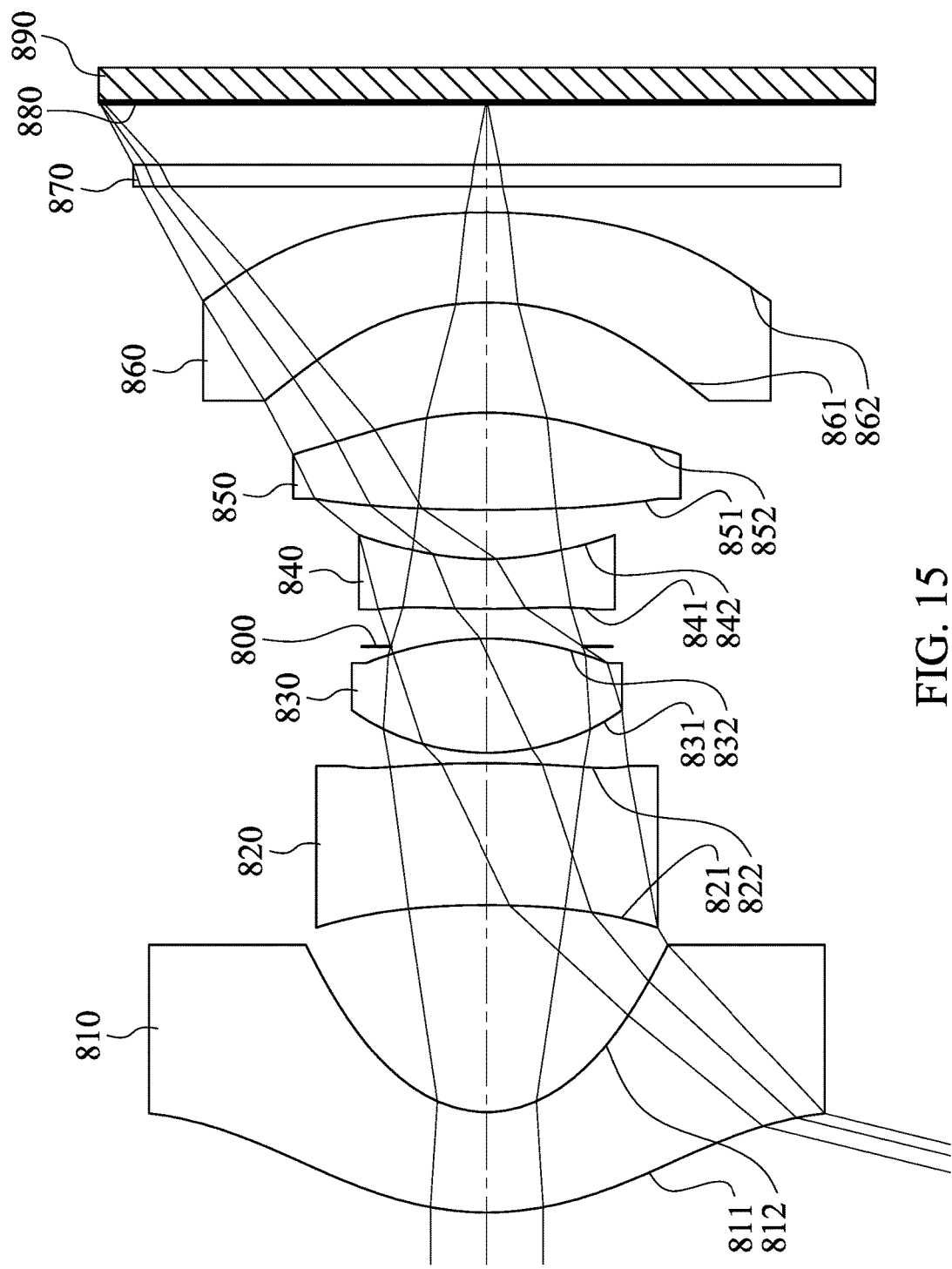
FIG. 15 is a schematic view of an image capturing apparatus according to the 8th embodiment of the present disclosure.
Figure 16:
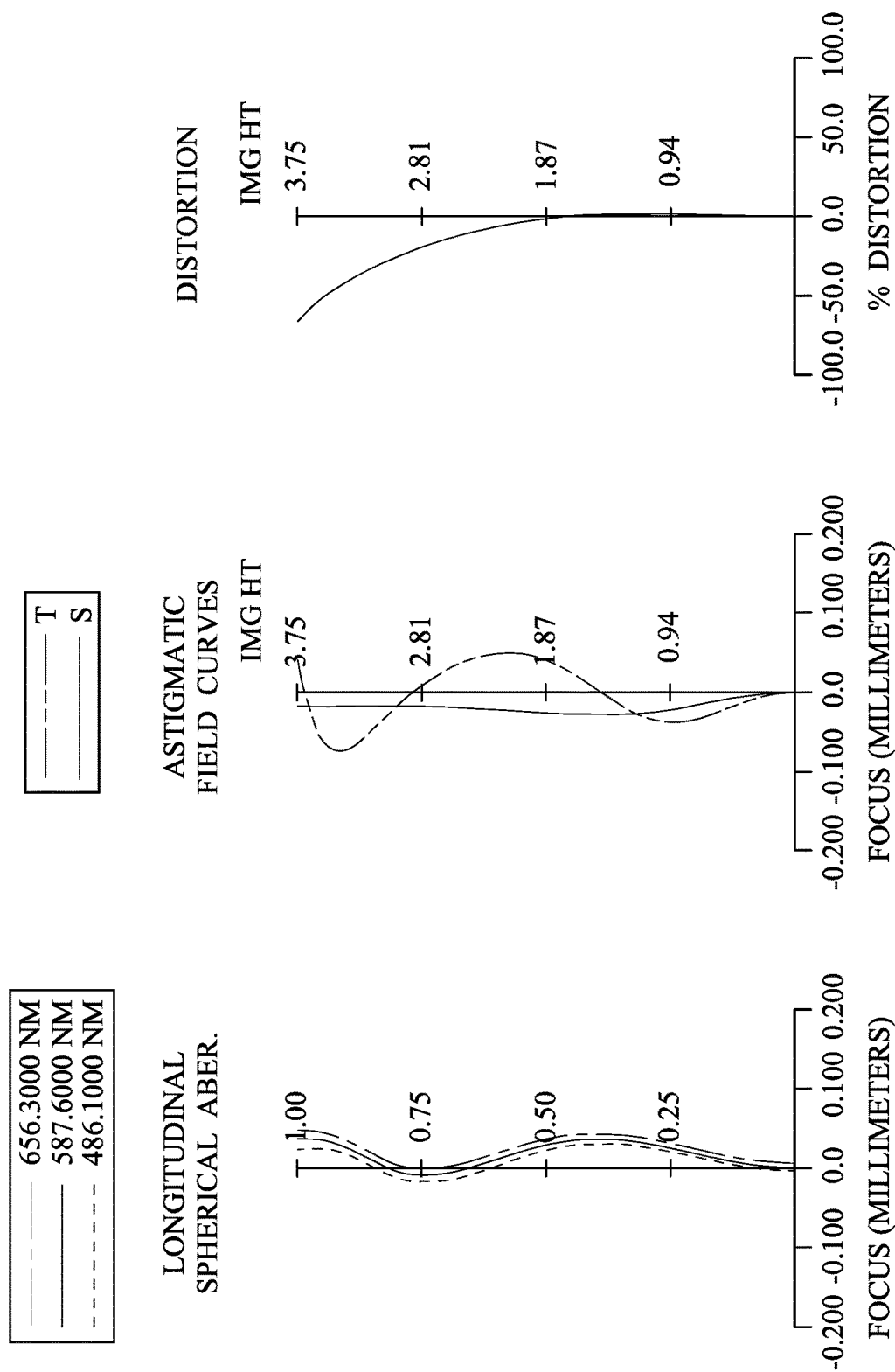
FIG. 16 shows spherical aberration curves, astigmatic field curves and a distortion curve of the image capturing apparatus according to the 8th embodiment.

FIG. 15 is a schematic view of an image capturing apparatus according to the 8th embodiment of the present disclosure. FIG. 16 shows spherical aberration curves, astigmatic field curves and a distortion curve of the image capturing apparatus according to the 8th embodiment. In FIG. 15, the image capturing apparatus includes a photographing optical lens system (its reference numeral is omitted) and an image sensor 890. The photographing optical lens system includes, in order from an object side to an image side, a first lens element 810, a second lens element 820, a third lens element 830, an aperture stop 800, a fourth lens element 840, a fifth lens element 850, a sixth lens element 860, an IR-cut filter 870 and an image surface 880, wherein the image sensor 890 is disposed on the image surface 880 of the photographing optical lens system. The photographing optical lens system has a total of six lens elements (810-860), and there is an air space between every two lens elements of the first lens element 810, the second lens element 820, the third lens element 830, the fourth lens element 840, the fifth lens element 850 and the sixth lens element 860 that are adjacent to each other.

The first lens element 810 with negative refractive power has an object-side surface 811 being convex in a paraxial region thereof and an image-side surface 812 being concave in a paraxial region thereof. The first lens element 810 is made of a plastic material, and has the object-side surface 811 and the image-side surface 812 being both aspheric.

The second lens element 820 with negative refractive power has an object-side surface 821 being concave in a paraxial region thereof and an image-side surface 822 being convex in a paraxial region thereof. The second lens element 820 is made of a plastic material, and has the object-side surface 821 and the image-side surface 822 being both aspheric.

The third lens element 830 with positive refractive power has an object-side surface 831 being convex in a paraxial region thereof and an image-side surface 832 being convex in a paraxial region thereof. The third lens element 830 is made of a plastic material, and has the object-side surface 831 and the image-side surface 832 being both aspheric.

The fourth lens element 840 with negative refractive power has an object-side surface 841 being convex in a paraxial region thereof and an image-side surface 842 being concave in a paraxial region thereof. The fourth lens element 840 is made of a plastic material, and has the object-side surface 841 and the image-side surface 842 being both aspheric.

The fifth lens element 850 with positive refractive power has an object-side surface 851 being convex in a paraxial region thereof and an image-side surface 852 being convex in a paraxial region thereof. The fifth lens element 850 is made of a plastic material, and has the object-side surface 851 and the image-side surface 852 being both aspheric.

The sixth lens element 860 with negative refractive power has an object-side surface 861 being concave in a paraxial region thereof and an image-side surface 862 being convex in a paraxial region thereof. The sixth lens element 860 is made of a plastic material, and has the object-side surface 861 and the image-side surface 862 being both aspheric. Furthermore, the object-side surface 861 of the sixth lens element 860 includes at least one inflection point.

The IR-cut filter 870 is made of a glass material and located between the sixth lens element 860 and the image surface 880, and will not affect the focal length of the photographing optical lens system.

The detailed optical data of the 8th embodiment are shown in Table 15 and the aspheric surface data are shown in Table 16 below.

TABLE 15

8th Embodiment
f = 2.71 mm, Fno = 2.48, HFOV = 76.1 deg.

| Surface # | | Curvature Radius | Thickness | Material | Index | Abbe # | Focal Length |
|---|---|---|---|---|---|---|---|
| 0 | Object | Plano | Infinity | | | | |
| 1 | Lens 1 | 2.990 ASP | 0.969 | Plastic | 1.544 | 55.9 | −4.01 |
| 2 | | 1.117 ASP | 2.008 | | | | |
| 3 | Lens 2 | −8.933 ASP | 1.378 | Plastic | 1.639 | 23.3 | −54.91 |
| 4 | | −12.707 ASP | 0.100 | | | | |
| 5 | Lens 3 | 2.257 ASP | 1.106 | Plastic | 1.544 | 55.9 | 2.47 |
| 6 | | −2.749 ASP | −0.079 | | | | |
| 7 | Ape. Stop | Plano | 0.366 | | | | |
| 8 | Lens 4 | 10.204 ASP | 0.480 | Plastic | 1.660 | 20.4 | −5.65 |

TABLE 15-continued

8th Embodiment
f = 2.71 mm, Fno = 2.48, HFOV = 76.1 deg.

| Surface # | | Curvature Radius | | Thickness | Material | Index | Abbe # | Focal Length |
|---|---|---|---|---|---|---|---|---|
| 9 | | 2.680 | ASP | 0.481 | | | | |
| 10 | Lens 5 | 14.014 | ASP | 0.940 | Plastic | 1.544 | 55.9 | 5.03 |
| 11 | | −3.317 | ASP | 1.066 | | | | |
| 12 | Lens 6 | −2.961 | ASP | 0.877 | Plastic | 1.639 | 23.3 | −9.44 |
| 13 | | −6.485 | ASP | 0.250 | | | | |
| 14 | IR-cut filter | Plano | | 0.210 | Glass | 1.517 | 64.2 | — |
| 15 | | Plano | | 0.602 | | | | |
| 16 | Image | Plano | | — | | | | |

Note: Reference wavelength is 587.6 nm (d-line).

TABLE 16

Aspheric Coefficients

| Surface # | 1 | 2 | 3 | 4 | 5 | 6 |
|---|---|---|---|---|---|---|
| k = | −1.0588E+00 | −8.1257E−01 | −4.6198E+01 | −1.4948E+01 | −5.4531E−01 | −1.0335E+00 |
| A4 = | −8.8434E−04 | 1.4975E−02 | −1.9759E−02 | −2.1492E−02 | −2.1103E−02 | 1.9215E−02 |
| A6 = | −1.5726E−03 | −4.2952E−03 | 5.4733E−03 | 2.6173E−02 | 4.7372E−02 | −3.7339E−02 |
| A8 = | 1.1048E−04 | 1.6034E−03 | −3.1337E−03 | −8.5159E−03 | −4.6904E−02 | 4.5299E−02 |
| A10 = | 3.7551E−07 | −4.4529E−04 | 9.6903E−04 | −1.2224E−04 | 2.7012E−02 | −2.5749E−02 |
| A12 = | −1.8370E−07 | 2.5238E−06 | −8.9426E−05 | 1.3053E−03 | −6.0121E−03 | 5.2185E−03 |

| Surface # | 8 | 9 | 10 | 11 | 12 | 13 |
|---|---|---|---|---|---|---|
| k = | −9.0000E+01 | −1.1422E+01 | 4.5602E+01 | −5.1371E−01 | 3.6804E−01 | −3.8244E+00 |
| A4 = | −4.0870E−02 | 1.9842E−02 | −1.5516E−02 | 4.7904E−03 | −1.6820E−02 | −3.5957E−03 |
| A6 = | 2.9183E−02 | −4.7811E−04 | 1.0807E−02 | 3.1473E−03 | 3.5491E−03 | −1.0185E−03 |
| A8 = | −4.6473E−02 | −8.4828E−03 | −2.8079E−03 | −8.1411E−04 | 6.1363E−04 | 9.6735E−05 |
| A10 = | 1.7584E−02 | 7.2875E−03 | 4.9193E−04 | 5.4626E−04 | −2.1887E−04 | 1.0464E−05 |
| A12 = | −2.4297E−04 | −2.7748E−03 | −9.4089E−05 | −1.2208E−04 | 3.7078E−05 | −3.0380E−06 |
| A14 = | −9.0607E−20 | 5.4299E−04 | −1.0342E−19 | 1.4340E−06 | −2.4888E−06 | 2.6933E−07 |
| A16 = | | | | | 6.4995E−08 | −7.6831E−09 |

In the 8th embodiment, the equation of the aspheric surface profiles of the aforementioned lens elements is the same as the equation of the 1st embodiment. Also, the definitions of these parameters shown in the following table are the same as those stated in the 1st embodiment with corresponding values for the 8th embodiment, so an explanation in this regard will not be provided again.

Moreover, these parameters can be calculated from Table 15 and Table 16 as the following values and satisfy the following conditions:

| 8th Embodiment | | | |
|---|---|---|---|
| f [mm] | 2.71 | SD/TD | 0.43 |
| Fno | 2.48 | |R6/R7| | 0.27 |
| HFOV [deg.] | 76.1 | (R5 + R6)/(R5 − R6) | −0.10 |
| |1/tan(HFOV)| | 0.25 | (R11 − R12)/(R11 + R12) | −0.37 |
| V2 | 23.3 | (R2 + R11)/(R2 − R11) | −0.45 |
| V4 | 20.4 | R11/Y61 | −1.38 |
| T12/CT1 | 2.07 | f/CT2 | 1.97 |
| BL/T56 | 1.00 | |fr/f| | 7.04 |
| BL/TL | 0.10 | | |

In the photographing optical lens system according to the 8th embodiment, when an axial distance between the first lens element 810 and the second lens element 820 is T12, an axial distance between the second lens element 820 and the third lens element 830 is T23, an axial distance between the third lens element 830 and the fourth lens element 840 is T34, an axial distance between the fourth lens element 840 and the fifth lens element 850 is T45, and an axial distance between the fifth lens element 850 and the sixth lens element 860 is T56, the following conditions are satisfied: T12>T23; T12>T34; T12>T45; T56>T23; T56>T34; and T56>T45.

9th Embodiment

Figure 17:
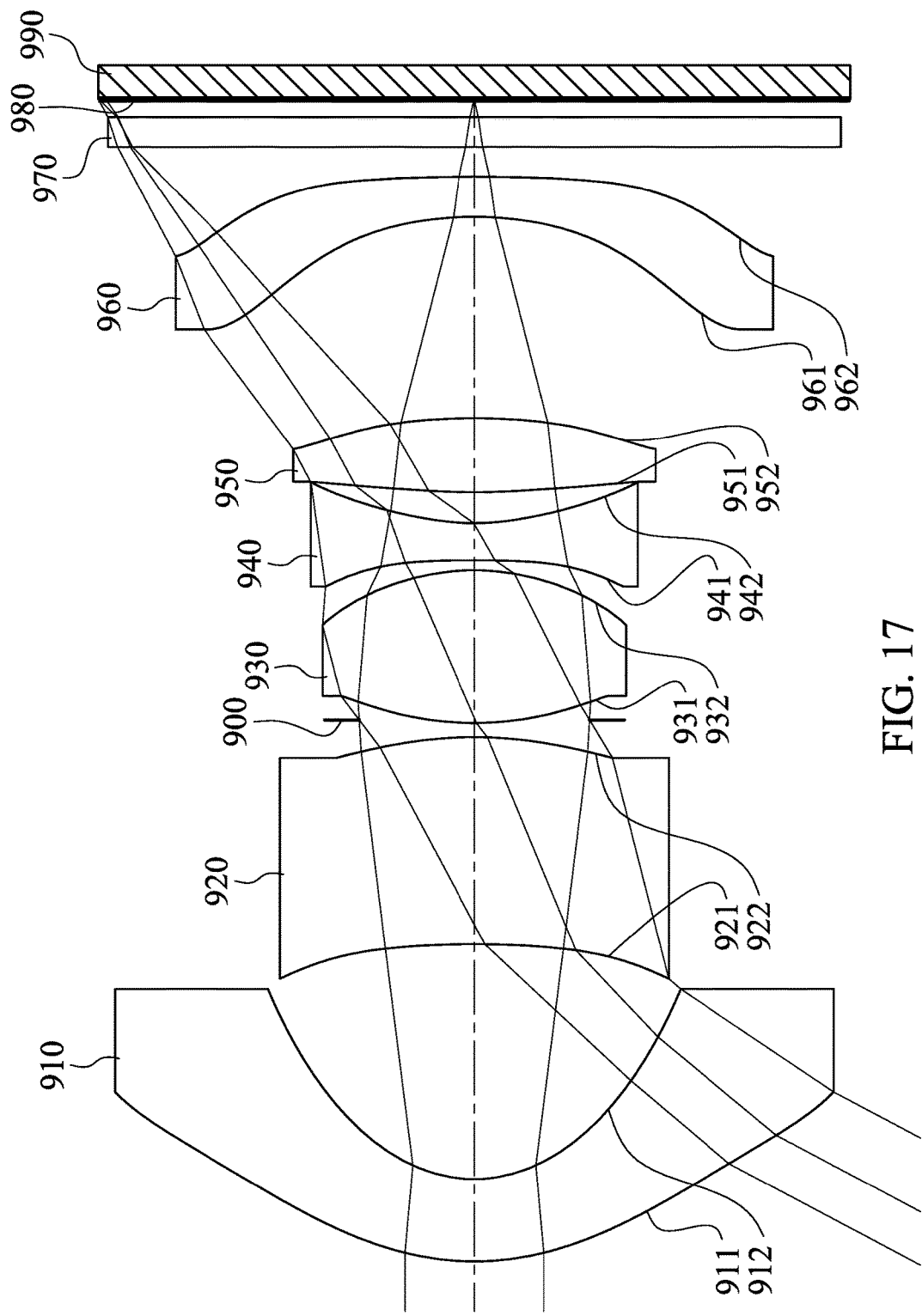
FIG. 17 is a schematic view of an image capturing apparatus according to the 9th embodiment of the present disclosure.
Figure 18:
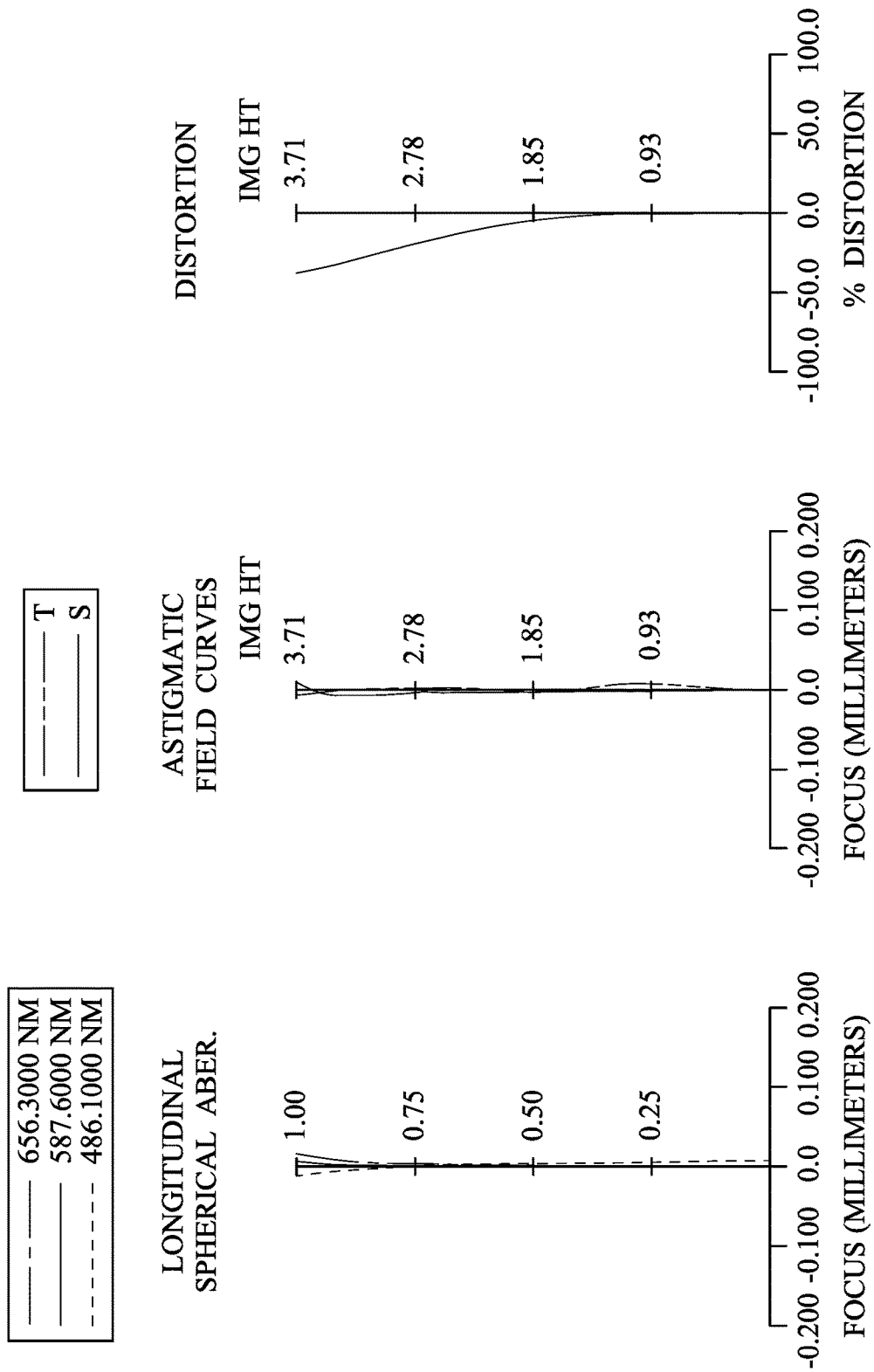
FIG. 18 shows spherical aberration curves, astigmatic field curves and a distortion curve of the image capturing apparatus according to the 9th embodiment.

FIG. 17 is a schematic view of an image capturing apparatus according to the 9th embodiment of the present disclosure. FIG. 18 shows spherical aberration curves, astigmatic field curves and a distortion curve of the image capturing apparatus according to the 9th embodiment. In FIG. 17, the image capturing apparatus includes a photographing optical lens system (its reference numeral is omitted) and an image sensor 990. The photographing optical lens system includes, in order from an object side to an image side, a first lens element 910, a second lens element 920, an aperture stop 900, a third lens element 930, a fourth lens element 940, a fifth lens element 950, a sixth lens element 960, an IR-cut filter 970 and an image surface 980, wherein the image sensor 990 is disposed on the image surface 980 of the photographing optical lens system. The photographing optical lens system has a total of six lens elements (910-960), and there is an air space between every two lens elements of the first lens element 910, the second lens element 920, the third lens element 930, the fourth lens element 940, the fifth lens element 950 and the sixth lens element 960 that are adjacent to each other.

The first lens element 910 with negative refractive power has an object-side surface 911 being convex in a paraxial region thereof and an image-side surface 912 being concave in a paraxial region thereof. The first lens element 910 is made of a glass material, and has the object-side surface 911 and the image-side surface 912 being both aspheric.

The second lens element 920 with positive refractive power has an object-side surface 921 being concave in a paraxial region thereof and an image-side surface 922 being convex in a paraxial region thereof. The second lens element 920 is made of a plastic material, and has the object-side surface 921 and the image-side surface 922 being both aspheric.

The third lens element 930 with positive refractive power has an object-side surface 931 being convex in a paraxial region thereof and an image-side surface 932 being convex in a paraxial region thereof. The third lens element 930 is made of a plastic material, and has the object-side surface 931 and the image-side surface 932 being both aspheric.

The fourth lens element 940 with negative refractive power has an object-side surface 941 being concave in a paraxial region thereof and an image-side surface 942 being concave in a paraxial region thereof. The fourth lens element 940 is made of a plastic material, and has the object-side surface 941 and the image-side surface 942 being both aspheric.

The fifth lens element 950 with positive refractive power has an object-side surface 951 being convex in a paraxial region thereof and an image-side surface 952 being convex in a paraxial region thereof. The fifth lens element 950 is made of a plastic material, and has the object-side surface 951 and the image-side surface 952 being both aspheric.

The sixth lens element 960 with negative refractive power has an object-side surface 961 being concave in a paraxial region thereof and an image-side surface 962 being convex in a paraxial region thereof. The sixth lens element 960 is made of a plastic material, and has the object-side surface 961 and the image-side surface 962 being both aspheric. Furthermore, the object-side surface 961 and the image-side surface 962 of the sixth lens element 960 include at least one inflection point.

The IR-cut filter 970 is made of a glass material and located between the sixth lens element 960 and the image surface 980, and will not affect the focal length of the photographing optical lens system.

The detailed optical data of the 9th embodiment are shown in Table 17 and the aspheric surface data are shown in Table 18 below.

TABLE 17

9th Embodiment
f = 3.16 mm, Fno = 2.26, HFOV = 62.0 deg.

| Surface # | | Curvature Radius | Thickness | Material | Index | Abbe # | Focal Length |
|---|---|---|---|---|---|---|---|
| 0 | Object | Plano | Infinity | | | | |
| 1 | Lens 1 | 2.826 ASP | 0.831 | Glass | 1.589 | 61.3 | −6.16 |
| 2 | | 1.416 ASP | 2.364 | | | | |
| 3 | Lens 2 | −10.532 ASP | 2.085 | Plastic | 1.535 | 55.8 | 13.04 |
| 4 | | −4.485 ASP | 0.174 | | | | |
| 5 | Ape. Stop | Plano | −0.031 | | | | |
| 6 | Lens 3 | 3.161 ASP | 1.541 | Plastic | 1.535 | 55.8 | 2.79 |
| 7 | | −2.341 ASP | 0.100 | | | | |
| 8 | Lens 4 | −19.491 ASP | 0.373 | Plastic | 1.639 | 23.5 | −3.26 |
| 9 | | 2.351 ASP | 0.312 | | | | |
| 10 | Lens 5 | 6.903 ASP | 0.749 | Plastic | 1.544 | 55.9 | 6.17 |
| 11 | | −6.271 ASP | 2.024 | | | | |
| 12 | Lens 6 | −3.797 ASP | 0.408 | Plastic | 1.544 | 55.9 | −9.21 |
| 13 | | −16.329 ASP | 0.300 | | | | |
| 14 | IR-cut filter | Plano | 0.300 | Glass | 1.517 | 64.2 | — |
| 15 | | Plano | 0.179 | | | | |
| 16 | Image | Plano | — | | | | |

Note: Reference wavelength is 587.6 nm (d-line).

TABLE 18

Aspheric Coefficients

| Surface # | 1 | 2 | 3 | 4 | 6 | 7 |
|---|---|---|---|---|---|---|
| k = | −5.1327E−01 | −6.5808E−01 | −8.0865E+01 | −7.3659E+00 | 8.2795E−02 | −2.3205E−01 |
| A4 = | −3.3043E−03 | 3.9373E−03 | −1.8012E−02 | −1.4348E−02 | −4.9603E−03 | 2.4401E−02 |
| A6 = | −1.0482E−03 | −1.8097E−03 | 2.2715E−03 | 5.4299E−03 | 3.9790E−03 | −2.4728E−02 |
| A8 = | 7.6135E−05 | −3.3951E−04 | −1.3105E−03 | −1.3660E−03 | −5.6149E−03 | 1.3341E−02 |
| A10 = | −2.0813E−06 | 1.9819E−04 | 2.8849E−04 | 4.0792E−04 | 2.9776E−03 | −4.2796E−03 |
| A12 = | | −3.1044E−05 | −1.4062E−05 | 9.0843E−05 | −9.1730E−04 | 4.7483E−04 |

| Surface # | 8 | 9 | 10 | 11 | 12 | 13 |
|---|---|---|---|---|---|---|
| k = | 8.0490E+01 | −1.2050E+01 | −6.2075E+01 | 5.1661E+00 | 6.8595E−02 | −5.8959E+01 |
| A4 = | −7.1756E−02 | 2.3918E−03 | −9.6219E−03 | −7.8700E−03 | −1.4925E−02 | 7.7724E−03 |
| A6 = | 4.5101E−02 | 1.0992E−02 | 4.1840E−03 | −1.7179E−03 | −2.9748E−03 | −9.4586E−03 |
| A8 = | −3.6619E−02 | −6.5148E−03 | −1.8877E−03 | 2.7855E−03 | 2.4978E−03 | 2.7429E−03 |
| A10 = | 1.9121E−02 | 2.2433E−03 | 1.0844E−03 | −1.5035E−03 | −7.8989E−04 | −5.3504E−04 |

TABLE 18-continued

| Aspheric Coefficients | | | | | |
|---|---|---|---|---|---|
| A12 = | −5.7209E−03 | −4.3328E−04 | −2.7080E−04 | 5.0653E−04 | 1.5137E−04 | 6.6059E−05 |
| A14 = | 7.8196E−04 | 4.4802E−05 | 1.6499E−05 | −5.9141E−05 | −1.4345E−05 | −4.4728E−06 |
| A16 = | | | | −2.1293E−18 | 5.1916E−07 | 1.2889E−07 |

In the 9th embodiment, the equation of the aspheric surface profiles of the aforementioned lens elements is the same as the equation of the 1st embodiment. Also, the definitions of these parameters shown in the following table are the same as those stated in the 1st embodiment with corresponding values for the 9th embodiment, so an explanation in this regard will not be provided again.

Moreover, these parameters can be calculated from Table 17 and Table 18 as the following values and satisfy the following conditions:

| 9th Embodiment | | | |
|---|---|---|---|
| f [mm] | 3.16 | SD/TD | 0.50 |
| Fno | 2.26 | |R6/R7| | 0.12 |
| HFOV [deg.] | 62.0 | (R5 + R6)/(R5 − R6) | 0.15 |
| |1/tan(HFOV)| | 0.53 | (R11 − R12)/(R11 + R12) | −0.62 |
| V2 | 55.8 | (R2 + R11)/(R2 − R11) | −0.46 |
| V4 | 23.5 | R11/Y61 | −1.40 |
| T12/CT1 | 2.84 | f/CT2 | 1.52 |
| BL/T56 | 0.38 | |fr/ff| | 0.17 |
| BL/TL | 0.07 | | |

In the photographing optical lens system according to the 9th embodiment, when a refractive power of the first lens element 910 is P1, a refractive power of the second lens element 920 is P2, a refractive power of the third lens element 930 is P3, a refractive power of the fourth lens element 940 is P4, a refractive power of the fifth lens element 950 is P5, and a refractive power of the sixth lens element 960 is P6, the following conditions are satisfied: |P3|>|P1|; |P3|>|P2|; |P3|>|P5|; |P3|>|P6|; |P4|>|P1|; |P4|>|P2|; |P4|>|P5|; and |P4|>|P6|.

In the photographing optical lens system according to the 9th embodiment, when an axial distance between the first lens element 910 and the second lens element 920 is T12, an axial distance between the second lens element 920 and the third lens element 930 is T23, an axial distance between the third lens element 930 and the fourth lens element 940 is T34, an axial distance between the fourth lens element 940 and the fifth lens element 950 is T45, and an axial distance between the fifth lens element 950 and the sixth lens element 960 is T56, the following conditions are satisfied: T12>T23; T12>T34; T12>T45; T56>T23; T56>T34; and T56>T45.

10th Embodiment

Figure 19:
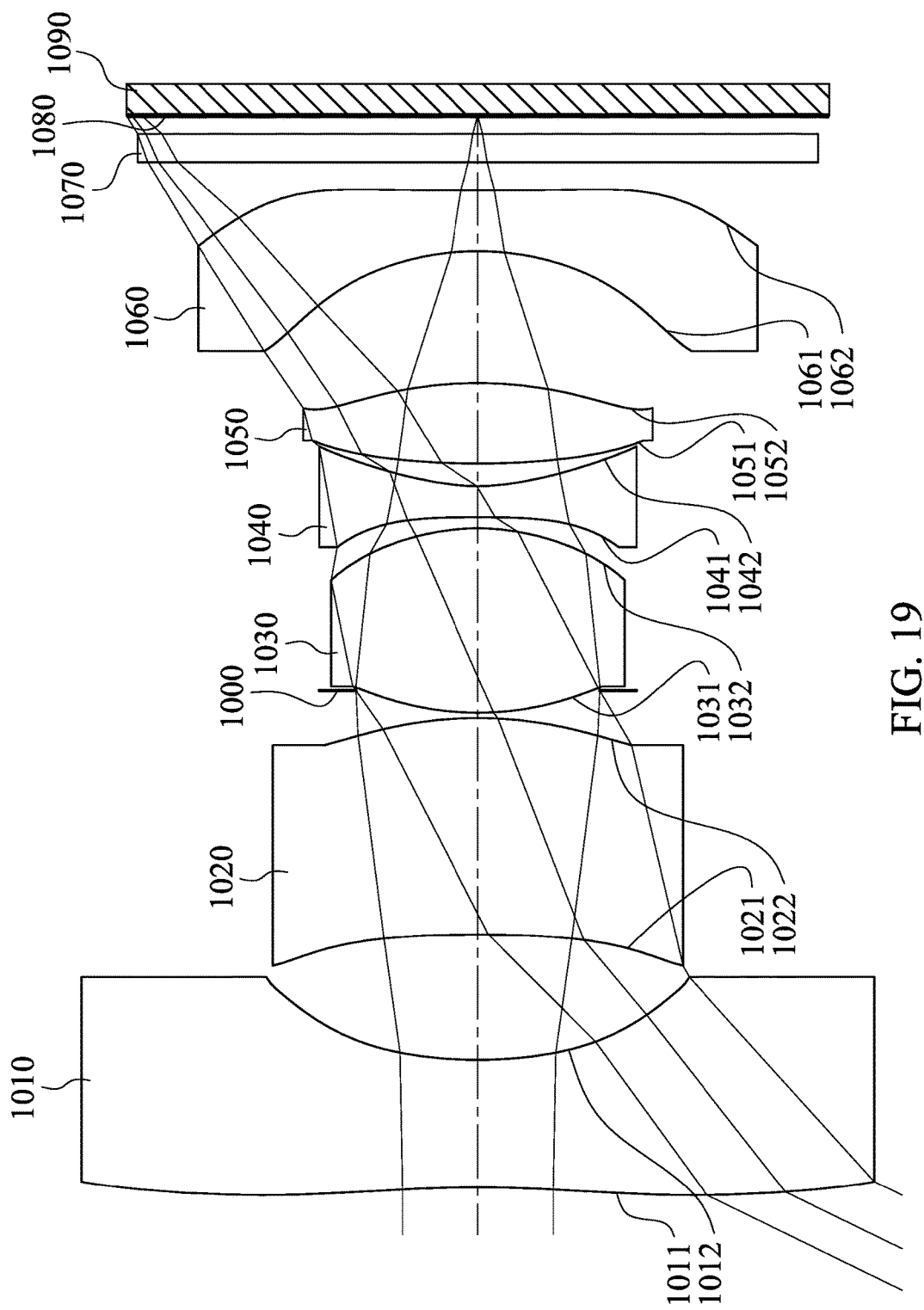
FIG. 19 is a schematic view of an image capturing apparatus according to the 10th embodiment of the present disclosure.
Figure 20:
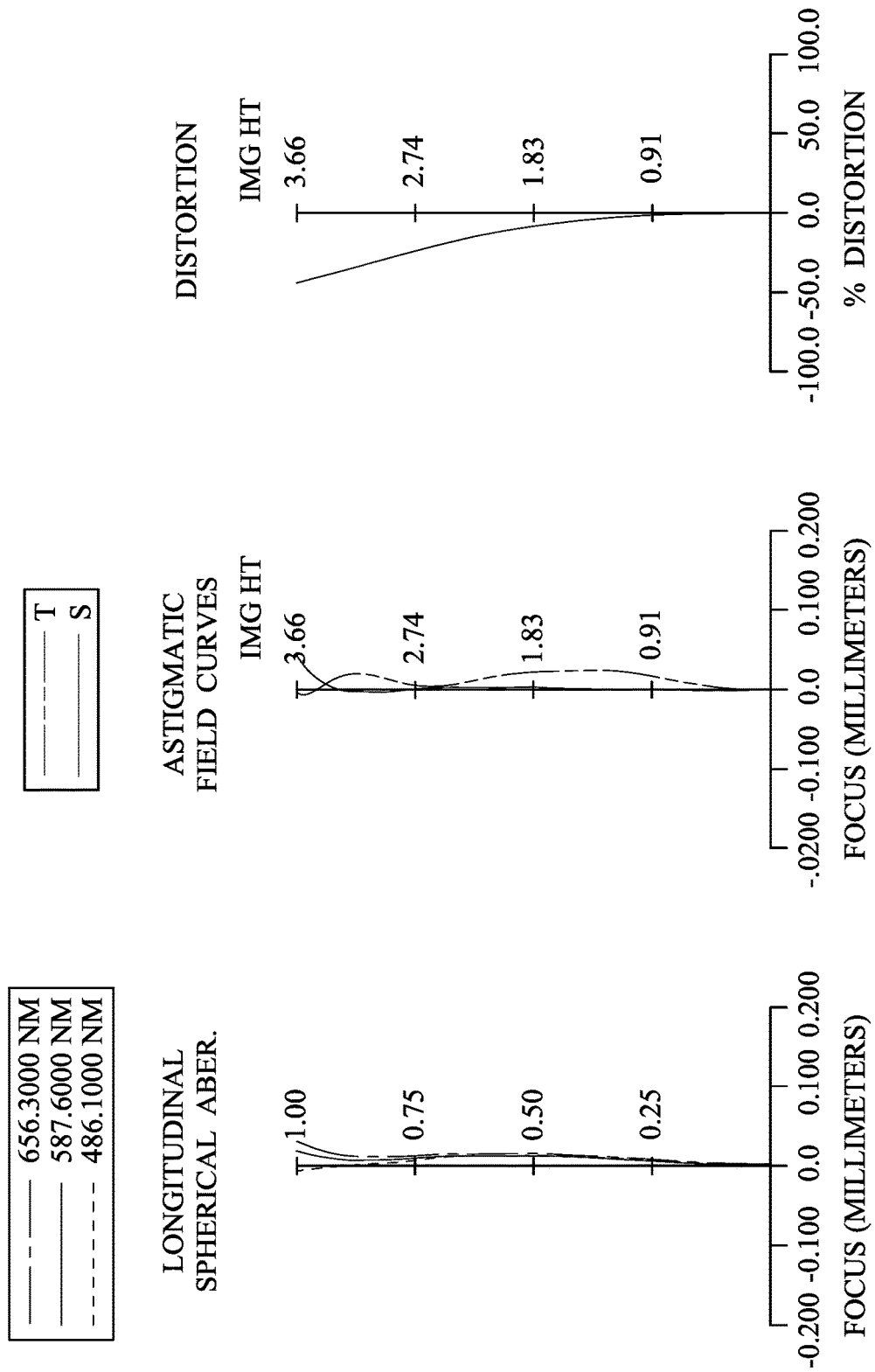
FIG. 20 shows spherical aberration curves, astigmatic field curves and a distortion curve of the image capturing apparatus according to the 10th embodiment.

FIG. 19 is a schematic view of an image capturing apparatus according to the 10th embodiment of the present disclosure. FIG. 20 shows spherical aberration curves, astigmatic field curves and a distortion curve of the image capturing apparatus according to the 10th embodiment. In FIG. 19, the image capturing apparatus includes a photographing optical lens system (its reference numeral is omitted) and an image sensor 1090. The photographing optical lens system includes, in order from an object side to an image side, a first lens element 1010, a second lens element 1020, an aperture stop 1000, a third lens element 1030, a fourth lens element 1040, a fifth lens element 1050, a sixth lens element 1060, an IR-cut filter 1070 and an image surface 1080, wherein the image sensor 1090 is disposed on the image surface 1080 of the photographing optical lens system. The photographing optical lens system has a total of six lens elements (1010-1060), and there is an air space between every two lens elements of the first lens element 1010, the second lens element 1020, the third lens element 1030, the fourth lens element 1040, the fifth lens element 1050 and the sixth lens element 1060 that are adjacent to each other.

The first lens element 1010 with negative refractive power has an object-side surface 1011 being concave in a paraxial region thereof and an image-side surface 1012 being concave in a paraxial region thereof. The first lens element 1010 is made of a plastic material, and has the object-side surface 1011 and the image-side surface 1012 being both aspheric.

The second lens element 1020 with positive refractive power has an object-side surface 1021 being concave in a paraxial region thereof and an image-side surface 1022 being convex in a paraxial region thereof. The second lens element 1020 is made of a plastic material, and has the object-side surface 1021 and the image-side surface 1022 being both aspheric.

The third lens element 1030 with positive refractive power has an object-side surface 1031 being convex in a paraxial region thereof and an image-side surface 1032 being convex in a paraxial region thereof. The third lens element 1030 is made of a plastic material, and has the object-side surface 1031 and the image-side surface 1032 being both aspheric.

The fourth lens element 1040 with negative refractive power has an object-side surface 1041 being concave in a paraxial region thereof and an image-side surface 1042 being concave in a paraxial region thereof. The fourth lens element 1040 is made of a plastic material, and has the object-side surface 1041 and the image-side surface 1042 being both aspheric.

The fifth lens element 1050 with positive refractive power has an object-side surface 1051 being convex in a paraxial region thereof and an image-side surface 1052 being convex in a paraxial region thereof. The fifth lens element 1050 is made of a plastic material, and has the object-side surface 1051 and the image-side surface 1052 being both aspheric.

The sixth lens element 1060 with negative refractive power has an object-side surface 1061 being concave in a paraxial region thereof and an image-side surface 1062 being convex in a paraxial region thereof. The sixth lens element 1060 is made of a plastic material, and has the object-side surface 1061 and the image-side surface 1062 being both aspheric. Furthermore, the object-side surface 1061 and the image-side surface 1062 of the sixth lens element 1060 include at least one inflection point.

The IR-cut filter 1070 is made of a glass material and located between the sixth lens element 1060 and the image surface 1080, and will not affect the focal length of the photographing optical lens system.

The detailed optical data of the 10th embodiment are shown in Table 19 and the aspheric surface data are shown in Table 20 below.

TABLE 19

10th Embodiment
f = 3.19 mm, Fno = 2.00, HFOV = 63.9 deg.

| Surface # | | Curvature Radius | | Thickness | Material | Index | Abbe # | Focal Length |
|---|---|---|---|---|---|---|---|---|
| 0 | Object | Plano | | Infinity | | | | |
| 1 | Lens 1 | −11.802 | ASP | 1.350 | Plastic | 1.544 | 55.9 | −6.28 |
| 2 | | 5.001 | ASP | 1.327 | | | | |
| 3 | Lens 2 | −15.334 | ASP | 2.291 | Plastic | 1.535 | 55.8 | 9.98 |
| 4 | | −4.165 | ASP | 0.290 | | | | |
| 5 | Ape. Stop | Plano | | −0.235 | | | | |
| 6 | Lens 3 | 3.176 | ASP | 1.955 | Plastic | 1.535 | 55.8 | 2.94 |
| 7 | | −2.439 | ASP | 0.116 | | | | |
| 8 | Lens 4 | −25.848 | ASP | 0.330 | Plastic | 1.639 | 23.5 | −3.25 |
| 9 | | 2.269 | ASP | 0.237 | | | | |
| 10 | Lens 5 | 8.309 | ASP | 0.858 | Plastic | 1.544 | 55.9 | 5.28 |
| 11 | | −4.231 | ASP | 1.393 | | | | |
| 12 | Lens 6 | −2.851 | ASP | 0.644 | Plastic | 1.544 | 55.9 | −5.43 |
| 13 | | −90.909 | ASP | 0.300 | | | | |
| 14 | IR-cut filter | Plano | | 0.300 | Glass | 1.517 | 64.2 | — |
| 15 | | Plano | | 0.193 | | | | |
| 16 | Image | Plano | | — | | | | |

Note: Reference wavelength is 587.6 nm (d-line).

TABLE 20

Aspheric Coefficients

| Surface # | 1 | 2 | 3 | 4 | 6 | 7 |
|---|---|---|---|---|---|---|
| k = | −9.0000E+01 | 3.8818E+00 | −8.6169E+01 | −1.0158E+01 | 2.3244E+00 | −2.4153E−01 |
| A4 = | 2.9986E−03 | 1.0768E−02 | −1.4369E−02 | −1.5324E−02 | −7.8916E−03 | 2.3407E−02 |
| A6 = | −1.5807E−04 | −4.6818E−04 | 2.2228E−03 | 4.7693E−03 | 1.7045E−04 | −2.1975E−02 |
| A8 = | 2.9079E−06 | −2.9345E−04 | −9.8648E−04 | −1.2934E−03 | −4.8011E−03 | 1.1307E−02 |
| A10 = | 2.7667E−08 | 1.4966E−04 | 1.7414E−04 | 4.2815E−04 | 2.6818E−03 | −3.8413E−03 |
| A12 = | | −3.1016E−05 | −4.3543E−06 | −3.4366E−05 | −9.1730E−04 | 4.7483E−04 |

| Surface # | 8 | 9 | 10 | 11 | 12 | 13 |
|---|---|---|---|---|---|---|
| k = | 9.0000E+01 | −9.8171E+00 | 1.7258E+01 | 3.1299E+00 | −1.1760E+00 | −5.8959E+01 |
| A4 = | −8.3963E−02 | 4.6774E−04 | −4.8826E−03 | 9.5679E−03 | 4.5899E−03 | 3.0719E−02 |
| A6= | 4.6168E−02 | 8.5951E−03 | 3.7109E−03 | −3.2387E−03 | −1.0300E−02 | −2.3261E−02 |
| A8= | −3.6714E−02 | −5.7679E−03 | −2.4942E−03 | 3.0514E−03 | 2.9744E−03 | 7.7721E−03 |
| A10 = | 1.8675E−02 | 2.1242E−03 | 1.2207E−03 | −1.2793E−03 | −7.4322E−04 | −1.6283E−03 |
| A12 = | −5.7209E−03 | −4.3328E−04 | −2.7080E−04 | 5.0653E−04 | 1.5144E−04 | 2.0246E−04 |
| A14 = | 7.8196E−04 | 4.4802E−05 | 1.6499E−05 | −5.9141E−05 | −1.4345E−05 | −1.3490E−05 |
| A16 = | | | | −3.4735E−18 | 5.1916E−07 | 3.7130E−07 |

In the 10th embodiment, the equation of the aspheric surface profiles of the aforementioned lens elements is the same as the equation of the 1st embodiment. Also, the definitions of these parameters shown in the following table are the same as those stated in the 1st embodiment with corresponding values for the 10th embodiment, so an explanation in this regard will not be provided again.

Moreover, these parameters can be calculated from Table 19 and Table 20 as the following values and satisfy the following conditions:

| 10th Embodiment | | | |
|---|---|---|---|
| f [mm] | 3.19 | SD/TD | 0.50 |
| Fno | 2.00 | |R6/R7| | 0.09 |
| HFOV [deg.] | 63.9 | (R5 + R6)/(R5 − R6) | 0.13 |
| |1/tan(HFOV)| | 0.49 | (R11 − R12)/(R11 + R12) | −0.94 |
| V2 | 55.8 | (R2 + R11)/(R2 − R11) | 0.27 |
| V4 | 23.5 | R11/Y61 | −1.26 |
| T12/CT1 | 0.98 | f/CT2 | 1.39 |
| BL/T56 | 0.57 | |fr/f| | 0.02 |
| BL/TL | 0.07 | | |

In the photographing optical lens system according to the 10th embodiment, when a refractive power of the first lens element 1010 is P1, a refractive power of the second lens element 1020 is P2, a refractive power of the third lens element 1030 is P3, a refractive power of the fourth lens element 1040 is P4, a refractive power of the fifth lens element 1050 is P5, and a refractive power of the sixth lens element 1060 is P6, the following conditions are satisfied: |P3|>|P1|; |P3|>|P2|; |P3|>|P5|; |P3|>|P6|; |P4|>|P1|; |P4|>|P2|; |P4|>|P5|; and |P4|>|P6|.

In the photographing optical lens system according to the 10th embodiment, when an axial distance between the first lens element 1010 and the second lens element 1020 is T12, an axial distance between the second lens element 1020 and the third lens element 1030 is T23, an axial distance between the third lens element 1030 and the fourth lens element 1040 is T34, an axial distance between the fourth lens element 1040 and the fifth lens element 1050 is T45, and an axial distance between the fifth lens element 1050 and the sixth lens element 1060 is T56, the following conditions are satisfied: T12>T23; T12>T34; T12>T45; T56>T23; T56>T34; and T56>T45.

11th Embodiment

Figure 22:
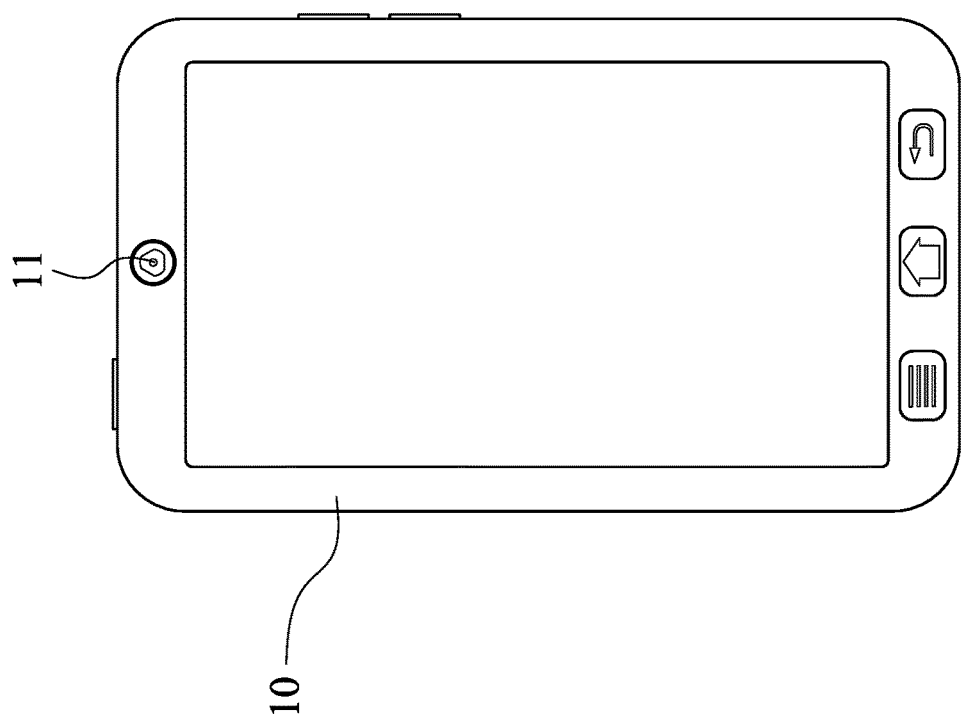
FIG. 22 is a schematic view of an electronic device according to the 11th embodiment of the present disclosure.

FIG. 22 is a schematic view of an electronic device 10 according to the 11th embodiment of the present disclosure. The electronic device 10 of the 11th embodiment is a smart phone, wherein the electronic device 10 includes an image capturing apparatus 11. The image capturing apparatus 11 includes a photographing optical lens system (not shown herein) according to the present disclosure and an image sensor (not shown herein), wherein the image sensor is disposed on an image surface of the photographing optical lens system.

12th Embodiment

Figure 23:
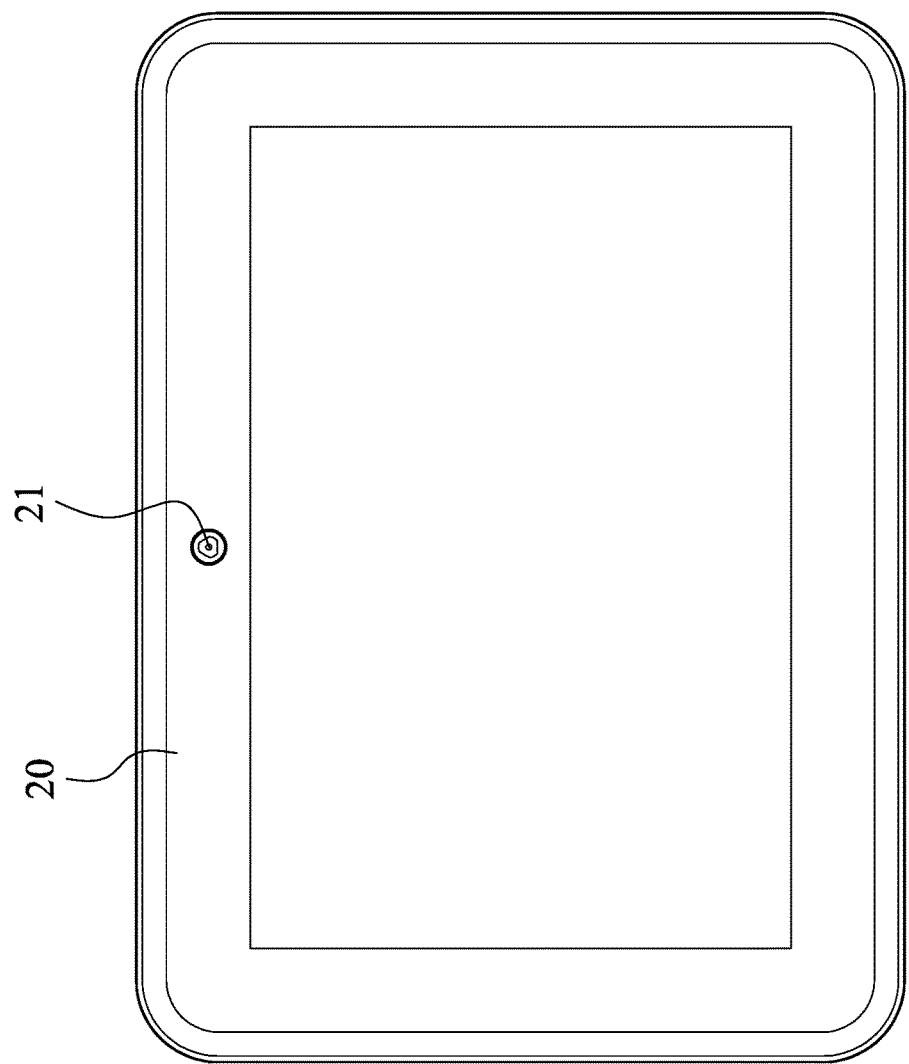
FIG. 23 is a schematic view of an electronic device according to the 12th embodiment of the present disclosure.

FIG. 23 is a schematic view of an electronic device 20 according to the 12th embodiment of the present disclosure. The electronic device 20 of the 12th embodiment is a tablet personal computer, wherein the electronic device 20 includes an image capturing apparatus 21. The image capturing apparatus 21 includes a photographing optical lens system (not shown herein) according to the present disclosure and an image sensor (not shown herein), wherein the image sensor is disposed on an image surface of the photographing optical lens system.

13th Embodiment

Figure 24:
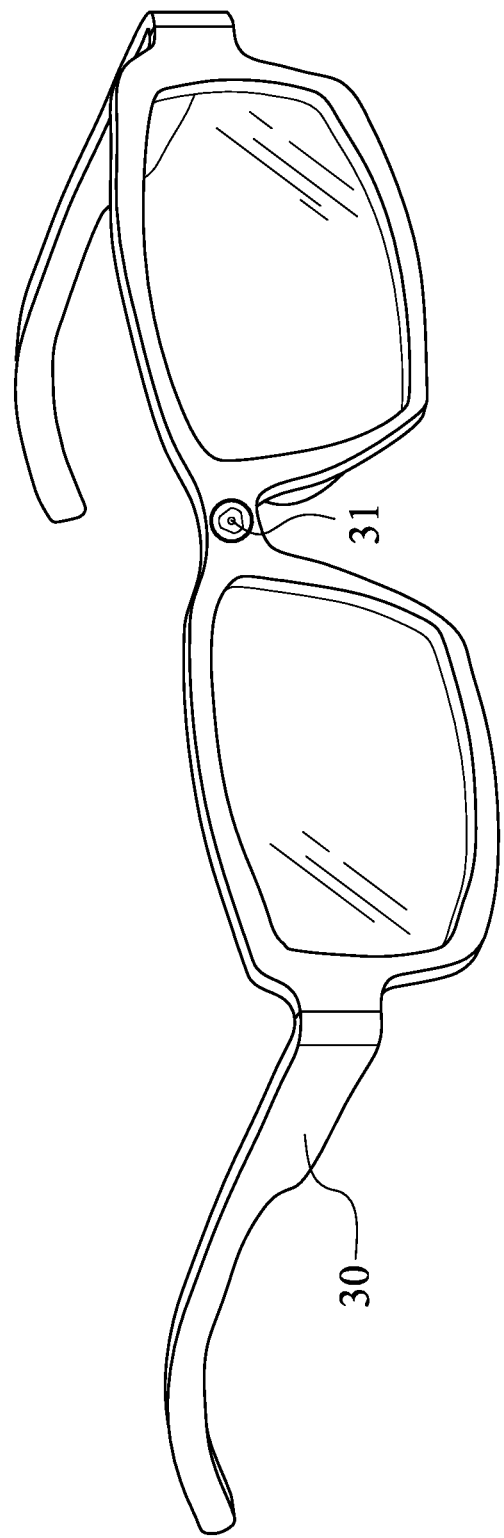
FIG. 24 is a schematic view of an electronic device according to the 13th embodiment of the present disclosure.

FIG. 24 is a schematic view of an electronic device 30 according to the 13th embodiment of the present disclosure. The electronic device 30 of the 13th embodiment is a head-mounted display (HMD), wherein the electronic device 30 includes an image capturing apparatus 31. The image capturing apparatus 31 includes a photographing optical lens system (not shown herein) according to the present disclosure and an image sensor (not shown herein), wherein the image sensor is disposed on an image surface of the photographing optical lens system.

The foregoing description, for purpose of explanation, has been described with reference to specific embodiments. It is to be noted that Tables 1-20 show different data of the different embodiments; however, the data of the different embodiments are obtained from experiments. The embodiments were chosen and described in order to best explain the principles of the disclosure and its practical applications, to thereby enable others skilled in the art to best utilize the disclosure and various embodiments with various modifications as are suited to the particular use contemplated. The embodiments depicted above and the appended drawings are exemplary and are not intended to be exhaustive or to limit the scope of the present disclosure to the precise forms disclosed. Many modifications and variations are possible in view of the above teachings.

What is claimed is:

1. A photographing optical lens system comprising, in order from an object side to an image side:
    a first lens element having negative refractive power;
    a second lens element having an image-side surface being convex in a paraxial region thereof;
    a third lens element having positive refractive power;
    a fourth lens element having negative refractive power;
    a fifth lens element; and
    a sixth lens element with negative refractive power having an object-side surface being concave in a paraxial region thereof and an image-side surface being planar or convex in a paraxial region thereof;
    wherein the photographing optical lens system has a total of six lens elements, a curvature radius of an object-side surface of the third lens element is R5, a curvature radius of an image-side surface of the third lens element is R6, a curvature radius of an object-side surface of the fourth lens element is R7, a curvature radius of the object-side surface of the sixth lens element is R11, a curvature radius of the image-side surface of the sixth lens element is R12, and the following conditions are satisfied:

$-1.0 \le (R11-R12)/(R11+R12)<0;$ $-1.50<(R5+R6)/(R5-R6)<3.50;$ and $|R6/R7|<0.85.$ 2. The photographing optical lens system of claim 1, wherein the curvature radius of the object-side surface of the third lens element is R5, the curvature radius of the image-side surface of the third lens element is R6, and the following condition is satisfied:

$-1.0<(R5+R6)/(R5-R6)<1.0.$

3. The photographing optical lens system of claim 1, wherein the curvature radius of the object-side surface of the third lens element is R5, the curvature radius of the image-side surface of the third lens element is R6, and the following condition is satisfied:

$-0.45<(R5+R6)/(R5-R6)<0.45.$

4. The photographing optical lens system of claim 1, further comprising:
    a stop disposed between the second lens element and the third lens element, wherein an axial distance between the stop and the image-side surface of the sixth lens element is SD, an axial distance between an object-side surface of the first lens element and the image-side surface of the sixth lens element is TD, and the following condition is satisfied:

$0.40<SD/TD<0.60.$

5. The photographing optical lens system of claim 4, wherein the second lens element has an object-side surface being concave in a paraxial region thereof.

6. The photographing optical lens system of claim 4, wherein a composite focal length of lens elements between an imaged object and the stop is ff, a composite focal length of lens elements between the stop and an image surface is fr, and the following condition is satisfied:

$|fr/ff|<0.67.$

7. The photographing optical lens system of claim 1, wherein an axial distance between the image-side surface of the sixth lens element and an image surface is BL, an axial distance between an object-side surface of the first lens element and the image surface is TL, and the following condition is satisfied:

$0<BL/TL<0.15.$

8. The photographing optical lens system of claim 1, wherein there is an air space between every two lens elements of the first lens element, the second lens element, the third lens element, the fourth lens element, the fifth lens element and the sixth lens element that are adjacent to each other, a focal length of the photographing optical lens system is f, a central thickness of the second lens element is CT2, and the following condition is satisfied:

$0<f/CT2<3.0.$

9. The photographing optical lens system of claim 1, wherein an Abbe number of the second lens element is V2, and the following condition is satisfied:

$V2<25.0.$

10. The photographing optical lens system of claim 1, wherein a refractive power of the first lens element is P1, a refractive power of the second lens element is P2, a refractive power of the third lens element is P3, a refractive power of the fourth lens element is P4, a refractive power of the fifth lens element is P5, a refractive power of the sixth lens element is P6, and the following conditions are satisfied:

$|P3|>|P1|;$ $|P3|>|P2|;$ $|P3|>|P5|;$ $|P3|>|P6|;$ $|P4|>|P1|;$ $|P4|>|P2|;$ $|P4|>|P5|;$ and $|P4|>|P6|.$ 11. The photographing optical lens system of claim 1, wherein an axial distance between the first lens element and the second lens element is T12, an axial distance between the second lens element and the third lens element is T23, an axial distance between the third lens element and the fourth lens element is T34, an axial distance between the fourth lens element and the fifth lens element is T45, an axial distance between the fifth lens element and the sixth lens element is T56, and the following conditions are satisfied:

$T12>T23;$ $T12>T34;$ $T12>T45;$ $T56>T23;$ $T56>T34;$ and $T56>T45.$

12. The photographing optical lens system of claim 1, wherein at least one of the object-side surface and the image-side surface of the sixth lens element comprises at least one inflection point, the curvature radius of the object-side surface of the sixth lens element is R11, a vertical distance between a maximum effective diameter position on the object-side surface of the sixth lens element and an optical axis is Y61, and the following condition is satisfied:

$-1.50<R11/Y61<-0.50.$

13. An image capturing apparatus, comprising:
the photographing optical lens system of claim 1; and
an image sensor disposed on an image surface of the photographing optical lens system.

14. An electronic device, comprising:
the image capturing apparatus of claim 13.

15. A photographing optical lens system comprising, in order from an object side to an image side:
a first lens element having negative refractive power;
a second lens element having an image-side surface being convex in a paraxial region thereof;
a third lens element having positive refractive power;
a fourth lens element having negative refractive power;
a fifth lens element; and
a sixth lens element with negative refractive power having an object-side surface being concave in a paraxial region thereof and an image-side surface being planar or convex in a paraxial region thereof;
wherein the photographing optical lens system has a total of six lens elements, a curvature radius of the object-side surface of the sixth lens element is R11, a curvature radius of the image-side surface of the sixth lens element is R12, an axial distance between the first lens element and the second lens element is T12, an axial distance between the fifth lens element and the sixth lens element is T56, a central thickness of the first lens element is CT1, an axial distance between the image-side surface of the sixth lens element and an image surface is BL, and the following conditions are satisfied:

$-1.0\leq(R11-R12)/(R11+R12)<0;$ $0.90<T12/CT1<9.0;$ and $0<BL/T56<1.65.$

16. The photographing optical lens system of claim 15, wherein the first lens element has an object-side surface being convex in a paraxial region thereof and an image-side surface being concave in a paraxial region thereof.

17. The photographing optical lens system of claim 15, wherein a curvature radius of an image-side surface of the first lens element is R2, the curvature radius of the object-side surface of the sixth lens element is R11, and the following condition is satisfied:

$-1.0<(R2+R11)/(R2-R11)<1.0.$

18. The photographing optical lens system of claim 15, wherein a curvature radius of an image-side surface of the first lens element is R2, the curvature radius of the object-side surface of the sixth lens element is R11, and the following condition is satisfied:

$-0.60<(R2+R11)/(R2-R11)<0.50.$

19. The photographing optical lens system of claim 15, further comprising:
a stop, wherein a composite focal length of lens elements between an imaged object and the stop is ff, a composite focal length of lens elements between the stop and the image surface is fr, and the following condition is satisfied:

$|fr/ff|<0.67.$

20. The photographing optical lens system of claim 15, wherein an Abbe number of the fourth lens element is V4, and the following condition is satisfied:

$V4<25.0.$

21. The photographing optical lens system of claim 15, wherein a refractive power of the first lens element is P1, a refractive power of the second lens element is P2, a refractive power of the third lens element is P3, a refractive power of the fourth lens element is P4, a refractive power of the fifth lens element is P5, a refractive power of the sixth lens element is P6, and the following conditions are satisfied:

$|P3|>|P1|;$ $|P3|>|P2|;$

|P3|>|P5|;

|P3|>|P6|;

|P4|>|P1|;

|P4|>|P2|;

|P4|>|P5|; and

|P4|>|P6|.

22. A photographing optical lens system comprising, in order from an object side to an image side:
 a first lens element having negative refractive power;
 a second lens element having an object-side surface being concave in a paraxial region thereof and an image-side surface being convex in a paraxial region thereof;
 a third lens element;
 a fourth lens element having an image-side surface being concave in a paraxial region thereof;
 a fifth lens element; and
 a sixth lens element with negative refractive power having an object-side surface being concave in a paraxial region thereof and an image-side surface being planar or convex in a paraxial region thereof;
 wherein the photographing optical lens system has a total of six lens elements, a curvature radius of the object-side surface of the sixth lens element is R11, a curvature radius of the image-side surface of the sixth lens element is R12, and the following condition is satisfied:

$-1.0 \le (R11-R12)/(R11+R12) < 0$.

23. The photographing optical lens system of claim 22, wherein an axial distance between the image-side surface of the sixth lens element and an image surface is BL, an axial distance between an object-side surface of the first lens element and the image surface is TL, and the following condition is satisfied:

$0 < BL/TL < 0.20$.

24. The photographing optical lens system of claim 22, wherein a half of a maximum field of view of the photographing optical lens system is HFOV, and the following condition is satisfied:

$|1/\tan(HFOV)| < 0.80$.

25. The photographing optical lens system of claim 22, wherein an axial distance between the first lens element and the second lens element is T12, an axial distance between the second lens element and the third lens element is T23, an axial distance between the third lens element and the fourth lens element is T34, an axial distance between the fourth lens element and the fifth lens element is T45, an axial distance between the fifth lens element and the sixth lens element is T56, and the following conditions are satisfied:

$T12 > T23$;

$T12 > T34$;

$T12 > T45$;

$T56 > T23$;

$T56 > T34$; and $T56 > T45$.

26. The photographing optical lens system of claim 22, wherein a focal length of the photographing optical lens system is f, a central thickness of the second lens element is CT2, and the following condition is satisfied:

$0 < f/CT2 < 4.0$.

27. The photographing optical lens system of claim 22, wherein at least one of the object-side surface and the image-side surface of the sixth lens element comprises at least one inflection point, the curvature radius of the object-side surface of the sixth lens element is R11, a vertical distance between a maximum effective diameter position on the object-side surface of the sixth lens element and an optical axis is Y61, and the following condition is satisfied:

$-1.85 < R11/Y61 < -0.50$.

28. The photographing optical lens system of claim 22, wherein there is an air space between every two lens elements of the first lens element, the second lens element, the third lens element, the fourth lens element, the fifth lens element and the sixth lens element that are adjacent to each other.

29. An image capturing apparatus, comprising:
 the photographing optical lens system of claim 22; and
 an image sensor disposed on an image surface of the photographing optical lens system.

30. An electronic device, comprising:
 the image capturing apparatus of claim 29.

* * * * *